US012756047B2

(12) United States Patent
Wu et al.

(10) Patent No.: US 12,756,047 B2
(45) Date of Patent: Oct. 6, 2026

(54) ENERGY STORAGE DEVICE

(71) Applicant: CONTEMPORARY AMPEREX TECHNOLOGY CO., LIMITED, Ningde (CN)

(72) Inventors: Kai Wu, Ningde (CN); Xuefang Zhang, Ningde (CN); Shuangjiang He, Ningde (CN); Jinmei Xu, Ningde (CN); Zhonghong Li, Ningde (CN); Haibin Su, Ningde (CN); Guangsheng Luo, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/280,209

(22) Filed: Jul. 25, 2025

(65) Prior Publication Data

US 2025/0357594 A1 Nov. 20, 2025

Related U.S. Application Data

(63) Continuation of application No. PCT/CN2024/100747, filed on Jun. 21, 2024.

(30) Foreign Application Priority Data

Jun. 21, 2023 (WO) ................ PCT/CN2023/101944

(51) Int. Cl.
*H01M 50/209* (2021.01)
*H01M 4/62* (2006.01)
(Continued)

(52) U.S. Cl.
CPC ......... *H01M 50/209* (2021.01); *H01M 4/628* (2013.01); *H01M 50/103* (2021.01);
(Continued)

(58) Field of Classification Search
CPC ............. H01M 50/233; H01M 50/586; H01M 50/251; H01M 50/289; H01M 50/147; H01M 50/204
(Continued)

(56) References Cited

U.S. PATENT DOCUMENTS 10,756,552 B2 8/2020 Rush et al.
2010/0143785 A1 6/2010 Kwag et al.
(Continued)

FOREIGN PATENT DOCUMENTS

CN 110165117 A 8/2019
CN 113594612 A 11/2021
(Continued)

OTHER PUBLICATIONS

The First Office Action received in the counterpart CN Application No. 202321602436.9, dated Nov. 10, 2023, 2 pages with English translation.
(Continued)

*Primary Examiner* — Allison Bourke
*Assistant Examiner* — Robert Gene West
(74) *Attorney, Agent, or Firm* — K&L Gates LLP

(57) ABSTRACT

Embodiments of this application provide an energy storage device, pertaining to the field of energy storage technology. The energy storage device includes a casing and a plurality of battery cells, where the casing has a battery compartment, the plurality of battery cells being accommodated within the battery compartment, and the battery cell includes a housing and electrode terminals, the electrode terminals being disposed on the housing. A volume of the battery compartment is denoted as $V_1$, a sum of volumes of the housings of all the
(Continued)

battery cells in the battery compartment is denoted as $V_2$, and $0.4 \le V_2/V_1 \le 0.95$. This ensures that all battery cells occupy a relatively large proportion of volume within the battery compartment, thereby enhancing the space utilization of the battery compartment and enhancing the volumetric energy density of the energy storage device.

18 Claims, 17 Drawing Sheets

(51) Int. Cl.

| | |
|---|---|
| ***H01M 50/103*** | (2021.01) |
| ***H01M 50/147*** | (2021.01) |
| ***H01M 50/204*** | (2021.01) |
| ***H01M 50/233*** | (2021.01) |
| ***H01M 50/251*** | (2021.01) |
| ***H01M 50/289*** | (2021.01) |
| ***H01M 50/474*** | (2021.01) |
| ***H01M 50/55*** | (2021.01) |
| ***H01M 50/586*** | (2021.01) |

(52) U.S. Cl.
CPC ....... *H01M 50/147* (2021.01); *H01M 50/233* (2021.01); *H01M 50/251* (2021.01); *H01M 50/289* (2021.01); *H01M 50/474* (2021.01); *H01M 50/55* (2021.01); *H01M 50/586* (2021.01); *H01M 50/204* (2021.01); *H01M 2220/10* (2013.01)

(58) Field of Classification Search
USPC .......................................................... 429/163
See application file for complete search history.

(56) References Cited

U.S. PATENT DOCUMENTS

| | | | | |
|---|---|---|---|---|
| 2015/0004455 | A1 | 1/2015 | Bradwell et al. | |
| 2016/0329538 | A1* | 11/2016 | Hughes ............... | H01M 10/052 |
| 2017/0005301 | A1 | 1/2017 | Yamawaki et al. | |
| 2018/0254466 | A1 | 9/2018 | Aikata | |
| 2020/0243813 | A1 | 7/2020 | Zhang et al. | |
| 2020/0403282 | A1 | 12/2020 | Borsheim et al. | |
| 2022/0255138 | A1 | 8/2022 | Bradwell et al. | |
| 2022/0376355 | A1 | 11/2022 | Gang et al. | |
| 2023/0021008 | A1 | 1/2023 | Besnard et al. | |
| 2023/0087960 | A1 | 3/2023 | Jiang et al. | |
| 2023/0133464 | A1 | 5/2023 | Ota et al. | |
| 2023/0170574 | A1 | 6/2023 | Latulipe et al. | |
| 2025/0023216 | A1 | 1/2025 | Kim et al. | |
| 2025/0079627 | A1 | 3/2025 | Ke et al. | |
| 2025/0183488 | A1 | 6/2025 | Bradwell et al. | |
| 2025/0192313 | A1 | 6/2025 | Sui et al. | |

FOREIGN PATENT DOCUMENTS

| | | | | | |
|---|---|---|---|---|---|
| CN | 114335751 | A | * | 4/2022 | |
| CN | 216720120 | U | | 6/2022 | |
| CN | 218215484 | U | | 1/2023 | |
| CN | 218242075 | U | | 1/2023 | |
| CN | 218827561 | U | | 4/2023 | |
| CN | 218828513 | U | | 4/2023 | |
| CN | 116073046 | A | * | 5/2023 | .......... H01M 50/209 |
| CN | 220527038 | U | | 2/2024 | |
| CN | 220710478 | U | | 4/2024 | |
| DE | 202021102090 | U1 | | 4/2021 | |
| EP | 4550545 | A1 | | 5/2025 | |
| JP | 2011222171 | A | | 11/2011 | |
| JP | 2011243527 | A | | 12/2011 | |
| JP | 2017059508 | A | | 3/2017 | |
| WO | 2022/231498 | A1 | | 11/2022 | |
| WO | 2024/012090 | A1 | | 1/2024 | |

OTHER PUBLICATIONS

The Grant Notice received in the counterpart CN Application No. 202321602436.9, dated Feb. 1, 2024, 2 pages with English translation.
The International Search Report received in the counterpart International Application No. PCT/CN2023/101944, dated Dec. 28, 2023, 5 pages with English translation.
The ISA Written Opinion received in the counterpart International Application No. PCT/CN2023/101944, dated Dec. 28, 2023, 6 pages with English translation.
The International Search Report received in the counterpart International Application No. PCT/CN2024/100747, dated Aug. 3, 2024, 5 pages with English translation.
The ISA Written Opinion received in the counterpart International Application No. PCT/CN2024/100747, dated Aug. 3, 2024, 8 pages with English translation.
The International Search Report received in the counterpart International Application No. PCT/CN2024/100748, dated Sep. 20, 2024, 7 pages with English translation.
The ISA Written Opinion received in the counterpart International Application No. PCT/CN2024/100748, dated Sep. 20, 2024, 9 pages with English translation.
Non-Final Office Action, mailed Oct. 21, 2025, for U.S. Appl. No. 19/280,150.
Beck, "Lithium Iron Phosphate vs. Lithium-Ion: Differences and Advantages", EPEC Engineered Technologies, Sep. 20, 2019; <URL:blog.epectec.com/lithium-iron-phosphate-vs-lithium-ion-differences-and-advantages>.
Lima, "Samsung SDI 94 Ah battery cell full specifications", PushEVs, Apr. 5, 2018; <URL:https://pushevs.com/2018/04/05/samsung-sdi-94-ah-battery-cell-full-specifications>.
Nguyen et al., "Deformation Behavior of Single Prismatic Battery Cell Cases and Cell Assemblies Loaded by Internal Pressure", J. Electrochem. En. Conv. Stor. Nov. 2021, 18(4): 040901 (11 pages).
Nigel, "2013 BMW i3", Battery Design: from chemistry to pack, Dec. 12, 2023 <URL:https://www.batterydesign.net/bmw-i3-2>.
Quantumscape, "Energy Density: Active Materials & Electrode Loading", May 4, 2023, <URL:https://www.quantumscape.com/resources/blog/energy-density-active-materials-electrode-loading>.
Pierri et al., "Adopting a Conversion Design Approach to Maximize the Energy Density of Battery Packs in Electric Vehicles", Energies 2021, 14(7), 1939, 24 pages.
Nigel, "BMW i3", Battery Design: from chemistry to pack, Jun. 9, 2023 <URL:https://www.batterydesign.net/bmw-i3/>.
Non-Final Office Action, mailed Dec. 31, 2025, for U.S. Appl. No. 19/280,162.
Final Office Action, mailed Feb. 6, 2026, for U.S. Appl. No. 19/280,150.
Reliance, "Standard Shipping Container Dimensions", Aug. 31, 2018, <URL: https://reliancepartners.com/owner-operator/shipping-container/>, retrieved Feb. 2, 2026.
Advisory Action, mailed Mar. 26, 2026, for U.S. Appl. No. 19/280,150.
Final Office Action, mailed Apr. 15, 2026, for U.S. Appl. No. 19/280,162.
Office Action (with English Machine Translation), mailed May 12, 2026, for Japanese Patent Application Serial No. 2025-534877.
Office Action (with English Machine Translation), mailed May 12, 2026, for Japanese Patent Application Serial No. 2025-534880.
Office Action (with English Machine Translation), mailed May 12, 2026, for Japanese Patent Application Serial No. 2025-534868.
Trumpf, "The challenge: an economic production of high-performance lithium-ion batteries with process reliability for electromobility", Battery cells and modules, 8 pages, 2021, URL: <https://www.trumpfcom/en_US/solutions/industries/automotive/e-mobility/battery-cells-and-modules/>.
Non-Final Office Action, mailed Jul. 30, 2026, for U.S. Appl. No. 19/280,150.
Notice of Allowance (with English Machine Translation), mailed Jul. 15, 2026, for corresponding Chinese Patent Application Serial No. 202490000193.8.

(56) References Cited

OTHER PUBLICATIONS

Extended European Search Report, mailed Jul. 2, 2026, for corresponding European Patent Application Serial No. 23941965.8.

* cited by examiner

ENERGY STORAGE DEVICE

CROSS-REFERENCE TO RELATED APPLICATIONS

This application is a continuation of International Application No. PCT/CN2024/100747, filed on Jun. 21, 2024, which claims priority to International Patent Application PCT/CN2023/101944, filed on Jun. 21, 2023 and entitled "ENERGY STORAGE DEVICE", which is incorporated herein by reference in its entirety.

TECHNICAL FIELD

This application relates to the field of energy storage technology, and specifically, to an energy storage device.

BACKGROUND

Energy storage devices serve as equipment for storing and transferring electrical energy. An energy storage device can be utilized in a power system. Surplus electrical energy during off-peak periods can be stored in the energy storage device to supplement electricity consumption during peak periods. Thus, the energy storage device is capable of storing excess power generated by a power generation system and supplying electrical energy to the grid when the power generation system produces less electricity.

The energy storage device typically includes a casing and a plurality of battery cells disposed within the casing. The plurality of battery cells are connected in series, parallel, or series-parallel to store electrical energy. Currently, the volumetric energy density of the energy storage device remains relatively low. Therefore, how the volumetric energy density of the energy storage device is enhanced is an urgent issue to be addressed.

SUMMARY

An embodiment of this application provides an energy storage device, so as to effectively enhance the volumetric energy density of the energy storage device.

An embodiment of this application provides an energy storage device including a casing and a plurality of battery cells. The casing includes a battery compartment, where the plurality of battery cells are accommodated within the battery compartment. The battery cell includes a housing and electrode terminals, where the electrode terminals are disposed on the housing. A volume of the battery compartment is denoted as $V_1$, a sum of volumes of the housings of all the battery cells in the battery compartment is denoted as $V_2$, and $0.4 \leq V_2/V_1 \leq 0.95$.

In the above technical solution, $V_2/V_1 \leq 0.95$ ensures that a volume proportion of all battery cells within the battery compartment is not excessively large, lowering the assembly precision requirement of the energy storage device and effectively controlling the manufacturing costs of the energy storage device within a reasonable range. $V_2/V_1 \geq 0.4$ ensures that the volume proportion of all battery cells within the battery compartment is relatively large, thereby enhancing the space utilization of the battery compartment and enhancing the volumetric energy density of the energy storage device.

In some embodiments, $0.5 \leq V_2/V_1 \leq 0.85$. This balances requirements for the volumetric energy density and cost effectiveness of the energy storage device, further reducing the manufacturing costs of the energy storage device while enhancing the volumetric energy density of the energy storage device.

In some embodiments, $0.52 \leq V_2/V_1 \leq 0.75$. This allows manufacturing costs of the energy storage device to be controlled at a relatively low level while maintaining the volumetric energy density of the energy storage device at a relatively high level.

In some embodiments, a volume of the housing body of each battery cell is denoted as $V_3$, and the number of the battery cells within the battery compartment is denoted as $N_1$, satisfying $V_2=V_3*N_1$. This ensures that volumes of the housings of all battery cells within the battery compartment are equal, allowing for the use of battery cells of the same specification. On one hand, this improves assembly efficiency of the energy storage device; on the other hand, this reduces a probability of space wastage caused by differing specifications of the battery cells within the battery compartment.

In some embodiments, $0.0001 \leq V_3/V_1 \leq 0.00025$. $V_3/V_1 \geq 0.0001$ ensures that a volume proportion of the housings of the battery cells within the battery compartment is relatively large. Given a fixed volume of the battery compartment, this can reduce the number of battery cells, decreasing a probability of reduced usable effective space caused by an excessive number of battery cells, and enhancing the volumetric energy density of the energy storage device. $V_3/V_1 \leq 0.00025$ ensures that the volume proportion of the housings of the battery cells within the battery compartment is not excessively large, reducing manufacturing difficulty and manufacturing costs of the battery cells.

In some embodiments, $0.00015 \leq V_3/V_1 \leq 0.0002$. This balances the volumetric energy density of the energy storage device, manufacturing difficulty of the battery cells, and cost-effectiveness requirements of the battery cells, enhancing the volumetric energy density of the energy storage device while reducing manufacturing difficulty and manufacturing costs of the battery cells.

In some embodiments, $0.0026\ m^3 \leq V_3 \leq 0.008\ m^3$. This further enhances the volumetric energy density of the energy storage device and reduces manufacturing costs of the battery cells.

In some embodiments, $0.004\ m^3 \leq V_3 \leq 0.006\ m^3$. This allows the volumetric energy density of the energy storage device to be controlled at a relatively high level while maintaining manufacturing costs of the battery cells at a relatively low level.

In some embodiments, a volume of the casing is denoted as V, satisfying $0.45 \leq V_1/V \leq 0.75$. $V_1/V \geq 0.45$ ensures that a volume proportion of the battery compartment within the volume of the casing is relatively large, increasing the usable effective space within the casing and enhancing the volumetric energy density of the energy storage device. $V_1/V \leq 0.75$ ensures that the volume of the battery compartment is not excessively large, allowing the energy storage device to reserve more installation space for other components and reducing installation difficulty of other components.

In some embodiments, $0.55 \leq V_1/V \leq 0.65$. This balances the volumetric energy density of the energy storage device and ease of installation of other components of the energy storage device.

In some embodiments, $20\ m^3 \leq V \leq 80\ m^3$. $V \geq 20\ m^3$ ensures that the volume of the casing is relatively large, meeting high energy requirements of the energy storage device to store more electrical energy. $V \leq 80\ m^3$ ensures that the volume of the casing is not excessively large, facilitating handling and transportation of the energy storage device.

In some embodiments, 35 $m^3 \leq V \leq 50$ $m^3$. This further balances the high energy requirements of the energy storage device and the convenience of handling and transporting the energy storage device.

In some embodiments, the battery compartment accommodates a plurality of the battery cells arranged along a length direction of the casing. Along the length direction of the casing, a dimension of the battery compartment is denoted as $L_1$, and a sum of dimensions of the housings of the plurality of battery cells arranged within the battery compartment is denoted as $L_2$, satisfying $0.6 \leq L_2/L_1 \leq 0.95$. $L_2/L_1 \geq 0.6$ ensures that a dimension proportion of the housings of the plurality of battery cells arranged along the length direction of the casing within the battery compartment is relatively large, fully utilizing space of the battery compartment along the length direction of the casing and reducing a gap between the housings of two adjacent battery cells along the length direction of the casing. This helps to increase the volume proportion of the housings of all battery cells within the battery compartment and enhance the volumetric energy density of the energy storage device. $L_2/L_1 \leq 0.95$ ensures that the battery compartment has sufficient installation allowance along the length direction of the casing for installing the plurality of battery cells, reducing installation difficulty of the battery cells.

In some embodiments, $0.75 \leq L_2/L_1 \leq 0.9$. This balances the volumetric energy density of the energy storage device and the ease of installation of the battery cells along the length direction of the casing, enhancing the volumetric energy density of the energy storage device while further reducing the installation difficulty of the battery cells along the length direction of the casing.

In some embodiments, along the length direction of the casing, a dimension of the housing of each of the battery cells is denoted as $L_3$, and $N_2$ battery cells are arranged within the battery compartment, satisfying $L_2 = L_3 * N_2$. This ensures that dimensions of the housings of the plurality of battery cells along the length direction of the casing are equal, effectively reducing a probability of space wastage caused by differing dimensions of the housings of the battery cells along the length direction of the casing. During assembly, a plurality of battery cells of the same specification can be used and arranged along the length direction of the casing, enhancing assembly efficiency of the energy storage device and reducing manufacturing costs of the energy storage device.

In some embodiments, $0.03 \leq L_3/L_1 \leq 0.12$. $L_3/L_1 \geq 0.03$ ensures that a dimension proportion of the housings of the battery cells within the battery compartment along the length direction of the casing is relatively large. Given a fixed dimension of the battery compartment along the length direction of the casing, this can reduce the number of battery cells accommodated within the battery compartment along the length direction of the casing, decreasing a probability of reduced usable effective space caused by an excessive number of battery cells and enhancing the volumetric energy density of the energy storage device. $L_3/L_1 \leq 0.12$ ensures that the dimension proportion of the housings of the battery cells within the battery compartment along the length direction of the casing is not excessively large, effectively reducing manufacturing difficulty and manufacturing costs of the battery cells.

In some embodiments, $0.055 \leq L_3/L_1 \leq 0.09$. This further enhances the volumetric energy density of the energy storage device and reduces manufacturing costs of the battery cells.

In some embodiments, 0.17 $m \leq L_3 \leq 0.6$ m. $L_3 \geq 0.17$ m ensures that a dimension of the housing of each battery cell along the length direction of the casing is relatively large, improving a dimension proportion of the housings of the battery cells within the battery compartment along the length direction of the casing and enhancing the volumetric energy density of the energy storage device. $L_3 \leq 0.6$ m ensures that the dimension of the housing of each battery cell along the length direction of the casing is not excessively large, effectively reducing manufacturing difficulty and manufacturing costs of the battery cells.

In some embodiments, 0.2 $m \leq L_3 \leq 0.45$ m. This further enhances the volumetric energy density of the energy storage device and reduces manufacturing costs of the battery cells.

In some embodiments, along the length direction of the casing, a dimension of the casing is denoted as L, satisfying $0.65 \leq L_1/L \leq 0.95$. $L_1/L \geq 0.65$ ensures that a dimension proportion of the battery compartment within the casing along the length direction of the casing is relatively large, increasing a dimension of the battery compartment along the length direction of the casing to provide more space for the battery cells, thereby enhancing the volumetric energy density of the energy storage device. $L_1/L \leq 0.95$ ensures sufficient residual space of the casing not occupied by the battery compartment along the length direction, ensuring adequate structural strength of the casing.

In some embodiments, $0.75 \leq L_1/L \leq 0.9$. This balances requirements for the volumetric energy density of the energy storage device and structural strength of the casing, enhancing the volumetric energy density of the energy storage device while further enhancing the structural strength of the casing.

In some embodiments, 3 $m \leq L \leq 9$ m. $L \geq 3$ m ensures that the dimension of the casing along the length direction is relatively large, allowing for a large dimension of the battery compartment along the length direction of the casing. This helps to increase the dimension proportion of the battery compartment within the casing along the length direction of the casing and enhance the volumetric energy density of the energy storage device. $L \leq 9$ m ensures that the dimension of the casing along the length direction is not excessively large, facilitating handling and transportation of the energy storage device.

In some embodiments, $5 \leq m \leq L \leq 7$ m. This further balances the volumetric energy density of the energy storage device and the convenience of handling and transporting the energy storage device.

In some embodiments, the battery compartment accommodates a plurality of the battery cells arranged along a width direction of the casing; and along the width direction of the casing, a dimension of the battery compartment is denoted as $D_1$, and a sum of dimensions of the housings of the plurality of battery cells arranged within the battery compartment is denoted as $D_2$, satisfying $0.6 \leq D_2/D_1 \leq 0.95$. $D_2/D_1 \geq 0.6$ ensures that a dimension proportion of the housings of the plurality of battery cells arranged along the width direction of the casing within the battery compartment is relatively large, fully utilizing space of the battery compartment along the width direction of the casing and reducing a gap between the housings of two adjacent battery cells along the width direction of the casing. This helps to increase the volume proportion of the housings of all battery cells within the battery compartment and enhance the volumetric energy density of the energy storage device. $D_2/D_1 \leq 0.95$ ensures that the battery compartment has sufficient installation allowance along the width direction of the casing for installing the plurality of battery cells, reducing installation difficulty of the battery cells.

In some embodiments, $0.75 \leq D_2/D_1 \leq 0.9$. This balances the volumetric energy density of the energy storage device and the ease of installation of the battery cells along the width direction of the casing, enhancing the volumetric energy density of the energy storage device while further reducing the installation difficulty of the battery cells along the width direction of the casing.

In some embodiments, along the width direction of the casing, a dimension of the housing of each of the battery cells is denoted as $D_3$, and $N_3$ battery cells are arranged within the battery compartment, satisfying $D_2=D_3*N_3$. This ensures that dimensions of the housings of the plurality of battery cells along the width direction of the casing are equal, effectively reducing a probability of space wastage caused by differing dimensions of the housings of the battery cells along the width direction of the casing. During assembly, a plurality of battery cells of the same specification can be used and arranged along the width direction of the casing, enhancing assembly efficiency of the energy storage device and reducing manufacturing costs of the energy storage device.

In some embodiments, $0.02 \leq D_3/D_1 \leq 0.05$. $D_3/D_1 \geq 0.02$ ensures that a dimension proportion of the housings of the battery cells within the battery compartment along the width direction of the casing is relatively large. Given a fixed dimension of the battery compartment along the width direction of the casing, this can reduce the number of battery cells accommodated within the battery compartment along the width direction of the casing, decreasing a probability of reduced usable effective space caused by an excessive number of battery cells and enhancing the volumetric energy density of the energy storage device. $D_3/D_1 \leq 0.05$ ensures that the dimension proportion of the housings of the battery cells within the battery compartment along the width direction of the casing is not excessively large, effectively reducing manufacturing difficulty and manufacturing costs of the battery cells.

In some embodiments, $0.032 \leq D_3/D_1 \leq 0.04$. This further enhances the volumetric energy density of the energy storage device and reduces manufacturing costs of the battery cells.

In some embodiments, 0.04 m$\leq D_3 \leq$0.12 m. $D_3 \geq$0.04 m ensures that a dimensions of the housing of each battery cell along the width direction of the casing is relatively large, improving a dimension proportion of the housings of the battery cells within the battery compartment along the width direction of the casing and enhancing the volumetric energy density of the energy storage device. $D_3 \leq$0.12 m ensures that the dimension of the housing of each battery cell along the width direction of the casing is not excessively large, effectively reducing manufacturing difficulty and manufacturing costs of the battery cells.

In some embodiments, 0.06 m$\leq D_3 \leq$0.08 m. This further enhances the volumetric energy density of the energy storage device and reduces manufacturing costs of the battery cells.

In some embodiments, along the width direction of the casing, a dimension of the casing is denoted as D, satisfying $0.65 \leq D_1/D \leq 0.99$. $D_1/D \geq 0.65$ ensures that a dimension proportion of the battery compartment within the casing along the width direction of the casing is relatively large, increasing a dimension of the battery compartment along the width direction of the casing to provide more space for the battery cells, thereby enhancing the volumetric energy density of the energy storage device. $D_1/D \leq 0.95$ ensures sufficient residual space of the casing not occupied by the battery compartment along the width direction, ensuring adequate structural strength of the casing.

In some embodiments, $0.75 \leq D_1/D \leq 0.92$. This balances requirements for the volumetric energy density of the energy storage device and structural strength of the casing, enhancing the volumetric energy density of the energy storage device while further enhancing the structural strength of the casing.

In some embodiments, 1.5 m$\leq D \leq$3.5 m. $D \geq$1.5 m ensures that the dimension of the casing along the width direction is relatively large, allowing for a large dimension of the battery compartment along the width direction of the casing. This helps to increase the dimension proportion of the battery compartment within the casing along the width direction of the casing and enhance the volumetric energy density of the energy storage device. $L \leq D \leq$3.5 m ensures that the dimension of the casing along the width direction is not excessively large, facilitating handling and transportation of the energy storage device.

In some embodiments, 2 m$\leq D \leq$3 m. This further balances the volumetric energy density of the energy storage device and the convenience of handling and transporting the energy storage device.

In some embodiments, the battery compartment accommodates a plurality of the battery cells arranged along a height direction of the casing; and along the height direction of the casing, a dimension of the battery compartment is denoted as $H_1$, and a sum of dimensions of the housings of the plurality of battery cells arranged within the battery compartment is denoted as $H_2$, satisfying $0.6 \leq H_2/H_1 \leq 0.95$. $H_2/H_1 \geq 0.6$ ensures that a dimension proportion of the housings of the plurality of battery cells arranged along the height direction of the casing within the battery compartment is relatively large, fully utilizing space of the battery compartment along the height direction of the casing and reducing a gap between the housings of two adjacent battery cells along the height direction of the casing. This helps to increase the volume proportion of the housings of all battery cells within the battery compartment and enhance the volumetric energy density of the energy storage device. $H_2/H_1 \leq 0.95$ ensures that the battery compartment has sufficient installation allowance along the height direction of the casing for installing the plurality of battery cells, reducing installation difficulty of the battery cells.

In some embodiments, $0.7 \leq H_2/H_1 \leq 0.9$. This balances the volumetric energy density of the energy storage device and the ease of installation of the battery cells along the height direction of the casing, enhancing the volumetric energy density of the energy storage device while further reducing the installation difficulty of the battery cells along the height direction of the casing.

In some embodiments, along the height direction of the casing, a dimension of the housing of each of the battery cells is denoted as $H_3$, and $N_4$ battery cells are arranged within the battery compartment, satisfying $H_2=H_3*N_4$. This ensures that dimensions of the housings of the plurality of battery cells along the height direction of the casing are equal, effectively reducing a probability of space wastage caused by differing dimensions of the housings of the battery cells along the height direction of the casing. During assembly, a plurality of battery cells of the same specification can be used and arranged along the height direction of the casing, enhancing assembly efficiency of the energy storage device and reducing manufacturing costs of the energy storage device.

In some embodiments, $0.07 \le H_3/H_1 \le 0.12$. $H_3/H_1 \ge 0.07$ ensures that a dimension proportion of the housings of the battery cells within the battery compartment along the height direction of the casing is relatively large. Given a fixed dimension of the battery compartment along the height direction of the casing, this can reduce the number of battery cells accommodated within the battery compartment along the height direction of the casing, decreasing a probability of reduced usable effective space caused by an excessive number of battery cells and enhancing the volumetric energy density of the energy storage device. $H_3/H_1 \le 0.12$ ensures that the dimension proportion of the housings of the battery cells within the battery compartment along the height direction of the casing is not excessively large, effectively reducing manufacturing difficulty and manufacturing costs of the battery cells.

In some embodiments, $0.08 \le H_3/H_1 \le 0.1$. This further enhances the volumetric energy density of the energy storage device and reduces manufacturing costs of the battery cells.

In some embodiments, $0.17\ m \le H_3 \le 0.6\ m$. $H_3 \ge 0.17\ m$ ensures that a dimension of the housing of each battery cell along the height direction of the casing is relatively large, improving a dimension proportion of the housings of the battery cells within the battery compartment along the height direction of the casing and enhancing the volumetric energy density of the energy storage device. $H_3 \le 0.6\ m$ ensures that the dimension of the housing of each battery cell along the height direction of the casing is not excessively large, effectively reducing manufacturing difficulty and manufacturing costs of the battery cells.

In some embodiments, $0.2\ m \le H_3 \le 0.45\ m$. This further enhances the volumetric energy density of the energy storage device and reduces manufacturing costs of the battery cells.

In some embodiments, along the height direction of the casing, a dimension of the casing is denoted as H, satisfying $0.55 \le H_1/H \le 0.85$. $H_1/H \ge 0.55$ ensures that a dimension proportion of the battery compartment within the casing along the height direction of the casing is relatively large, increasing a dimension of the battery compartment along the height direction of the casing to provide more space for the battery cells, thereby enhancing the volumetric energy density of the energy storage device. $H_1/H \le 0.85$ ensures sufficient residual space of the casing not occupied by the battery compartment along the height direction, ensuring adequate structural strength of the casing.

In some embodiments, $0.65 \le H_1/H \le 0.78$. This balances requirements for the volumetric energy density of the energy storage device and structural strength of the casing, enhancing the volumetric energy density of the energy storage device while further enhancing the structural strength of the casing.

In some embodiments, $1.5\ m \le H \le 3.5\ m$. $H \ge 1.5\ m$ ensures that the dimension of the casing along the height direction is relatively large, allowing for a large dimension of the battery compartment along the height direction of the casing. This helps to increase the dimension proportion of the battery compartment within the casing along the height direction of the casing and enhance the volumetric energy density of the energy storage device. $H \le 3.5\ m$ ensures that the dimension of the casing along the height direction is not excessively large, facilitating handling and transportation of the energy storage device.

In some embodiments, $2\ m \le H \le 3\ m$. This further balances the volumetric energy density of the energy storage device and the convenience of handling and transporting the energy storage device.

In some embodiments, the battery compartment accommodates at least one battery, and the battery includes a plurality of battery cells. During assembly, the plurality of battery cells can first be assembled into a battery, and then the battery can be installed within the battery compartment. The battery, composed of the plurality of battery cells, has a larger volume and is easier to install within the battery compartment, resulting in high assembly efficiency.

In some embodiments, the battery compartment accommodates a plurality of batteries arranged along a length direction of the casing; and along the length direction of the casing, a dimension of the battery compartment is denoted as $L_1$, and a sum of dimensions of the plurality of batteries arranged within the battery compartment is denoted as $L_4$, satisfying $0.7 \le L_4/L_1 \le 0.96$. The battery compartment accommodates the plurality of batteries arranged along the length direction of the casing, ensuring that a dimension of a single battery along the length direction of the casing is not excessively large, reducing manufacturing difficulty and installation difficulty of the battery. $L_4/L_1 \ge 0.7$ ensures that a dimension proportion of the plurality of batteries arranged along the length direction of the casing within the battery compartment is relatively large, fully utilizing space of the battery compartment along the length direction of the casing and reducing a gap between two adjacent batteries along the length direction of the casing. This helps to increase the volume proportion of all batteries within the battery compartment and enhance the volumetric energy density of the energy storage device. $L_4/L_1 \le 0.96$ ensures that the battery compartment has sufficient installation allowance along the length direction of the casing for installing the plurality of batteries, reducing installation difficulty of the batteries.

In some embodiments, $0.78 \le L_4/L_1 \le 0.91$. This balances the volumetric energy density of the energy storage device and the ease of installation of the batteries along the length direction of the casing, enhancing the volumetric energy density of the energy storage device while further reducing the installation difficulty of the batteries along the length direction of the casing.

In some embodiments, along the length direction of the casing, a dimension of each battery is denoted as $L_5$, and $N_5$ batteries are arranged within the battery compartment, satisfying $L_4 = L_5 * N_5$. This ensures that dimensions of the plurality of batteries along the length direction of the casing are equal, effectively reducing a probability of space wastage caused by differing dimensions of the batteries along the length direction of the casing. During assembly, a plurality of batteries of the same specification can be used and arranged along the length direction of the casing, enhancing assembly efficiency of the energy storage device and reducing manufacturing costs of the energy storage device.

In some embodiments, $1\ m \le L_5 \le 1.5\ m$, and $2 \le N_5 \le 6$. In this way, along the length direction of the casing, the dimension of each battery is relatively large, and the number of batteries is not excessively large, reducing space occupied by components other than the battery cells within the battery and increasing the dimension proportion of the plurality of batteries arranged along the length direction of the casing within the battery compartment along the length direction of the casing.

In some embodiments, along the length direction of the casing, the battery compartment accommodates only one battery, the dimension of the battery compartment is denoted as $L_1$, and a dimension of the battery is denoted as $L_5$, satisfying $0.8 \leq L_5/L_1 \leq 0.99$. The battery compartment accommodating only one battery along the length direction of the casing improves space utilization of the battery compartment along the length direction of the casing. $L_5/L_1 \geq 0.8$ ensures that a dimension proportion of the battery within the battery compartment along the length direction of the casing is relatively large, fully utilizing space of the battery compartment along the length direction of the casing and increasing a volume proportion of all batteries within the battery compartment, thereby enhancing the volumetric energy density of the energy storage device. $L_5/L_1 \leq 0.99$ ensures that the battery compartment has sufficient installation allowance along the length direction of the casing for installing the battery, reducing installation difficulty of the battery.

In some embodiments, $0.85 \leq L_5/L_1 \leq 0.93$. This balances the volumetric energy density of the energy storage device and the ease of installation of the battery along the length direction of the casing, enhancing the volumetric energy density of the energy storage device while further reducing the installation difficulty of the battery along the length direction of the casing.

In some embodiments, 4 m$\leq L_5 \leq$8 m. $L_5 \geq$4 m ensures that a dimension of the battery along the length direction of the casing is relatively large, allowing more battery cells to be arranged along the length direction of the casing within the battery to meet high energy requirements of the energy storage device. $L_5 \leq$8 m ensures that the dimension of the battery along the length direction of the casing is not excessively large, reducing manufacturing difficulty and installation difficulty of the battery.

In some embodiments, 5.5 m$\leq L_5 \leq$6.8 m. This balances the high energy requirements of the energy storage device and the cost effectiveness and ease of installation of the battery.

In some embodiments, the battery compartment accommodates a plurality of batteries arranged along the width direction of the casing; and along the width direction of the casing, the dimension of the battery compartment is denoted as $D_1$, and a sum of dimensions of the plurality of batteries arranged within the battery compartment is denoted as $D_4$, satisfying $0.7 \leq D_4/D_1 \leq 0.96$. The battery compartment accommodates the plurality of batteries arranged along the width direction of the casing, ensuring that a dimension of a single battery along the width direction of the casing is not excessively large, reducing manufacturing difficulty and installation difficulty of the battery. $D_4/D_1 \geq 0.7$ ensures that a dimension proportion of the plurality of batteries arranged along the width direction of the casing within the battery compartment is relatively large, fully utilizing space of the battery compartment along the width direction of the casing and reducing a gap between two adjacent batteries along the width direction of the casing. This helps to increase the volume proportion of all batteries within the battery compartment and enhance the volumetric energy density of the energy storage device. $D_4/D_1 \leq 0.96$ ensures that the battery compartment has sufficient installation allowance along the width direction of the casing for installing the plurality of batteries, reducing installation difficulty of the batteries.

In some embodiments, $0.78 \leq D_4/D_1 \leq 0.91$. This balances the volumetric energy density of the energy storage device and the ease of installation of the batteries along the width direction of the casing, enhancing the volumetric energy density of the energy storage device while further reducing the installation difficulty of the batteries along the width direction of the casing.

In some embodiments, along the width direction of the casing, a dimension of each battery is denoted as $D_5$, and $N_6$ batteries are arranged within the battery compartment, satisfying $D_4=D_5*N_6$. This ensures that dimensions of the plurality of batteries along the width direction of the casing are equal, effectively reducing a probability of space wastage caused by differing dimensions of the batteries along the width direction of the casing. During assembly, a plurality of batteries of the same specification can be used and arranged along the width direction of the casing, enhancing assembly efficiency of the energy storage device and reducing manufacturing costs of the energy storage device.

In some embodiments, 1 m$\leq D_5 \leq$1.5 m, and $2 \leq N_6 \leq 3$. In this way, along the width direction of the casing, the dimension of each battery is relatively large, and the number of batteries is not excessively large, reducing space occupied by components other than the battery cells within the battery and increasing the dimension proportion of the plurality of batteries arranged along the width direction of the casing within the battery compartment along the width direction of the casing.

In some embodiments, along the width direction of the casing, the battery compartment accommodates only one battery, the dimension of the battery compartment is denoted as $D_1$, and a dimension of the battery is denoted as $D_5$, satisfying $0.8 \leq D_5/D_1 \leq 0.99$. The battery compartment accommodating only one battery along the width direction of the casing improves space utilization of the battery compartment along the width direction of the casing. $D_5/D_1 \geq 0.8$ ensures that a dimension proportion of the battery within the battery compartment along the width direction of the casing is relatively large, fully utilizing space of the battery compartment along the width direction of the casing and increasing a volume proportion of all batteries within the battery compartment, thereby enhancing the volumetric energy density of the energy storage device. $D_5/D_1 \leq 0.99$ ensures that the battery compartment has sufficient installation allowance along the width direction of the casing for installing the battery, reducing installation difficulty of the battery.

In some embodiments, $0.85 \leq D_5/D_1 \leq 0.93$. This balances the volumetric energy density of the energy storage device and the ease of installation of the battery along the width direction of the casing, enhancing the volumetric energy density of the energy storage device while further reducing the installation difficulty of the battery along the width direction of the casing.

In some embodiments, 1.5 m$\leq D_5 \leq$2.5 m. $D_5 \geq$1.5 m ensures that a dimension of the battery along the width direction of the casing is relatively large, allowing more battery cells to be arranged along the width direction of the casing within the battery to meet high energy requirements of the energy storage device. $D_5 \leq$2.5 m ensures that the dimension of the battery along the width direction of the casing is not excessively large, reducing manufacturing difficulty and installation difficulty of the battery.

In some embodiments, 1.7 m$\leq D_5 \leq$2.3 m. This balances the high energy requirements of the energy storage device and the cost effectiveness and ease of installation of the battery.

In some embodiments, the battery compartment accommodates a plurality of batteries arranged along the height direction of the casing; and along the height direction of the casing, the dimension of the battery compartment is denoted as $H_1$, and a sum of dimensions of the plurality of batteries arranged within the battery compartment is denoted as $H_4$, satisfying $0.6 \leq H_4/H_1 \leq 0.99$. The battery compartment accommodates the plurality of batteries arranged along the height direction of the casing, ensuring that a dimension of a single battery along the height direction of the casing is not excessively large, reducing manufacturing difficulty and installation difficulty of the battery. $H_4/H_1 \geq 0.6$ ensures that a dimension proportion of the plurality of batteries arranged along the height direction of the casing within the battery compartment is relatively large, fully utilizing space of the battery compartment along the height direction of the casing and reducing a gap between two adjacent batteries along the height direction of the casing. This helps to increase the volume proportion of all batteries within the battery compartment and enhance the volumetric energy density of the energy storage device. $H_4/H_1 \leq 0.99$ ensures that the battery compartment has sufficient installation allowance along the height direction of the casing for installing the plurality of batteries, reducing installation difficulty of the batteries.

In some embodiments, $0.7 \leq H_4/H_1 \leq 0.92$. This balances the volumetric energy density of the energy storage device and the ease of installation of the batteries along the height direction of the casing, enhancing the volumetric energy density of the energy storage device while further reducing the installation difficulty of the batteries along the height direction of the casing.

In some embodiments, along the height direction of the casing, a dimension of each battery is denoted as $H_5$, and $N_7$ batteries are arranged within the battery compartment, satisfying $H_4=H_5*N_7$. This ensures that dimensions of the plurality of batteries along the height direction of the casing are equal, effectively reducing a probability of space wastage caused by differing dimensions of the batteries along the height direction of the casing. During assembly, a plurality of batteries of the same specification can be used and arranged along the height direction of the casing, enhancing assembly efficiency of the energy storage device and reducing manufacturing costs of the energy storage device.

In some embodiments, 0.2 m$\leq H_5 \leq$0.3 m, and $2 \leq N_7 \leq 10$. In this way, along the height direction of the casing, the dimension of each battery is relatively large, and the number of batteries is not excessively large, reducing space occupied by components other than the battery cells within the battery and increasing the dimension proportion of the plurality of batteries arranged along the height direction of the casing within the battery compartment along the height direction of the casing.

In some embodiments, along the height direction of the casing, the battery compartment accommodates only one battery, the dimension of the battery compartment is denoted as $H_1$, and a dimension of the battery is denoted as $H_5$, satisfying $0.8 \leq H_5/H_1 \leq 0.99$. The battery compartment accommodating only one battery along the height direction of the casing improves space utilization of the battery compartment along the height direction of the casing. $H_5/H_1 \geq 0.8$ ensures that a dimension proportion of the battery within the battery compartment along the height direction of the casing is relatively large, fully utilizing space of the battery compartment along the height direction of the casing and increasing a volume proportion of all batteries within the battery compartment, thereby enhancing the volumetric energy density of the energy storage device. $H_5/H_1 \leq 0.99$ ensures that the battery compartment has sufficient installation allowance along the height direction of the casing for installing the battery, reducing installation difficulty of the battery.

In some embodiments, $0.85 \leq H_5/H_1 \leq 0.93$. This balances the volumetric energy density of the energy storage device and the ease of installation of the battery along the height direction of the casing, enhancing the volumetric energy density of the energy storage device while further reducing the installation difficulty of the battery along the height direction of the casing.

In some embodiments, 1.5 m$\leq H_5 \leq$2.5 m. $H_5 \geq$1.5 m ensures that a dimension of the battery along the height direction of the casing is relatively large, and a dimension of the battery cells within the battery along the height direction of the casing is relatively large, meeting high energy requirements of the energy storage device. $H_5 \leq$2.5 m ensures that the dimension of the battery along the height direction of the casing is not excessively large, reducing manufacturing difficulty and installation difficulty of the battery.

In some embodiments, 1.7 m$\leq H_5 \leq$2.3 m. This balances the high energy requirements of the energy storage device and the cost effectiveness and ease of installation of the battery.

In some embodiments, the battery compartment includes a plurality of sub-compartments, the plurality of sub-compartments are arranged along the length direction of the casing, and each of the sub-compartments accommodates at least one battery. The battery compartment is divided into a plurality of sub-compartments, and each sub-compartment can accommodate the battery, allowing the batteries to be accommodated within the battery compartment in a more organized manner, facilitating installation of the batteries.

In some embodiments, a volume of the sub-compartment is denoted as $V_4$, and a sum of volumes of the batteries within the sub-compartment is denoted as $V_5$, satisfying $0.75 \leq V_5/V_{4 \leq 0.95}$. $V_5/V_4 \geq 0.75$ ensures that a volume proportion of all batteries within the sub-compartment is relatively large, thereby enhancing the space utilization of the sub-compartment and enhancing the volumetric energy density of the energy storage device. $V_5/V_4 \leq 0.95$ ensures that the volume proportion of all batteries within the sub-compartment is not excessively large, lowering the assembly precision requirement for installing the batteries into the sub-compartment and effectively controlling the manufacturing costs of the energy storage device within a reasonable range.

In some embodiments, $0.82 \leq V_5/V_4 \leq 0.9$. This balances requirements for the volumetric energy density and cost effectiveness of the energy storage device, further reducing the manufacturing costs of the energy storage device while enhancing the volumetric energy density of the energy storage device.

In some embodiments, along the length direction of the casing, the sub-compartment accommodates only one battery. This improves a proportion of the battery along the length direction of the casing within the sub-compartment, and enhances space utilization of the sub-compartment along the length direction of the casing.

In some embodiments, along the length direction of the casing, a dimension of the sub-compartment is denoted as $L_6$, and a dimension of the battery is denoted as $L_5$, satisfying $0.85 \leq L_5/L_6 \leq 0.99$. $L_5/L_6 \geq 0.85$ ensures that a dimension proportion of the battery within the sub-compartment along the length direction of the casing is relatively large, fully utilizing space of the sub-compartment along the length direction of the casing and increasing a volume proportion of all batteries within the sub-compartment, thereby enhancing the volumetric energy density of the energy storage device. $L_5/L_6 \leq 0.99$ ensures that the sub-compartment has sufficient installation allowance along the length direction of the casing for installing the battery, reducing installation difficulty of the battery.

In some embodiments, $0.88 \leq L_5/L_6 \leq 0.95$. This balances the volumetric energy density of the energy storage device and the ease of installation of the battery along the length direction of the casing, enhancing the volumetric energy density of the energy storage device while further reducing the installation difficulty of the battery along the length direction of the casing.

In some embodiments, along the width direction of the casing, the sub-compartment accommodates only one battery. This improves a proportion of the battery along the width direction of the casing within the sub-compartment, and enhances space utilization of the sub-compartment along the width direction of the casing.

In some embodiments, along the height direction of the casing, the sub-compartment accommodates a plurality of batteries. This reduces a dimension of a single battery along the height direction of the casing, reducing manufacturing difficulty and manufacturing costs of the battery.

In some embodiments, the number of the sub-compartments is less than or equal to 4. In this way, the number of partition components separating two adjacent sub-compartments within the battery compartment is relatively small, reducing space occupied by the partition components within the battery compartment to provide more space for the batteries, thereby enhancing space utilization of the battery compartment.

In some embodiments, a volume of the battery is denoted as $V_6$, and a sum of volumes of the housings of the plurality of battery cells of the battery is denoted as $V_7$, satisfying $0.5 \leq V_7/V_6 \leq 0.8$. $V_7/V_6 \geq 0.5$ ensures that a volume proportion of all battery cells within the battery is relatively large, enhancing space utilization within the battery and enhancing the volumetric energy density of the battery, thereby enhancing the volumetric energy density of the energy storage device. $V_7/V_6 \leq 0.8$ ensures that the volume proportion of all battery cells within the battery is not excessively large, providing more space for other components of the battery and reducing assembly difficulty and manufacturing costs of the battery.

In some embodiments, $0.58 \leq V_7/V_6 \leq 0.7$. This balances the volumetric energy density of the battery and economic and assembly convenience requirements of the battery, further enhancing the volumetric energy density of the battery while reducing assembly difficulty and manufacturing costs of the battery.

In some embodiments, the number of the battery cells of the battery is denoted as $N_8$, and a volume of the housing of each battery cell is denoted as $V_3$, satisfying $V_7 = V_3 * N_5$. This ensures that volumes of the housings of all battery cells of the battery are equal, allowing for the use of battery cells of the same specification. On one hand, this improves assembly efficiency of the battery; on the other hand, this reduces a probability of space wastage caused by differing specifications of the battery cells of the battery.

In some embodiments, the battery includes p*q battery cells, the p*q battery cells are arranged in p rows and q columns, each row of the battery cells is arranged along the length direction of the casing, and each column of the battery cells is arranged along the width direction of the casing, where p and q are positive integers. This ensures that all battery cells of the battery are distributed in a rectangular array, enhancing space utilization of the battery.

In some embodiments, in each row of the battery cells, a sum of dimensions of the housings of q battery cells along the length direction of the casing is denoted as $L_7$, and a dimension of the battery along the length direction of the casing is denoted as $L_5$, satisfying $0.8 \leq L_7/L_5 \leq 0.95$. $L_7/L_5 \geq 0.8$ ensures that a dimension proportion of the housings of each row of battery cells within the battery along the length direction of the casing is relatively large, fully utilizing space of the battery along the length direction of the casing and reducing a gap between the housings of two adjacent battery cells along the length direction of the casing. This helps to increase the volume proportion of the housings of all battery cells within the battery and enhance the volumetric energy density of the battery. $L_7/L_5 \leq 0.95$ ensures that the dimension proportion of the housings of each row of battery cells within the battery along the length direction of the casing is not excessively large, reducing manufacturing difficulty and manufacturing costs of the battery.

In some embodiments, $0.85 \leq L_7/L_5 \leq 0.9$. This balances the volumetric energy density of the battery, manufacturing difficulty of the battery, and cost-effectiveness requirements of the battery, further enhancing the volumetric energy density of the battery while reducing manufacturing difficulty and manufacturing costs of the battery.

In some embodiments, along the length direction of the casing, a dimension of the housing of each of the battery cells is denoted as $L_3$, satisfying $L_3 = L_7/q$, where 0.17 m$\leq L_3 \leq$0.6 m, and $1 \leq q \leq 5$. $L_3 = L_7/q$ ensures that the dimensions of the housings of the battery cells in each row within the battery along the length direction of the casing are equal, allowing for the use of battery cells of the same specification in each row. Additionally, 0.17 m$\leq L_{3\leq 0.6}$ m and $1 \leq q \leq 5$ ensure that in each row of the battery cells, the dimension of each battery cell is relatively large, and the number of battery cells is not excessively large, reducing space occupied by walls of the housings along the length direction of the casing and increasing a dimension proportion of the housings of each row of battery cells within the battery along the length direction of the casing, thereby enhancing the space utilization of the battery and enhancing the volumetric energy density of the battery.

In some embodiments, q=4, and 0.2 m$\leq L_{3\leq 0.3}$ m. When the number of battery cells in each row of the battery cells is four, controlling the dimension of the housing of the battery cell within a range of 0.2 m to 0.3 m ensures that the battery has a relatively high volumetric energy density.

In some embodiments, q=2, and 0.4 m$\leq L_{3\leq 0.6}$ m. When the number of battery cells in each row of the battery cells is two, controlling the dimension of the housing of the battery cell within a range of 0.4 m$\leq L_{3\leq 0.6}$ m ensures that the battery has a relatively high volumetric energy density.

In some embodiments, in each column of the battery cells, a sum of dimensions of the housings of p battery cells along the width direction of the casing is denoted as $D_7$, and the dimension of the battery along the width direction of the casing is denoted as $D_5$, satisfying $0.75 \leq D_7/D_5 \leq 0.95$. $D_7/D_5 \geq 0.75$ ensures that a dimension proportion of the housings of each column of battery cells within the battery along the width direction of the casing is relatively large, fully utilizing space of the battery along the width direction of the casing and reducing a gap between the housings of two adjacent battery cells along the width direction of the casing. This helps to increase the volume proportion of the housings of all battery cells within the battery and enhance the volumetric energy density of the battery. $D_7/D_5 \leq 0.95$ ensures that the dimension proportion of the housings of each column of battery cells within the battery along the width direction of the casing is not excessively large, reducing manufacturing difficulty and manufacturing costs of the battery.

In some embodiments, $0.82 \leq D_7/D_5 \leq 0.9$. This balances the volumetric energy density of the battery, manufacturing difficulty of the battery, and cost-effectiveness requirements of the battery, further enhancing the volumetric energy density of the battery while reducing manufacturing difficulty and manufacturing costs of the battery.

In some embodiments, along the width direction of the casing, a dimension of the housing of each of the battery cells is denoted as $D_3$, satisfying $D_3=D_7/p$, where 0.04 m≤$D_3$≤0.12 m, and 20≤p≤30. $D_3=D_7/p$ ensures that dimensions of the housings of the battery cells in each column within the battery along the width direction of the casing are equal, allowing for the use of battery cells of the same specification in each column. Additionally, 0.04 m≤$D_3$≤0.12 m and 20≤p≤30 ensure that in each column of the battery cells, the dimension of each battery cell is relatively large, and the number of battery cells is not excessively large, reducing space occupied by walls of the housings along the width direction of the casing and increasing a dimension proportion of the housings of each column of battery cells within the battery along the width direction of the casing, thereby enhancing the space utilization of the battery and enhancing the volumetric energy density of the battery.

In some embodiments, 0.06 m≤$D_3$≤0.08 m, and 24≤p≤28. Such a battery has a relatively high volumetric energy density.

In some embodiments, the dimension of the housing of the battery cell along the height direction of the casing is denoted as $H_3$, and the dimension of the battery along the height direction of the casing is denoted as $H_5$, satisfying $0.75 \le H_3/H_5 \le 0.95$. $H_3/H_5 \ge 0.75$ ensures that a dimension proportion of the housings of the battery cells within the battery along the height direction of the casing is relatively large, fully utilizing space of the battery along the height direction of the casing and increasing a volume proportion of the housings of all battery cells within the battery, thereby enhancing the volumetric energy density of the battery. $H_3/H_5 \le 0.95$ ensures that the dimension proportion of the housings of the battery cells within the battery along the height direction of the casing is not excessively large, reducing manufacturing difficulty and manufacturing costs of the battery.

In some embodiments, $0.82 \le H_3/H_5 \le 0.9$. This balances the volumetric energy density of the battery, manufacturing difficulty of the battery, and cost-effectiveness requirements of the battery, further enhancing the volumetric energy density of the battery while reducing manufacturing difficulty and manufacturing costs of the battery.

In some embodiments, 0.17 m≤$H_3$≤0.6 m. $H_3$≥0.17 m ensures that dimension of the housing of each battery cell the height direction of the casing is relatively large, increasing the dimension proportion of the housings of the battery cells within the battery along the height direction of the casing and enhancing the volumetric energy density of the battery cell. $H_3$≤0.6 m ensures that the dimension of the housing of each battery cell along the height direction of the casing is not excessively large, effectively reducing manufacturing difficulty and manufacturing costs of the battery cells.

In some embodiments, 0.2 m≤$H_3$≤0.45 m. This balances the volumetric energy density of the battery, manufacturing difficulty of the battery, and cost-effectiveness requirements of the battery, further enhancing the volumetric energy density of the battery while reducing manufacturing difficulty and manufacturing costs of the battery.

In some embodiments, the battery cell further includes at least one electrode assembly, the electrode assembly being accommodated within the housing; the housing has a cuboid shape, a dimension of the housing in a first direction is denoted as $W_1$, a dimension of the housing in a second direction is denoted as $T_1$, and a dimension of the housing in a third direction is denoted as $K_1$, where one of the first direction, the second direction, and the third direction is parallel to the length direction of the casing, another is parallel to the width direction of the casing, and the remaining one is parallel to the height direction of the casing; and the housing includes a first wall and a second wall disposed opposite each other along the first direction, a third wall and a fourth wall disposed opposite each other along the second direction, and a fifth wall and a sixth wall disposed opposite each other along the third direction, where a sum of thicknesses of the first wall and the second wall is denoted as a, a sum of thicknesses of the third wall and the fourth wall is denoted as b, and a sum of thicknesses of the fifth wall and the sixth wall is denoted as c, satisfying $(W_1-a)*(T_1-b)*(K_1-c)/(W_1*T_1*K_1) \ge 0.9$. In such a battery cell, a ratio of a volume of an internal space of the housing of the battery cell to a volume of the housing is 0.9 or greater, so that a proportion of the internal space of the housing is relatively large, increasing space within the housing available for accommodating the electrode assembly, and under the same chemical system, enhancing the volumetric energy density of the battery cell.

In some embodiments, $(W_1-a)/W_1 \ge 0.97$, $(T_1-b)/T_1 \ge 0.965$, and $(K_1-c)/K_1 \ge 0.965$. This increases dimension proportions of the internal space of the housing in three directions, further enhancing the volumetric energy density of the battery cell.

In some embodiments, the housing includes a housing body and an end cap, the housing body has an opening, the end cap covers the opening, and the end cap is provided with the electrode terminals; and the housing body includes the first wall, the second wall, the third wall, the fourth wall, and the fifth wall integrally formed, and the end cap serves as the sixth wall. During assembly of the battery, the electrode terminals can first be installed on the end cap, then the electrode assembly can be accommodated within the housing body, and subsequently the end cap can cover the opening of the housing body, reducing difficulty in installing the electrode assembly within the housing and installing the electrode terminals on the housing.

In some embodiments, the battery cell further includes a first insulating member and a second insulating member, where the first insulating member is disposed between the fifth wall and the electrode assembly and abuts against the fifth wall; the second insulating member is disposed between the sixth wall and the electrode assembly and abuts against the sixth wall; and a maximum dimension of the first insulating member in the third direction is denoted as $e_1$, and a maximum dimension of the second insulating member in the third direction is denoted as $e_2$, satisfying: $(W_1-a-1.6\ \text{mm})*(T_1-b-1.6\ \text{mm})*(K_1-c-e_1-e_2)/(W_1*T_1*K_1)$ 0.88, 0.3 mm≤$e_1$≤1.2 mm, and 2 mm≤$e_2$≤10 mm. This increases space within the housing reserved for the electrode assembly, allowing for accommodation of a larger-volume electrode assembly and further enhancing the volumetric energy density of the battery cell.

In some embodiments, the battery cell further includes a first insulating member and a second insulating member, where the first insulating member is disposed between the fifth wall and the electrode assembly and abuts against the fifth wall; the second insulating member is disposed between the sixth wall and the electrode assembly and abuts against the sixth wall; and a maximum dimension of the first insulating member in the third direction is denoted as $e_1$, and a maximum dimension of the second insulating member in the third direction is denoted as $e_2$, satisfying: $(W_1-a-4\ \text{mm})*(T_1-b-4\ \text{mm})*(K_1-c-e_1-e_2)/(W_1*T_1*K_1)$ 0.85, 0.3 mm≤$e_1$≤1.2 mm, and 2 mm≤$e_2$≤10 mm. This increases space within the housing reserved for the electrode assembly, allowing for accommodation of a larger-volume electrode assembly and further enhancing the volumetric energy density of the battery cell.

In some embodiments, $W_1$≥$T_1$, the first direction is parallel to the length direction of the casing, the second direction is parallel to the width direction of the casing, and the third direction is parallel to the height direction of the casing. In a case that the housing body has an end cap disposed at only one end and $W_1$≥$T_1$, the end cap and the fifth wall of the housing are disposed opposite each other along the height direction of the casing, the first wall and the second wall of the housing are disposed opposite each other along the length direction of the casing, and the third wall and the fourth wall of the housing are disposed opposite each other along the width direction of the casing, increasing the volume proportion of all battery cells within the battery compartment.

In some embodiments, the housing includes a housing body and two end caps, the housing body has two openings disposed opposite each other along the third direction, the two end caps respectively cover the two openings, and at least one of the end caps is provided with the electrode terminals; and the housing body includes the first wall, the second wall, the third wall, and the fourth wall integrally formed, and the two end caps are the fifth wall and the sixth wall, respectively.

In some embodiments, the battery cell further includes a third insulating member and a fourth insulating member, where the third insulating member is disposed between the fifth wall and the electrode assembly and abuts against the fifth wall; the fourth insulating member is disposed between the sixth wall and the electrode assembly and abuts against the sixth wall; and a maximum dimension of the third insulating member in the third direction is denoted as $e_3$, and a maximum dimension of the fourth insulating member in the third direction is denoted as $e_4$, satisfying: ($W_1$−a−1.6 mm)*($T_1$−b−1.6 mm)*($K_1$−c−$e_3$−$e_4$)/($W_1$*$T_1$*$K_1$)≥0.88.2 mm≤$e_3$≤10 mm, and 2 mm≤$e_4$≤10 mm. This increases space within the housing reserved for the electrode assembly, allowing for accommodation of a larger-volume electrode assembly and further enhancing the volumetric energy density of the battery cell.

In some embodiments, the battery cell further includes a third insulating member and a fourth insulating member, where the third insulating member is disposed between the fifth wall and the electrode assembly and abuts against the fifth wall; the fourth insulating member is disposed between the sixth wall and the electrode assembly and abuts against the sixth wall; and a maximum dimension of the third insulating member in the third direction is denoted as $e_3$, and a maximum dimension of the fourth insulating member in the third direction is denoted as $e_4$, satisfying: ($W_1$−a−4 mm)*($T_1$−b−4 mm)*($K_1$−c−$e_3$−$e_4$)/($W_1$*$T_1$*$K_1$)≥0.85.2 mm≤$e_3$≤10 mm, and 2 mm≤$e_4$≤10 mm. This increases space within the housing reserved for the electrode assembly, allowing for accommodation of a larger-volume electrode assembly and further enhancing the volumetric energy density of the battery cell.

In some embodiments, $W_1$≥$T_1$, the first direction is parallel to the height direction of the casing, the second direction is parallel to the width direction of the casing, and the third direction is parallel to the length direction of the casing. In a case that the housing body has end caps disposed at two ends and $W_1$≥$T_1$, the two end caps of the housing are arranged along the length direction of the casing, the first wall and the second wall of the housing are arranged along the height direction of the casing, and the third wall and the fourth wall of the housing are arranged opposite each other along the width direction of the casing, increasing the volume proportion of all battery cells within the battery compartment.

In some embodiments, a positive electrode material of the battery cell includes lithium-containing phosphate, and a capacity of the battery cell is denoted as C, satisfying: C≥350 Ah, and C/(($W_1$−a)*($T_1$−b)*($K_1$−c))≥118 Ah/L. In a case that the positive electrode material of the battery cell includes lithium-containing phosphate and C≥350 Ah, setting C/(($W_1$−a)*($T_1$−b)*($K_1$−c)) to 118 Ah/L or greater increases a volume proportion of an internal space of the housing of the battery cell, allowing a ratio of a volume of the internal space of the housing of the battery cell to a volume of the housing to be 0.9 or greater.

In some embodiments, a positive electrode material of the battery cell includes lithium transition metal oxide, and a capacity of the battery cell is denoted as C, satisfying: C≥650 Ah, and C/(($W_1$−a)*($T_1$−b)*($K_1$−c))≥190 Ah/L. In a case that the positive electrode material of the battery cell includes lithium transition metal oxide and C≥650 Ah, setting C/(($W_1$−a)*($T_1$−b)*($K_1$−c)) to 190 Ah/L or greater increases a volume proportion of an internal space of the housing of the battery cell, allowing a ratio of a volume of the internal space of the housing of the battery cell to a volume of the housing to be 0.9 or greater.

In some embodiments, the battery cell is a sodium-ion battery cell, and a capacity of the battery cell is denoted as C, satisfying: C≥260 Ah, and C/(($W_1$−a)*($T_1$−b)*($K_1$−c)) ≥87 Ah/L. In a case that the battery cell is a sodium-ion battery cell and C≥260 Ah, setting C/(($W_1$−a)*($T_1$−b)*($K_1$−c)) to be 87 Ah/L or greater increases a volume proportion of an internal space of the housing of the battery cell, allowing a ratio of a volume of the internal space of the housing of the battery cell to a volume of the housing to be 0.9 or greater.

BRIEF DESCRIPTION OF DRAWINGS

To more clearly illustrate technical solutions of embodiments of this application, drawings required for use in the embodiments are briefly introduced below. It should be understood that the following drawings illustrate only certain embodiments of this application and should not be regarded as limiting a scope. For a person of ordinary skill in the art, other related drawings can be obtained based on these drawings without creative effort.

Figure 1:
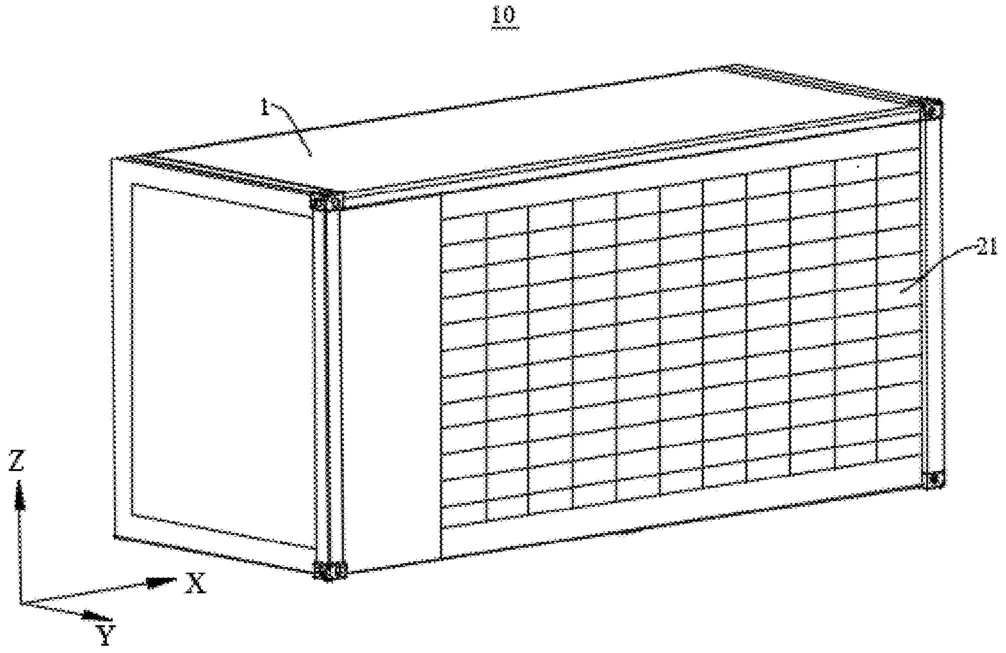
FIG. 1 is an isometric view of an energy storage device according to some embodiments of this application.

Reference signs: 1. casing; 11. battery compartment; 111. sub-compartment; 112. partition; 113. support member; 13. thermal management compartment; 15. main control compartment; 2. battery; 21. battery cell; 211. housing; 2111. housing body; 2112. end cap; 2112*a*. outer surface of end cap; 2112*b*. protrusion; 2113. first wall; 2114. second wall; 2115. third wall; 2116. fourth wall; 2117. fifth wall; 2118. sixth wall; 212. electrode terminal; 213. electrode assembly; 2131. tab; 214. first insulating member; 215. second insulating member; 216. third insulating member; 217. fourth insulating member; 22. battery box; 221. first portion; 222. second portion; 23. busbar component; 10. energy storage device; U. first direction; V. second direction; W. third direction; X. length direction of casing; Y width direction of casing; and Z. height direction of casing.

DESCRIPTION OF EMBODIMENTS

To make objectives, technical solutions, and advantages of embodiments of this application clearer, technical solutions in the embodiments of this application are clearly described below in conjunction with drawings in the embodiments of this application. Obviously, the described embodiments represent a portion of the embodiments of this application rather than all embodiments. Based on the embodiments in this application, all other embodiments obtained by a person of ordinary skill in the art without creative effort fall within a protection scope of this application.

Unless otherwise defined, all technical and scientific terms used in this application have the same meanings as commonly understood by a person skilled in a technical field to which this application pertains. Terms used in a specification of this application are solely for a purpose of describing specific embodiments and are not intended to limit this application. Terms “include” and “have” and any variations thereof in the specification, claims, and descriptions of the drawings of this application are intended to cover non-exclusive inclusion. In the specification, claims, or drawings of this application, terms “first”, “second”, and similar terms are intended to distinguish between different objects rather than to describe a specific order or primary-secondary relationship.

Reference to “embodiment” in this application means that a specific feature, structure, or characteristic described in conjunction with the embodiment may be included in at least one embodiment of this application. Appearances of this phrase in various locations in the specification do not necessarily refer to the same embodiment, nor are they independent or alternative embodiments mutually exclusive with other embodiments.

In the description of this application, it should be noted that unless explicitly specified and defined otherwise, terms “mount”, “connect”, “join”, and “attach” should be understood in their general senses. For example, they may refer to a fixed connection, a detachable connection, or an integral connection; a direct connection, an indirect connection via an intermediate medium, or an internal communication between two elements. For a person of ordinary skill in the art, specific meanings of the above terms in this application can be understood based on specific circumstances.

The term “and/or” in this application merely describes an associative relationship between associated objects, indicating three possible relationships. For example, A and/or B may indicate: A alone exists, A and B exist simultaneously, or B alone exists. Additionally, a character “/” in this application generally indicates an “or” relationship between contextually associated objects.

In embodiments of this application, identical reference signs denote identical components. For brevity, detailed descriptions of identical components are not repeated in different embodiments. It should be understood that thicknesses, lengths, widths, and other dimensions of various components in the embodiments of this application shown in the drawings, as well as overall thicknesses, lengths, widths, and other dimensions of an integrated device, are merely illustrative and should not constitute any limitation to this application.

The term “plurality” appearing in this application refers to two or more (including two).

In the embodiments of this application, the battery cell may be a secondary battery. The secondary battery refers to a battery cell that can be recharged to activate active materials for continuous use after the battery cell is discharged.

The battery cell includes, but is not limited to, a lithium-ion battery, a sodium-ion battery, a sodium-lithium-ion battery, a lithium metal battery, a sodium metal battery, a lithium-sulfur battery, a magnesium-ion battery, a nickel-hydrogen battery, a nickel-cadmium battery, or a lead-acid battery.

The battery cell typically includes an electrode assembly. The electrode assembly includes a positive electrode, a negative electrode, and a separator. During charging and discharging of the battery cell, active ions (such as lithium ions) intercalate and deintercalate back and forth between the positive electrode and the negative electrode. The separator is disposed between the positive electrode and the negative electrode, reducing the risk of short-circuiting between the positive and negative electrodes while allowing active ions to pass through.

In some embodiments, the positive electrode may be a positive electrode plate, and the positive electrode plate may include a positive electrode current collector and a positive electrode active material disposed on at least one surface of the positive electrode current collector.

In an example, the positive electrode current collector has two opposite surfaces in a thickness direction of the positive electrode current collector, and the positive electrode active material is disposed on either or both of the two opposite surfaces of the positive electrode current collector.

In an example, the positive electrode current collector may be a metal foil or a composite current collector. For example, the metal foil may use surface-silvered aluminum, surface-silvered stainless steel, stainless steel, copper, aluminum, nickel, carbon electrode, carbon, nickel, titanium, or the like. The composite current collector may include a polymer material matrix and a metal layer. The composite current collector may be formed by forming a metal material (aluminum, aluminum alloy, nickel, nickel alloy, titanium, titanium alloy, silver, silver alloy, or the like) on a polymer material matrix (such as a matrix of polypropylene, polyethylene terephthalate, polybutylene terephthalate, polystyrene, or polyethylene).

In an example, the positive electrode active material may include at least one of the following materials: lithium-containing phosphate, lithium transition metal oxide, and respective modified compounds thereof. However, this application is not limited to such materials, and other conventional well-known materials that can be used as positive electrode active materials for batteries may alternatively be used. These positive electrode active materials may be used alone or in a combination of two or more.

In some embodiments, the negative electrode may be a negative electrode plate, and the negative electrode plate may include a negative electrode current collector.

In an example, the negative electrode current collector may be a metal foil, a foamed metal, or a composite current collector. For example, the metal foil may use surface-silvered aluminum or stainless steel, stainless steel, copper, aluminum, nickel, carbon electrode, carbon, nickel, titanium, or the like. The foamed metal may be foamed nickel, foamed copper, foamed aluminum, foamed alloy, foamed carbon, or the like. The composite current collector may include a polymer material matrix and a metal layer. The composite current collector may be formed by forming a metal material (copper, copper alloy, nickel, nickel alloy, titanium, titanium alloy, silver, silver alloy, or the like) on a polymer material matrix (such as a matrix of polypropylene, polyethylene terephthalate, polybutylene terephthalate, polystyrene, or polyethylene).

In an example, the negative electrode plate may include a negative electrode current collector and a negative electrode active material disposed on at least one surface of the negative electrode current collector.

In an example, the negative electrode current collector has two opposite surfaces in a thickness direction of the negative electrode current collector, and the negative electrode active material is disposed on either or both of the two opposite surfaces of the negative electrode current collector.

In an example, the negative electrode active material may include at least one of materials well-known in the art for use as negative electrode active materials in battery cells. For example, the negative electrode active material may include at least one of the following materials: artificial graphite, natural graphite, soft carbon, hard carbon, silicon-based material, tin-based material, lithium titanate, and the like. The silicon-based material may be selected from at least one of elemental silicon, silicon-oxygen compound, silicon-carbon composite, silicon-nitrogen composite, or silicon alloy. The tin-based material may be selected from at least one of elemental tin, tin-oxygen compound, or tin alloy. However, this application is not limited to these materials, and other conventional materials that can be used as negative electrode active materials for batteries may also be used. These negative electrode active materials may be used alone or in a combination of two or more.

In some embodiments, a material of the positive electrode current collector may be aluminum, and a material of the negative electrode current collector may be copper.

In some embodiments, the electrode assembly is a wound structure.

In some embodiments, the electrode assembly is a laminated structure.

An energy storage device is a device integrating a plurality of battery cells within a casing, with the plurality of battery cells connected in series, parallel, or series-parallel to store electrical energy. The energy storage device can be used in a power system, storing surplus electrical energy during off-peak periods to supplement electricity consumption during peak periods.

For a typical energy storage device, a plurality of batteries are disposed within the casing, and the battery includes a battery box and a plurality of battery cells accommodated within the battery box. Space utilization of all batteries within a battery compartment of the casing is not high; and/or space utilization of all battery cells within the battery box of the battery is not high. This results in a low space utilization of all battery cells within the battery compartment of the energy storage device, leading to a low volumetric energy density of the energy storage device.

In view of this, an embodiment of this application provides an energy storage device in which a ratio of a sum of volumes of housings of all battery cells within a battery compartment to a volume of the battery compartment is set within a range of 0.4 to 0.95, to ensure that a volume proportion of all battery cells within the battery compartment is relatively large, thereby enhancing the space utilization of the battery compartment and enhancing the volumetric energy density of the energy storage device.

A specific structure of the energy storage device according to the embodiments of this application is described in detail below in conjunction with the drawings.

Figure 2:
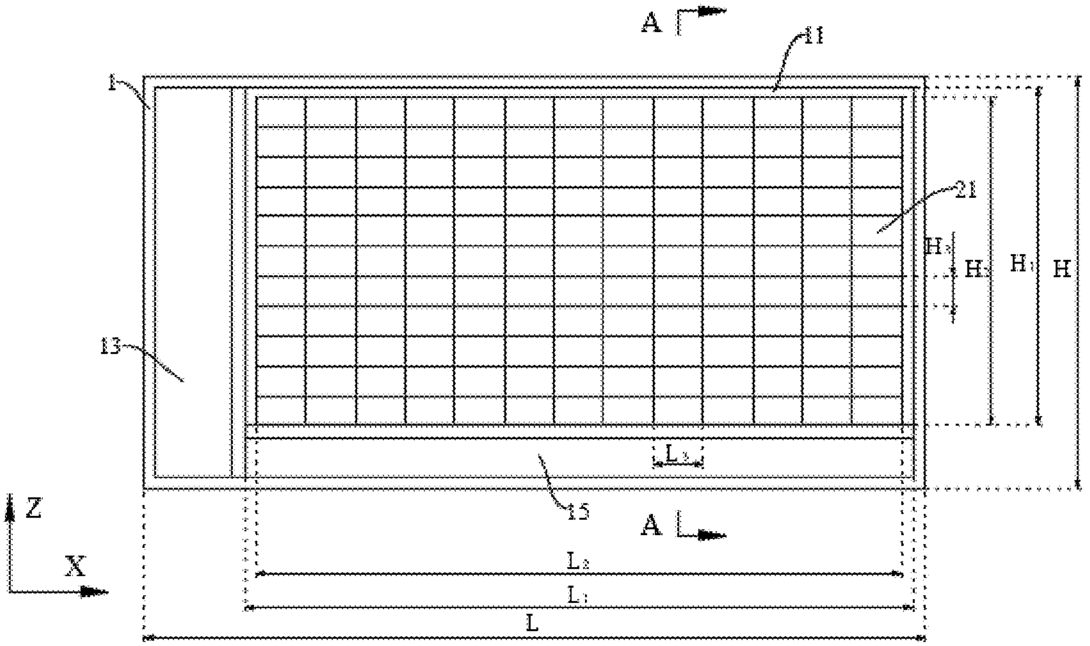
FIG. 2 is a schematic structural diagram of the energy storage device shown in FIG. 1.
Figure 3:
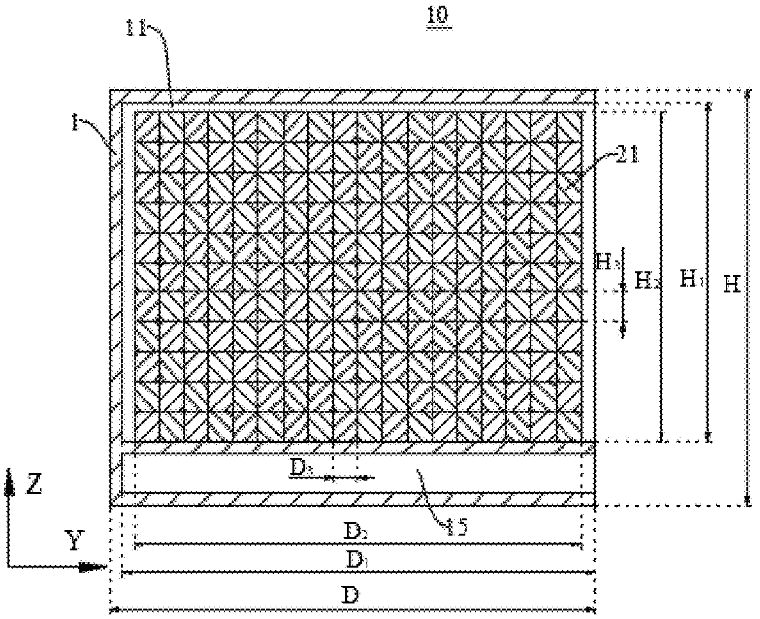
FIG. 3 is an A-A sectional view of the energy storage device shown in FIG. 2.
Figure 4:
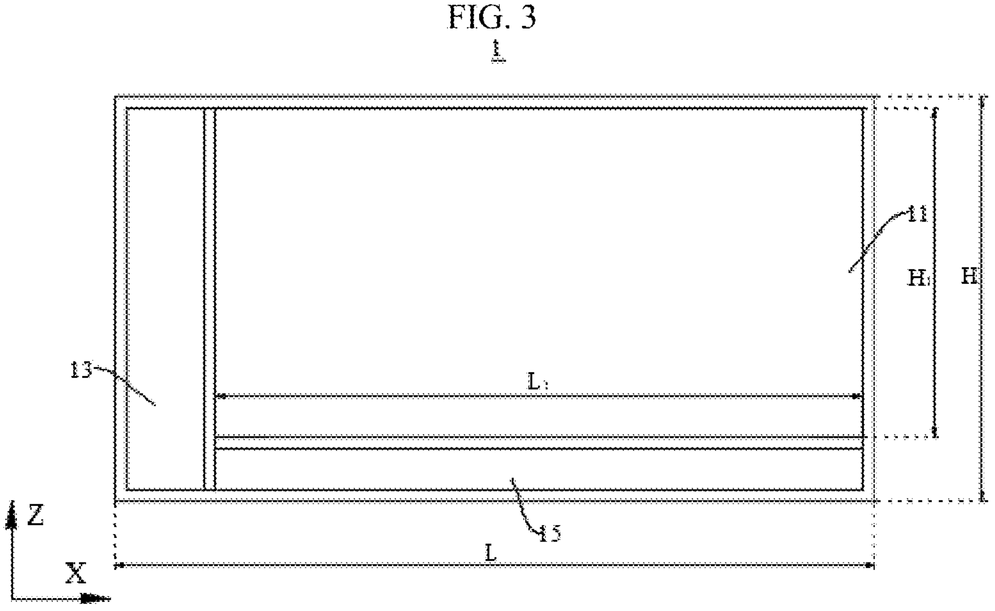
FIG. 4 is a schematic structural diagram of a casing shown in FIG. 2.

Referring to FIG. 1 to FIG. 4, FIG. 1 is an isometric view of an energy storage device 10 according to some embodiments of this application; FIG. 2 is a schematic structural diagram of the energy storage device 10 shown in FIG. 1; FIG. 3 is an A-A sectional view of the energy storage device 10 shown in FIG. 2; FIG. 4 is a schematic structural diagram of a casing 1 shown in FIG. 2. An embodiment of this application provides an energy storage device 10 including a casing 1 and a plurality of battery cells 21. The casing 1 includes a battery compartment 11, and the plurality of battery cells 21 are accommodated within the battery compartment 11. Each battery cell 21 includes a housing 211 and electrode terminals 212, the electrode terminals 212 being disposed on the housing 211. A volume of the battery compartment 11 is denoted as $V_1$, a sum of volumes of the housings 211 of all the battery cells 21 in the battery compartment 11 is denoted as $V_2$, and $0.4 \leq V_2/V_1 \leq 0.95$.

The casing 1 may be a standard component conforming to international standards established by the International Organization for Standardization ISO or a non-standard component. The casing 1 may also be referred to as a container, and the energy storage device 10 may also be referred to as an energy storage container. The casing 1 may be of various shapes, such as a cylindrical shape or a prismatic shape. The prismatic shape may be a triangular prism, a quadrangular prism, a pentagonal prism, a hexagonal prism, or the like. In an example, in FIG. 1 to FIG. 4, the casing 1 is a quadrangular prism. Specifically, the casing 1 has a rectangular parallelepiped shape.

The battery compartment 11 is a space within the casing 1 for accommodating the battery cells 21. The battery compartment 11 may accommodate only the battery cells 21 or may also accommodate other components besides the battery cells 21, such as a fire protection component, a thermal management component, and a partition. The fire protection component may include a pipe, a detector, and the like. The thermal management component may be a water-cooling plate. The partition may be a plate, a beam, or the like. After partitions are disposed within the battery compartment 11, the battery compartment 11 can be divided into a plurality of spaces, with each space used for accommodating the battery cells 21. The battery compartment 11 may be of various shapes, such as a cylindrical shape or a prismatic shape. In an example, in FIG. 1 to FIG. 4, the battery compartment 11 is a quadrangular prism, and specifically, the battery compartment 11 has a rectangular parallelepiped shape. Taking the battery compartment 11 being a rectangular parallelepiped for example, along a width direction Y of the casing, an opening is formed on at least one side of the battery compartment, and the battery cells 21 can enter the battery compartment 11 through the opening. A door leaf may be correspondingly disposed on a side of the battery compartment 11 with the opening, and the door leaf may be slidably connected or hingedly connected to the casing 1 to open or close the opening of the battery compartment 11 through sliding or rotation.

The volume of the battery compartment 11 can be measured in various ways. For a battery compartment 11 with a regular shape, taking the battery compartment 11 being a rectangular parallelepiped for example, a length, a width, and a height of the battery compartment 11 can be measured using a measuring tool, and the volume $V_1$ of the battery compartment 11 can be calculated based on the measured length, width, and height of the battery compartment 11. It can be understood that a product of the length, width, and height of the battery compartment 11 is $V_1$, where the measuring tool may be a ruler. It should be noted that if each wall surface of the battery compartment 11 is planar, the length, width, and height of the battery compartment 11 are measured based on each wall surface. If a protrusion or recess is formed on a wall surface of the battery compartment 11, the length, width, and height of the battery compartment 11 are measured based on a planar region of that wall surface. For a battery compartment 11 with an irregular shape, it is difficult to calculate the volume of the battery compartment 11 by measuring external dimensions of the battery compartment 11, and a filling method can be used instead to measure the volume of the battery compartment 11. The specific method is as follows: The battery compartment 11 is filled with plastic particles, where a material of the plastic particles may be PP (polypropylene, polypropylene) or PE (polyethylene, polyethylene), with a particle size of 0.5 mm to 1.5 mm and a density of 0.94 g/cm$^3$ to 0.96 g/cm$^3$. A total volume of the plastic particles within the battery compartment 11 is measured using a measuring container to obtain the volume $V_1$ of the battery compartment 11. Certainly, during measurement of the total volume of the plastic particles, a total weight of the plastic particles within the battery compartment 11 can also be measured using a weighing device, a total mass of the plastic particles within the battery compartment 11 can be calculated, and then the total volume of the plastic particles can be calculated based on the formula: total volume of plastic particles=total mass of plastic particles/density of plastic particles, thereby obtaining the volume $V_1$ of the battery compartment 11.

The casing 1 may only have the battery compartment 11 formed inside, or the casing 1 may also include spaces for accommodating other components besides the battery compartment 11. In an example, the casing 1 may further include a thermal management compartment 13 and a main control compartment 15. The thermal management compartment 13 may accommodate a water-cooling unit, where the water-cooling unit is configured to provide a fluid medium for the thermal management components. The main control compartment 15 may be configured to accommodate a main control unit, where the main control unit is configured for high-voltage control and communication of the plurality of battery cells 21 within the battery compartment 11. The casing 1 has a rectangular parallelepiped shape, the battery compartment 11 and the main control compartment 15 are arranged along a height direction Z of the casing, the thermal management compartment 13 may be located on a side of the battery compartment 11 along a length direction X of the casing, and along the height direction Z of the casing, the main control compartment 15 may be located at a bottom of the battery compartment 11. In other embodiments, the casing 1 may further include an electrical compartment, where the electrical compartment may be configured to accommodate a busbar unit, a power distribution unit, and a control unit. The busbar unit is configured to implement convergence of the plurality of battery cells 21, implementing a safe connection between the plurality of battery cells 21 and a direct current side of a power conversion system (PCS, Power Conversion System). The power distribution unit can draw electricity from a grid to supply power to an internal control system and auxiliary systems. The control unit may include a battery cell management unit, a fire control unit, and the like, and is configured to perform detection and management inside the energy storage device. The electrical compartment and the thermal management compartment 13 may be collectively located on one side of the battery compartment 11 along the length direction X of the casing, and the electrical compartment and the thermal management compartment 13 are arranged along a width direction Y of the casing.

In an example, the casing 1 may include a frame and a plurality of side panels, and the frame may be formed by connecting a plurality of beams. Along the length direction X of the casing, two side panels are respectively disposed on two sides of the frame; along the height direction Z of the casing, two side panels are respectively disposed on two sides of the frame; and along the width direction Y of the casing, one side panel is disposed on one side of the frame, and a door leaf is installed on the other side. The frame and the five side panels together define an internal space of the casing 1. Arranging a plurality of beams or panels within this space can divide the space into the battery compartment 11, the thermal management compartment 13, the main control compartment 15, and the electrical compartment.

In some embodiments of this application, the height direction Z of the casing is parallel to a gravitational direction of the casing 1, the height direction Z of the casing, the width direction Y of the casing, and the length direction X of the casing are pairwise perpendicular, and a length of the casing 1 is greater than or equal to a width of the casing 1.

The plurality of battery cells 21 within the battery compartment 11 may be connected in series, parallel, or series-parallel, where being connected in series-parallel means that some of the plurality of battery cells 21 are connected in series and others in parallel. The plurality of battery cells 21 may be directly accommodated within the battery compartment 11, or the plurality of battery cells 21 may be formed into a battery 2, and then one or more batteries 2 may be accommodated within the battery compartment 11. Taking the battery compartment 11 accommodating a plurality of batteries 2 for example, the plurality of battery cells 21 can be loaded into a battery box to form the battery 2, and then a plurality of batteries 2 can be loaded into the battery compartment 11, with the plurality of batteries 2 connected in series, parallel, or series-parallel.

The battery cell 21 is a smallest energy storage unit in the energy storage device 10. The battery cell 21 may be a cylindrical battery cell, a prismatic battery cell, a pouch battery cell, or a battery cell of another shape. The prismatic battery cell includes a square-shell battery cell, a blade-shaped battery cell, a multi-prismatic battery cell, or the like, where the multi-prismatic battery cell may be, for example, a pentagonal prism battery cell or a hexagonal prism battery cell.

Figure 5:
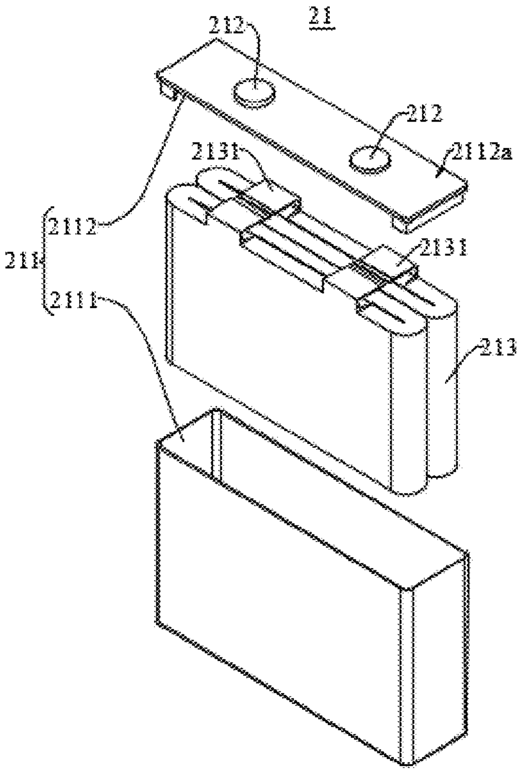
FIG. 5 is an exploded view of a battery cell according to some embodiments of this application.

Referring to FIG. 5, FIG. 5 is an exploded view of a battery cell 21 according to some embodiments of this application. The battery cell 21 further includes an electrode assembly 213. The electrode assembly 213 is accommodated within the housing 211, and the electrode terminals 212 are disposed on the housing 211, with the electrode terminals 212 electrically connected to the electrode assembly 213.

The housing 211 is a component configured to accommodate the electrode assembly 213, an electrolyte, and the like. The housing 211 may have a cylindrical shape or a prismatic shape. The prismatic shape includes a triangular prism, a quadrangular prism, a pentagonal prism, a hexagonal prism, or the like. The quadrangular prism includes an oblique quadrangular prism, a cuboid, or the like. The cuboid includes a rectangular parallelepiped, a cube, or the like. In an example, the housing 211 may include a housing body 2111 and an end cap 2112.

The housing body 2111 may be a hollow structure with an opening formed at one end, or a hollow structure with openings formed at two opposite ends. The housing body 2111 may be of various shapes, such as a cylindrical shape or a prismatic shape. The housing body 2111 may be made of various materials, such as copper, iron, aluminum, steel, aluminum alloy, or plastic.

The end cap 2112 is a component that closes the opening of the housing body 2111 to isolate an internal environment of the battery cell 21 from an external environment. The end cap 2112 and the housing body 2111 together define an accommodation space for accommodating the electrode assembly 213, the electrolyte, and other components. A shape of the end cap 2112 can be adapted to a shape of the housing body 2111. For example, if the housing body 2111 has a rectangular parallelepiped shape, the end cap 2112 may be a rectangular plate structure adapted to the housing body 2111; if the housing body 2111 has a cylindrical shape, the end cap 2112 may be a circular plate structure adapted to the housing body 2111. The end cap 2112 may also be made of various materials, such as copper, iron, aluminum, steel, aluminum alloy, or plastic. The material of the end cap 2112 may be the same as or different from the material of the housing body 2111.

In an embodiment that the housing body 2111 has an opening formed at one end, one end cap 2112 may be correspondingly disposed. In an embodiment that the housing body 2111 has openings formed at two opposite ends, two end caps 2112 may be correspondingly disposed, with the two end caps 2112 respectively closing the two openings of the housing body 2111, and the two end caps 2112 and the housing body 2111 together defining the accommodation space.

The electrode terminals 212 are components of the battery cell 21 for inputting or outputting electrical energy. The electrode terminals 212 are disposed on the housing 211 and are configured to be electrically connected to tabs 2131 of the electrode assembly 213. The electrode terminals 212 may be disposed on the housing body 2111 of the housing 211 or on the end cap 2112 of the housing 211. The electrode terminals 212 and the tabs 2131 may be directly connected, such as by welding the electrode terminals 212 directly to the tabs 2131, or indirectly connected via a current collecting member, where the current collecting member may be a metal conductor, such as copper, iron, aluminum, steel, or aluminum alloy.

In an example, as shown in FIG. 5, the housing body 2111 is a hollow structure with an opening formed at one end, the housing 211 includes only one end cap 2112, the end cap 2112 closes the opening of the housing body 2111, two electrode terminals 212 are disposed on the end cap 2112, a portion of the electrode terminals 212 protrudes from an outer surface 2112*a* of the end cap, a positive tab and a negative tab are formed at one end of the electrode assembly 213 facing the end cap 2112, and the positive tab and the negative tab are respectively electrically connected to the two electrode terminals 212.

Taking the housing 211 of the battery cell 21 being a rectangular parallelepiped and the battery compartment 11 being a rectangular parallelepiped for example, the housing 211 has a length direction, a width direction, and a height direction, a length of the housing 211 is greater than or equal to a width of the housing 211, and the electrode terminals 212 are located at one end of the housing 211 in the height direction. After the plurality of battery cells 21 are accommodated within the battery compartment 11, one of the length direction, width direction, and height direction of the housing 211 may be parallel to the length direction X of the casing, another may be parallel to the width direction Y of the casing, and the remaining one may be parallel to the height direction Z of the casing.

Volumes of the housings 211 of all battery cells 21 within the battery compartment 11 may be equal, for example, all battery cells 21 within the battery compartment 11 are battery cells 21 of the same specification, meaning that all battery cells 21 are identical in length, width, and height. Alternatively, volumes of the housings 211 of at least two of all battery cells 21 within the battery compartment 11 may differ, for example, all battery cells 21 within the battery compartment 11 are battery cells 21 of multiple specifications. $V_2$ is a sum of volumes of the housings 211 of all battery cells 21 within the battery compartment 11. If the volumes of the housings 211 of all battery cells 21 are equal, a volume of the housing 211 of one battery cell 21 can be measured, and $V_2$ can be obtained by multiplying the volume of the housing 211 of that battery cell 21 by the number of battery cells 21 within the battery compartment 11. If volumes of the housings 211 of at least two battery cells 21 within the battery compartment 11 differ, for example, if the housings 211 of all battery cells 21 within the battery compartment 11 are the housings 211 of two different volumes, a volume of the housing 211 of a first type of battery cell 21 can be measured, a first total volume can be obtained by multiplying the volume of the housing 211 of the first type of battery cell 21 by the number of the first type of battery cells 21 within the battery compartment 11, a volume of the housing 211 of a second type of battery cell 21 can be measured, a second total volume can be obtained by multiplying the volume of the housing 211 of the second type of battery cell 21 by the number of the second type of battery cells 21 within the battery compartment 11, and a sum of the first total volume and the second total volume is $V_2$.

A volume of the housing 211 of the battery cell 21 can be measured in various ways. For a housing 211 with a regular shape, taking the housing 211 being a rectangular parallelepiped for example, a length, a width, and a height of the housing 211 can be measured using a measuring tool, and a volume of the housing 211 can be calculated based on the measured length, width, and height of the housing 211. It can be understood that a product of the length, width, and height of the housing 211 is the volume of the housing 211, where the measuring tool may be a vernier caliper. For a housing 211 with an irregular shape, it is difficult to calculate a volume of the housing 211 by measuring external dimensions of the housing 211, and a liquid immersion method can be used instead to measure the volume of the housing 211. The specific method is as follows: Liquid is injected into a measuring container, and a volume value $X_1$ corresponding to a liquid level is recorded. The battery cell 21 is gradually immersed in the liquid until an outer surface 2112*a* of the end cap is flush with the liquid level, at which point the electrode terminals 212 on the end cap 2112 are not immersed in the liquid, a volume value $X_2$ corresponding to the liquid level at this point is recorded, and $X_2-X_1$ is the volume of the housing 211 of the battery cell 21.

Figure 6:
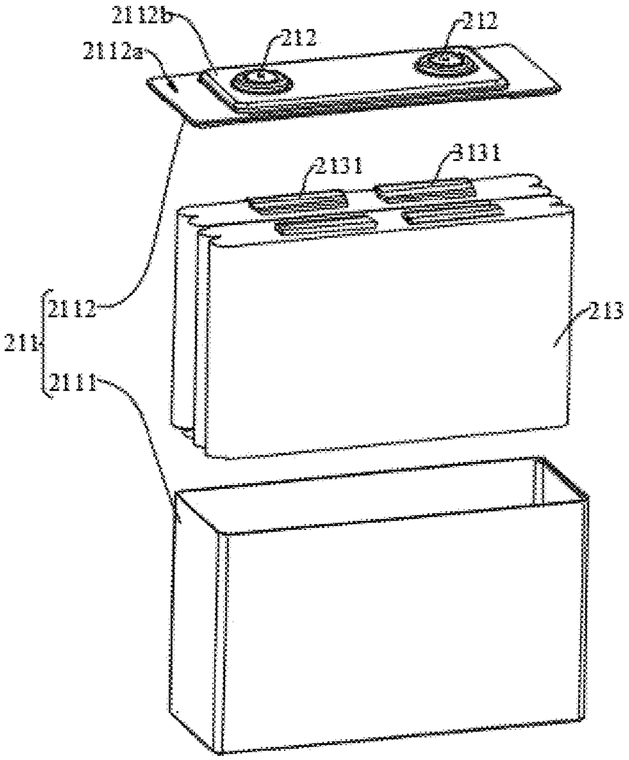
FIG. 6 is an exploded view of a battery cell according to some other embodiments of this application.

It should be noted that referring to FIG. 6, FIG. 6 is an exploded view of a battery cell 21 according to some other embodiments of this application. A protrusion 2112*b* protruding from the outer surface 2112*a* of the end cap is formed on the end cap 2112, and a volume of the housing 211 of the battery cell 21 does not include a volume of the protrusion 2112*b*. Taking the housing 211 of the battery cell 21 being a rectangular parallelepiped for example, during measurement of a height of the housing 211, a distance between an outer surface of a wall of the housing 211 opposite the end cap 2112 and the outer surface 2112*a* of the end cap is the height of the housing 211, and a height of the protrusion 2112*b* is not included in the height of the housing 211.

In this embodiment, $V_2/V_1$ may be any point value from 0.4, 0.43, 0.5, 0.55, 0.57, 0.62, 0.67, 0.71, 0.75, 0.81, 0.85, 0.92, 0.95, and the like, or a value in a range defined by any two of the above values.

In embodiments of this application, $V_2/V_1 \leq 0.95$ ensures that a volume proportion of all battery cells 21 within the battery compartment 11 is not excessively large, lowering the assembly precision requirement of the energy storage device 10 and effectively controlling the manufacturing costs of the energy storage device 10 within a reasonable range. $V_2/V_{1\geq 0.4}$ ensures that the volume proportion of all battery cells 21 within the battery compartment 11 is relatively large, thereby enhancing the space utilization of the battery compartment 11 and enhancing the volumetric energy density of the energy storage device 10.

Specific experimental data are provided below for detailed explanation.

In the experiment, a rectangular parallelepiped casing 1 is selected as the casing 1, with a length, a width, and a height of the casing 1 being 6.058 m, 2.438 m, and 2.896 m, respectively. The battery compartment 11 has a rectangular parallelepiped shape, square-shell battery cells are selected as the battery cells 21, all battery cells 21 within the battery compartment 11 have identical specifications and belong to the same chemical system, and a positive electrode material of the battery cells 21 includes lithium iron phosphate. Specific implementation data are provided in Table 1.

TABLE 1

| No. | Length of battery compartment (m) | Width of battery compartment (m) | Height of battery compartment (m) | $V_1$ ($m^3$) | $V_2$ ($m^3$) | $V_2/V_1$ | Volumetric energy density of energy storage device (Wh/L) |
|---|---|---|---|---|---|---|---|
| Example 1 | 5.166 | 2.254 | 2.19 | 25.5 | 10.2 | 0.4 | 79 |
| Example 2 | 5.166 | 2.254 | 2.19 | 25.5 | 10.965 | 0.43 | 90 |
| Example 3 | 5.166 | 2.254 | 2.19 | 25.5 | 13.26 | 0.52 | 115 |
| Example 4 | 5.166 | 2.254 | 2.19 | 25.5 | 13.77 | 0.54 | 133 |
| Example 5 | 5.166 | 2.254 | 2.19 | 25.5 | 15.81 | 0.62 | 158 |
| Example 6 | 5.166 | 2.254 | 2.19 | 25.5 | 17.085 | 0.67 | 176 |
| Example 7 | 5.166 | 2.254 | 2.19 | 25.5 | 18.105 | 0.71 | 190 |
| Example 8 | 5.166 | 2.254 | 2.19 | 25.5 | 19.125 | 0.75 | 204 |
| Example 9 | 5.166 | 2.254 | 2.19 | 25.5 | 20.655 | 0.81 | 226 |
| Example 10 | 5.166 | 2.254 | 2.19 | 25.5 | 21.675 | 0.85 | 241 |
| Example 11 | 5.166 | 2.254 | 2.19 | 25.5 | 23.46 | 0.92 | 266 |
| Example 12 | 5.166 | 2.254 | 2.19 | 25.5 | 24.225 | 0.95 | 280 |
| Comparative Example 1 | 5.166 | 2.254 | 2.19 | 25.5 | 7.65 | 0.3 | 43 |
| Comparative Example 2 | 5.166 | 2.254 | 2.19 | 25.5 | 8.925 | 0.35 | 62 |

According to Table 1 above, comparison between Examples 1 to 12 and Comparative Examples 1 and 2 reveals that when $V_2/V_1 \geq 0.4$, the volumetric energy density of the energy storage device 10 can be effectively enhanced.

In some embodiments, $0.5 \leq V_2/V_1 \leq 0.85$.

In this embodiment, $V_2/V_1$ may be any point value from 0.5, 0.53, 0.55, 0.57, 0.59, 0.62, 0.65, 0.67, 0.69, 0.71, 0.73, 0.75, 0.77, 0.79, 0.81, 0.83, 0.84, 0.85, and the like, or a value in a range defined by any two of the above values.

In this embodiment, $0.5 \leq V_2/V_1 \leq 0.85$ balances requirements for the volumetric energy density and cost effectiveness of the energy storage device 10, further reducing the manufacturing costs of the energy storage device 10 while enhancing the volumetric energy density of the energy storage device 10.

In some embodiments, $0.52 \leq V_2/V_1 \leq 0.75$.

In this embodiment, $V_2/V_1$ may be any point value from 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, and the like, or a value in a range defined by any two of the above values.

In this embodiment, $0.52 \leq V_2/V_1 \leq 0.75$ allows manufacturing costs of the energy storage device 10 to be controlled at a relatively low level while maintaining the volumetric energy density of the energy storage device 10 at a relatively high level.

In some embodiments, a volume of the housing body 2111 of each battery cell 21 is denoted as $V_3$, and the number of the battery cells 21 within the battery compartment 11 is denoted as $N_1$, satisfying $V_2=V_3*N_1$.

In an example, the housing body 2111 of the battery cell 21 has a rectangular parallelepiped shape, lengths of the housing bodies 2111 of all battery cells 21 are equal, widths of the housing bodies 2111 of all battery cells 21 are equal, and heights of the housing bodies 2111 of all battery cells 21 are equal, ensuring that volumes of the housings 211 of all battery cells 21 are equal.

$N_1$ is a positive integer greater than or equal to 2. In an example, $2000 \leq N_1 \leq 5000$.

In this embodiment, $V_2=V_3*N_1$ ensures that volumes of the housings 211 of all battery cells 21 within the battery compartment 11 are equal, allowing for the use of battery cells 21 of the same specification. On one hand, this improves assembly efficiency of the energy storage device 10; on the other hand, this reduces a probability of space wastage caused by differing specifications of the battery cells 21 within the battery compartment 11.

In some embodiments, $0.0001 \leq V_3/V_1 \leq 0.00025$.

$V_3/V_1$ may be any point value from 0.0001, 0.00012, 0.00015, 0.00017, 0.00019, 0.0002, 0.00021, 0.00023, 0.00025, and the like, or a value in a range defined by any two of the above values.

In the battery compartment 11, if the number of battery cells 21 is excessively large, space occupied by the housings 211 of the battery cells 21 and insulating members inside the housings 211 increases, reducing effective space of the battery compartment 11. In this embodiment, $V_3/V_1 \geq 0.0001$ ensures that a volume proportion of the housings 211 of the battery cells 21 within the battery compartment 11 is relatively large. Given a fixed volume of the battery compartment 11, this can reduce the number of battery cells 21, decreasing a probability of reduced usable effective space caused by an excessive number of battery cells 21 and enhancing the volumetric energy density of the energy storage device 10. $V_3/V_1 \leq 0.00025$ ensures that the volume proportion of the housings 211 of the battery cells 21 within the battery compartment 11 is not excessively large, reducing manufacturing difficulty and manufacturing costs of the battery cells 21.

In some embodiments, $0.00015 \leq V_3/V_1 \leq 0.0002$.

In this embodiment, $V_3/V_1$ may be any point value from 0.00015, 0.00016, 0.00017, 0.00018, 0.00019, 0.0002, and the like, or a value in a range defined by any two of the above values.

In this embodiment, $0.00015 \leq V_3/V_1 \leq 0.0002$ balances the volumetric energy density of the energy storage device 10, manufacturing difficulty of the battery cells 21, and cost-effectiveness requirements of the battery cells 21, enhancing the volumetric energy density of the energy storage device 10 while reducing manufacturing difficulty and manufacturing costs of the battery cells 21.

In some embodiments, $0.0026\ m^3 \leq V_3 \leq 0.008\ m^3$.

In this embodiment, $V_3$ may be any point value from 0.0026 $m^3$, 0.0028 $m^3$, 0.0031 $m^3$, 0.0035 $m^3$, 0.0038 $m^3$, 0.004 $m^3$, 0.0042 $m^3$, 0.0045 $m^3$, 0.0048 $m^3$, 0.005 $m^3$, 0.0052 $m^3$, 0.0055 $m^3$, 0.0058 $m^3$, 0.006 $m^3$, 0.0062 $m^3$, 0.0065 $m^3$, 0.0068 $m^3$, 0.007 $m^3$, 0.0072 $m^3$, 0.0073 $m^3$, 0.0075 $m^3$, 0.0078 $m^3$, 0.008 $m^3$, and the like, or a value in a range defined by any two of the above values.

In this embodiment, $0.0026\ m^3 \leq V_3 \leq 0.008\ m^3$ ensures that a volume of the housing 211 of the battery cell 21 is relatively large, preventing the number of battery cells 21 within the battery compartment 11 from being excessively large. Certainly, the volume of the housing 211 of the battery cell 21 is also not excessively large, further enhancing the volumetric energy density of the energy storage device 10 and reducing manufacturing costs of the battery cells 21.

In some embodiments, $0.004\ m^3 \leq V_3 \leq 0.006\ m^3$.

In this embodiment, $V_3$ may be any point value from 0.004 $m^3$, 0.0041 $m^3$, 0.0042 $m^3$, 0.0043 $m^3$, 0.0044 $m^3$, 0.0045 $m^3$, 0.0046 $m^3$, 0.0047 $m^3$, 0.0048 $m^3$, 0.0049 $m^3$, 0.005 $m^3$, 0.0051 $m^3$, 0.0052 $m^3$, 0.0053 $m^3$, 0.0054 $m^3$, 0.0055 $m^3$, 0.0056 $m^3$, 0.0057 $m^3$, 0.0058 $m^3$, 0.0059 $m^3$, 0.006 $m^3$, and the like, or a value in a range defined by any two of the above values.

In this embodiment, $0.004\ m^3 \leq V_3 \leq 0.006\ m^3$ allows the volumetric energy density of the energy storage device 10 to be controlled at a relatively high level while maintaining manufacturing costs of the battery cells 21 at a relatively low level.

In some embodiments, a volume of the casing 1 is denoted as V, satisfying $0.45 \leq V_1/V \leq 0.75$.

$V_1/V$ may be any point value from 0.45, 0.48, 0.5, 0.52, 0.55, 0.58, 0.6, 0.62, 0.65, 0.68, 0.7, 0.73, 0.75, and the like, or a value in a range defined by any two of the above values.

Taking the casing 1 being a rectangular parallelepiped for example, a length, a width, and a height of the casing 1 can be measured using a measuring tool, and a volume of the casing 1 can be calculated based on the measured length, width, and height of the casing 1. It can be understood that a product of the length, width, and height of the casing 1 is the volume V of the casing 1, where the measuring tool may be a ruler. It should be noted that if an outer surface of each wall of the casing 1 is planar, the length, width, and height of the casing 1 are measured based on the outer surface of each wall. If a protrusion or recess is formed on an outer surface of a wall of the casing 1, the length, width, and height of the casing 1 are measured based on a planar region of the outer surface of that wall.

In this embodiment, $V_1/V \geq 0.45$ ensures that a volume proportion of the battery compartment 11 within the volume of the casing 1 is relatively large, increasing usable effective space within the casing 1 and enhancing the volumetric energy density of the energy storage device 10. $V_1/V \leq 0.75$ ensures that the volume of the battery compartment 11 is not excessively large, allowing the energy storage device 10 to reserve more installation space for other components and reducing installation difficulty of other components. Other components may be a main control unit, a water-cooling unit, and the like.

In some embodiments, $0.55 \leq V_1/V \leq 0.65$.

In this embodiment, $V_1/V$ may be any point value from 0.55, 0.56, 0.57, 0.58, 0.59, 0.6, 0.61, 0.62, 0.63, 0.64, 0.65, and the like, or a value in a range defined by any two of the above values.

In this embodiment, $0.55 \leq V_1/V \leq 0.65$ balances the volumetric energy density of the energy storage device 10 and ease of installation of other components of the energy storage device 10.

In some embodiments, 20 $m^3 \leq V \leq 80$ $m^3$.

In this embodiment, V may be any point value from 20 $m^3$, 25 $m^3$, 30 $m^3$, $m^3$, 40 $m^3$, 45 $m^3$, 50 $m^3$, 55 $m^3$, 60 $m^3$, 65 $m^3$, 70 $m^3$, 75 $m^3$, 80 $m^3$, and the like, or a value in a range defined by any two of the above values.

In this embodiment, $V \geq 20$ $m^3$ ensures that the volume of the casing 1 is relatively large, meeting high energy requirements of the energy storage device 10 to store more electrical energy. $V \leq 80$ $m^3$ ensures that the volume of the casing 1 is not excessively large, facilitating handling and transportation of the energy storage device 10.

In some embodiments, 35 $m^3 \leq V \leq 50$ $m^3$.

In this embodiment, V may be any point value from 35 $m^3$, 36 $m^3$, 37 $m^3$, 38 $m^3$, 39 $m^3$, 40 $m^3$, 41 $m^3$, 42 $m^3$, 43 $m^3$, 44 $m^3$, 45 $m^3$, 46 $m^3$, 47 $m^3$, 48 $m^3$, 49 $m^3$, 50 $m^3$, and the like, or a value in a range defined by any two of the above values.

In this embodiment, 35 $m^3 \leq V \leq 50$ $m^3$ further balances the high energy requirements of the energy storage device 10 and the convenience of handling and transporting the energy storage device 10.

In some embodiments, referring further to FIG. 2, the battery compartment 11 accommodates a plurality of battery cells 21 arranged along the length direction X of the casing. Along the length direction X of the casing, a dimension of the battery compartment 11 is denoted as $L_1$, and a sum of dimensions of the housings 211 of the plurality of battery cells 21 arranged within the battery compartment 11 is denoted as $L_2$, satisfying $0.6 \leq L_2/L_1 \leq 0.95$.

The dimension of the battery compartment 11 along the length direction X of the casing may be a length of the battery compartment 11, and the dimension of the battery compartment 11 along the length direction X of the casing can be measured using a ruler. In an example, a length direction of the housing 211 of the battery cell 21 is parallel to the length direction X of the casing, and a sum of dimensions of the housings 211 of the plurality of battery cells 21 arranged within the battery compartment 11 along the length direction X of the casing is a sum of lengths of the housings 211 of the plurality of battery cells 21. A dimension of the battery cell 21 along the length direction X of the casing can be measured using a vernier caliper. Among the plurality of battery cells 21 arranged along the length direction X of the casing, two adjacent battery cells 21 may be in direct contact or may have an intermediate component disposed therebetween, such as a thermal management component or a thermal insulator.

It should be noted that in this embodiment, dimensions of the housings 211 of all battery cells 21 arranged along the length direction X of the casing within the battery compartment 11 may all be equal, or dimensions of at least two battery cells 21 may differ.

In this embodiment, $L_2/L_1$ may be any point value from 0.6, 0.65, 0.7, 0.75, 0.8, 0.85, 0.9, 0.95, and the like, or a value in a range defined by any two of the above values.

In this embodiment, $L_2/L_1 \geq 0.6$ ensures that a dimension proportion of the housings 211 of the plurality of battery cells 21 arranged along the length direction X of the casing within the battery compartment 11 is relatively large, fully utilizing space of the battery compartment 11 along the length direction X of the casing and reducing a gap between the housings 211 of two adjacent battery cells 21 along the length direction X of the casing. This helps to increase the volume proportion of the housings 211 of all battery cells 21 within the battery compartment 11 and enhance the volumetric energy density of the energy storage device 10. $L_2/L_1 \leq 0.95$ ensures that the battery compartment 11 has sufficient installation allowance along the length direction X of the casing for installing the plurality of battery cells 21, reducing installation difficulty of the battery cells 21.

In some embodiments, $0.75 \leq L_2/L_1 \leq 0.9$.

In this embodiment, $L_2/L_1$ may be any point value from 0.75, 0.76, 0.77, 0.78, 0.79, 0.8, 0.81, 0.82, 0.83, 0.84, 0.85, 0.86, 0.87, 0.88, 0.89, 0.9, and the like, or a value in a range defined by any two of the above values.

In this embodiment, $0.75 \leq L_2/L_1 \leq 0.9$ balances the volumetric energy density of the energy storage device 10 and the ease of installation of the battery cells 21 along the length direction X of the casing, enhancing the volumetric energy density of the energy storage device 10 while further reducing the installation difficulty of the battery cells 21 along the length direction X of the casing.

In some embodiments, along the length direction X of the casing, a dimension of the housing 211 of each of the battery cells 21 is denoted as $L_3$, and $N_2$ battery cells 21 are arranged within the battery compartment 11, satisfying $L_2$=*$N_2$.

$N_2$ is a positive integer greater than or equal to 2.

In this embodiment, $L_2=L_3*N_2$ ensures that dimensions of the housings 211 of the plurality of battery cells 21 along the length direction X of the casing are equal, effectively reducing a probability of space wastage caused by differing dimensions of the housings 211 of the battery cells 21 along the length direction X of the casing. During assembly, a plurality of battery cells 21 of the same specification can be used and arranged along the length direction X of the casing, enhancing assembly efficiency of the energy storage device 10 and reducing manufacturing costs of the energy storage device 10.

In some embodiments, $0.03 \leq L_3/L_1 \leq 0.12$.

$L_3/L_1$ may be any point value from 0.03, 0.04, 0.05, 0.06, 0.07, 0.08, 0.09, 0.1, 0.11, 0.12, and the like, or a value in a range defined by any two of the above values.

In this embodiment, $L_3/L_1 \geq 0.03$ ensures that a dimension proportion of the housings 211 of the battery cells 21 within the battery compartment 11 along the length direction X of the casing is relatively large. Given a fixed dimension of the battery compartment 11 along the length direction X of the casing, this can reduce the number of battery cells 21 accommodated within the battery compartment 11 along the length direction X of the casing, decreasing a probability of reduced usable effective space caused by an excessive number of battery cells 21 and enhancing the volumetric energy density of the energy storage device 10. $L_3/L_1 \leq 0.12$ ensures that the dimension proportion of the housings 211 of the battery cells 21 within the battery compartment 11 along the length direction X of the casing is not excessively large, effectively reducing manufacturing difficulty and manufacturing costs of the battery cells 21.

In some embodiments, $0.055 \le L_3/L_1 \le 0.09$.

In this embodiment, $L_3/L_1$ may be any point value from 0.055, 0.06, 0.065, 0.07, 0.075, 0.08, 0.085, 0.09, and the like, or a value in a range defined by any two of the above values.

In this embodiment, $0.055 \le L_3/L_1 \le 0.09$ further enhances the volumetric energy density of the energy storage device 10 and reduces manufacturing costs of the battery cells 21.

In some embodiments, 0.17 m$\le L_{3 \le 0.6}$ m.

In this embodiment, $L_3$ may be any point value from 0.17 m, 0.2 m, 0.25 m, 0.3 m, 0.35 m, 0.4 m, 0.45 m, 0.5 m, 0.55 m, 0.6 m, and the like, or a value in a range defined by any two of the above values.

In this embodiment, $L_3 \ge 0.17$ m ensures that a dimension of the housing 211 of each battery cell 21 along the length direction X of the casing is relatively large, improving a dimension proportion of the housings 211 of the battery cells 21 within the battery compartment 11 along the length direction X of the casing and enhancing the volumetric energy density of the energy storage device 10. $L_3 \le 0.6$ m ensures that the dimension of the housing 211 of each battery cell 21 along the length direction X of the casing is not excessively large, effectively reducing manufacturing difficulty and manufacturing costs of the battery cells 21.

In some embodiments, 0.2 m$\le L_3 \le$0.45 m.

In this embodiment, $L_3$ may be any point value from 0.2 m, 0.23 m, 0.25 m, 0.28 m, 0.3 m, 0.33 m, 0.35 m, 0.38 m, 0.4 m, 0.43 m, 0.45 m, and the like, or a value in a range defined by any two of the above values.

In this embodiment, this further enhances the volumetric energy density of the energy storage device 10 and reduces manufacturing costs of the battery cells 21.

In some embodiments, along the length direction X of the casing, a dimension of the casing 1 is denoted as L, satisfying $0.65 \le L_1/L \le 0.95$.

The dimension of the casing 1 along the length direction is a length of the casing 1, and the length of the casing 1 can be measured using a ruler.

In this embodiment, $L_1/L$ may be any point value from 0.65, 0.7, 0.75, 0.8, 0.85, 0.95, and the like, or a value in a range defined by any two of the above values.

$L_1/L \ge 0.65$ ensures that a dimension proportion of the battery compartment 11 within the casing 1 along the length direction X of the casing is relatively large, increasing a dimension of the battery compartment 11 along the length direction X of the casing to provide more space for the battery cells 21, thereby enhancing the volumetric energy density of the energy storage device 10. $L_1/L \le 0.95$ ensures sufficient residual space of the casing 1 along the length direction not occupied by the battery compartment 11, ensuring adequate structural strength of the casing 1.

In some embodiments, $0.75 \le L_1/L \le 0.9$.

In this embodiment, $L_1/L$ may be any point value from 0.75, 0.76, 0.77, 0.78, 0.79, 0.8, 0.81, 0.82, 0.83, 0.84, 0.85, 0.86, 0.87, 0.88, 0.89, 0.9, and the like, or a value in a range defined by any two of the above values.

In this embodiment, $0.75 \le L_1/L \le 0.9$ balances requirements for the volumetric energy density of the energy storage device 10 and structural strength of the casing 1, enhancing the volumetric energy density of the energy storage device 10 while further enhancing the structural strength of the casing 1.

In some embodiments, 3 m$\le L \le$9 m.

In this embodiment, L may be any point value from 3 m, 3.5 m, 4 m, 4.5 m, m, 5.5 m, 6 m, 6.5 m, 7 m, 7.5 m, 8 m, 8.5 m, 9 m, and the like, or a value in a range defined by any two of the above values.

In this embodiment, $L \ge 3$ m ensures that the dimension of the casing 1 along the length direction is relatively large, allowing for a large dimension of the battery compartment 11 along the length direction X of the casing. This helps to increase the dimension proportion of the battery compartment 11 within the casing 1 along the length direction X of the casing and enhance the volumetric energy density of the energy storage device 10. $L \le 9$ m ensures that the dimension of the casing 1 along the length direction is not excessively large, facilitating handling and transportation of the energy storage device 10.

In some embodiments, 5 m$\le L \le$7 m.

L may be any point value from 5 m, 5.1 m, 5.2 m, 5.3 m, 5.4 m, 5.5 m, 5.6 m, 5.7 m, 5.8 m, 5.9 m, 6 m, 6.1 m, 6.2 m, 6.3 m, 6.4 m, 6.5 m, 6.6 m, 6.7 m, 6.8 m, 6.9 m, 7 m, and the like, or a value in a range defined by any two of the above values.

In this embodiment, 5 m$\le L \le$7 m further balances the volumetric energy density of the energy storage device 10 and the convenience of handling and transporting the energy storage device 10.

In some embodiments, referring further to FIG. 3, the battery compartment 11 accommodates a plurality of battery cells 21 arranged along the width direction Y of the casing; and along the width direction Y of the casing, a dimension of the battery compartment 11 is denoted as $D_1$, and a sum of dimensions of the housings 211 of the plurality of battery cells 21 arranged within the battery compartment 11 is denoted as $D_2$, satisfying $0.6 \le D_2/D_1 \le 0.95$.

The dimension of the battery compartment 11 along the width direction Y of the casing may be a width of the battery compartment 11, and the dimension of the battery compartment 11 along the width direction Y of the casing can be measured using a ruler. In an example, a width direction of the housing 211 of the battery cell 21 is parallel to the width direction Y of the casing, and a sum of dimensions of the housings 211 of the plurality of battery cells 21 arranged within the battery compartment 11 along the width direction Y of the casing is a sum of widths of the housings 211 of the plurality of battery cells 21. A dimension of the battery cell 21 along the width direction Y of the casing can be measured using a vernier caliper. Among the plurality of battery cells 21 arranged along the width direction Y of the casing, two adjacent battery cells 21 may be in direct contact or may have an intermediate component disposed therebetween, such as a thermal management component or a thermal insulator.

It should be noted that in this embodiment, dimensions of the housings 211 of all battery cells 21 arranged along the width direction Y of the casing within the battery compartment 11 may all be equal, or dimensions of at least two battery cells 21 may differ.

In this embodiment, $D_2/D_1$ may be any point value from 0.6, 0.65, 0.7, 0.75, 0.8, 0.85, 0.9, 0.95, and the like, or a value in a range defined by any two of the above values.

In this embodiment, $D_2/D_1 \ge 0.6$ ensures that a dimension proportion of the housings 211 of the plurality of battery cells 21 arranged along the width direction of the casing 1 within the battery compartment 11 is relatively large, fully utilizing space of the battery compartment 11 along the width direction Y of the casing and reducing a gap between the housings 211 of two adjacent battery cells 21 along the width direction Y of the casing. This helps to increase the volume proportion of the housings 211 of all battery cells 21 within the battery compartment 11 and enhance the volumetric energy density of the energy storage device 10. $D_2/D_1 \leq 0.95$ ensures that the battery compartment 11 has sufficient installation allowance along the width direction Y of the casing for installing the plurality of battery cells 21, reducing installation difficulty of the battery cells 21.

In some embodiments, $0.75 \leq D_2/D_1 \leq 0.9$.

In this embodiment, $D_2/D_1$ may be any point value from 0.75, 0.76, 0.77, 0.78, 0.79, 0.80, 0.81, 0.82, 0.83, 0.84, 0.85, 0.86, 0.87, 0.88, 0.89, 0.9, and the like, or a value in a range defined by any two of the above values.

In this embodiment, $0.75 \leq D_2/D_1 \leq 0.9$ balances the volumetric energy density of the energy storage device 10 and the ease of installation of the battery cells 21 along the width direction Y of the casing, enhancing the volumetric energy density of the energy storage device 10 while further reducing the installation difficulty of the battery cells 21 along the width direction Y of the casing.

In some embodiments, along the width direction Y of the casing, a dimension of the housing 211 of each of the battery cells 21 is denoted as $D_3$, and $N_3$ battery cells 21 are arranged within the battery compartment 11, satisfying $D_2 = D_3 * N_3$.

$N_3$ is a positive integer greater than or equal to 2.

In this embodiment, $D_2 = D_3 * N_3$ ensures that dimensions of the housings 211 of the plurality of battery cells 21 along the width direction Y of the casing are equal, effectively reducing a probability of space wastage caused by differing dimensions of the housings 211 of the battery cells 21 along the width direction Y of the casing. During assembly, a plurality of battery cells 21 of the same specification can be used and arranged along the width direction Y of the casing, enhancing assembly efficiency of the energy storage device 10 and reducing manufacturing costs of the energy storage device 10.

In some embodiments, $0.02 \leq D_3/D_1 \leq 0.05$.

$D_3/D_1$ may be any point value from 0.02, 0.025, 0.03, 0.035, 0.04, 0.045, 0.05, and the like, or a value in a range defined by any two of the above values.

In this embodiment, $D_3/D_1 \geq 0.02$ ensures that a dimension proportion of the housings 211 of the battery cells 21 within the battery compartment 11 along the width direction Y of the casing is relatively large. Given a fixed dimension of the battery compartment 11 along the width direction Y of the casing, this can reduce the number of battery cells 21 accommodated within the battery compartment 11 along the width direction Y of the casing, decreasing a probability of reduced usable effective space caused by an excessive number of battery cells 21 and enhancing the volumetric energy density of the energy storage device 10. $D_3/D_1 \leq 0.05$ ensures that the dimension proportion of the housings 211 of the battery cells 21 within the battery compartment 11 along the width direction Y of the casing is not excessively large, effectively reducing manufacturing difficulty and manufacturing costs of the battery cells 21.

In some embodiments, $0.032 \leq D_3/D_1 \leq 0.04$.

$D_3/D_1$ may be any point value from 0.032, 0.033, 0.034, 0.035, 0.036, 0.037, 0.038, 0.039, 0.04, and the like, or a value in a range defined by any two of the above values.

In this embodiment, $0.032 \leq D_3/D_1 \leq 0.04$ further enhances the volumetric energy density of the energy storage device 10 and reduces manufacturing costs of the battery cells 21.

In some embodiments, $0.04\ m \leq D_3 \leq 0.12\ m$.

$D_3$ may be any point value from 0.04 m, 0.05 m, 0.06 m, 0.07 m, 0.08 m, 0.09 m, 0.1 m, 0.11 m, 0.12 m, and the like, or a value in a range defined by any two of the above values.

In this embodiment, $D_3 \geq 0.04$ m ensures that a dimension of the housing 211 of each battery cell 21 along the width direction Y of the casing is relatively large, improving a dimension proportion of the housings 211 of the battery cells 21 within the battery compartment 11 along the width direction Y of the casing and enhancing the volumetric energy density of the energy storage device 10. $D_3 \leq 0.12$ m ensures that the dimension of the housing 211 of each battery cell 21 along the width direction Y of the casing is not excessively large, effectively reducing manufacturing difficulty and manufacturing costs of the battery cells 21.

In some embodiments, $0.06\ m \leq D_3 \leq 0.08\ m$.

In this embodiment, $D_3$ may be any point value from 0.06 m, 0.061 m, 0.062 m, 0.063 m, 0.064 m, 0.065 m, 0.066 m, 0.067 m, 0.068 m, 0.069 m, 0.07 m, 0.071 m, 0.072 m, 0.073 m, 0.074 m, 0.075 m, 0.076 m, 0.077 m, 0.078 m, 0.079 m, 0.08 m, and the like, or a value in a range defined by any two of the above values.

In this embodiment, $0.06\ m \leq D_3 \leq 0.08$ m further enhances the volumetric energy density of the energy storage device 10 and reduces manufacturing costs of the battery cells 21.

In some embodiments, along the width direction Y of the casing, a dimension of the casing 1 is denoted as D, satisfying $0.65 \leq D_1/D \leq 0.99$.

The dimension of the casing 1 along the width direction is a width of the casing 1, and the width of the casing 1 can be measured using a ruler.

In this embodiment, $D_1/D$ may be any point value from 0.65, 0.7, 0.75, 0.8, 0.85, 0.9, 0.95, 0.99, and the like, or a value in a range defined by any two of the above values.

In this embodiment, $D_1/D \geq 0.65$ ensures that a dimension proportion of the battery compartment 11 within the casing 1 along the width direction Y of the casing is relatively large, increasing a dimension of the battery compartment 11 along the width direction Y of the casing to provide more space for the battery cells 21, thereby enhancing the volumetric energy density of the energy storage device 10. $D_1/D \leq 0.95$ ensures sufficient residual space of the casing 1 along the width direction not occupied by the battery compartment 11, ensuring adequate structural strength of the casing 1.

In some embodiments, $0.75 \leq D_1/D \leq 0.92$.

In this embodiment, $D_1/D$ may be any point value from 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, and the like, or a value in a range defined by any two of the above values.

In this embodiment, $0.75 \leq D_1/D \leq 0.92$ balances requirements for the volumetric energy density of the energy storage device 10 and structural strength of the casing 1, enhancing the volumetric energy density of the energy storage device 10 while further enhancing the structural strength of the casing 1.

In some embodiments, $1.5\ m \leq D \leq 3.5$ m.

D may be any point value from 1.5 m, 1.8 m, 2 m, 2.3 m, 2.5 m, 2.8 m, 3 m, 3.2 m, 3.5 m, and the like, or a value in a range defined by any two of the above values.

In this embodiment, $D \geq 1.5$ m ensures that the dimension of the casing 1 along the width direction is relatively large, allowing for a large dimension of the battery compartment 11 along the width direction Y of the casing. This helps to increase the dimension proportion of the battery compartment 11 within the casing 1 along the width direction Y of the casing and enhance the volumetric energy density of the energy storage device 10. L K D≤3.5 m ensures that the dimension of the casing 1 along the width direction is not excessively large, facilitating handling and transportation of the energy storage device 10.

In some embodiments, 2 m≤D≤3 m.

In this embodiment, D may be any point value from 2 m, 2.1 m, 2.2 m, 2.3 m, 2.4 m, 2.5 m, 2.6 m, 2.7 m, 2.8 m, 2.9 m, 3 m, and the like, or a value in a range defined by any two of the above values.

In this embodiment, 2 m≤D≤3 m further balances the volumetric energy density of the energy storage device 10 and the convenience of handling and transporting the energy storage device 10.

In some embodiments, referring still to FIG. 2 and FIG. 3, the battery compartment 11 accommodates a plurality of battery cells 21 arranged along the height direction Z of the casing; and along the height direction Z of the casing, a dimension of the battery compartment 11 is denoted as $H_1$, and a sum of dimensions of the housings 211 of the plurality of battery cells 21 arranged within the battery compartment 11 is denoted as $H_2$, satisfying $0.6 \leq H_2/H_1 \leq 0.95$.

The dimension of the battery compartment 11 along the height direction Z of the casing may be a height of the battery compartment 11, and the dimension of the battery compartment 11 along the height direction Z of the casing can be measured using a ruler. In an example, a height direction of the housing 211 of the battery cell 21 is parallel to the height direction Z of the casing, and a sum of dimensions of the housings 211 of the plurality of battery cells 21 arranged within the battery compartment 11 along the height direction Z of the casing is a sum of heights of the housings 211 of the plurality of battery cells 21. A dimension of the battery cell 21 along the height direction Z of the casing can be measured using a vernier caliper. Among the plurality of battery cells 21 arranged along the height direction Z of the casing, two adjacent battery cells 21 may be in direct contact or may have an intermediate component disposed therebetween, such as a thermal management component or a thermal insulator.

It should be noted that in this embodiment, dimensions of the housings 211 of all battery cells 21 arranged along the height direction Z of the casing within the battery compartment 11 may all be equal, or dimensions of at least two battery cells 21 may differ.

In this embodiment, $H_2/H_1$ may be any point value from 0.6, 0.65, 0.7, 0.75, 0.8, 0.85, 0.9, 0.95, and the like, or a value in a range defined by any two of the above values.

In this embodiment, $H_2/H_1 \geq 0.6$ ensures that a dimension proportion of the housings 211 of the plurality of battery cells 21 arranged along the height direction Z of the casing 1 within the battery compartment 11 is relatively large, fully utilizing space of the battery compartment 11 along the height direction Z of the casing and reducing a gap between the housings 211 of two adjacent battery cells 21 along the height direction Z of the casing. This helps to increase the volume proportion of the housings 211 of all battery cells 21 within the battery compartment 11 and enhance the volumetric energy density of the energy storage device 10. $H_2/H_1 \leq 0.95$ ensures that the battery compartment 11 has sufficient installation allowance along the height direction Z of the casing for installing the plurality of battery cells 21, reducing installation difficulty of the battery cells 21.

In some embodiments, $0.7 \leq H_2/H_1 \leq 0.9$.

In this embodiment, $H_2/H_1$ may be any point value from 0.7, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.9, and the like, or a value in a range defined by any two of the above values.

In this embodiment, $0.7 \leq H_2/H_1 \leq 0.9$ balances the volumetric energy density of the energy storage device 10 and the ease of installation of the battery cells 21 along the height direction Z of the casing, enhancing the volumetric energy density of the energy storage device 10 while further reducing the installation difficulty of the battery cells 21 along the height direction Z of the casing.

In some embodiments, along the height direction Z of the casing, a dimension of the housing 211 of each of the battery cells 21 is denoted as $H_3$, and $N_4$ battery cells 21 are arranged within the battery compartment 11, satisfying $H_2 = H_3 * N_4$.

$N_4$ is a positive integer greater than or equal to 2.

In this embodiment, $H_2 = H_3 * N_4$ ensures that dimensions of the housings 211 of the plurality of battery cells 21 along the height direction Z of the casing are equal, effectively reducing a probability of space wastage caused by differing dimensions of the housings 211 of the battery cells 21 along the height direction Z of the casing. During assembly, a plurality of battery cells 21 of the same specification can be used and arranged along the height direction Z of the casing, enhancing assembly efficiency of the energy storage device 10 and reducing manufacturing costs of the energy storage device 10.

In some embodiments, $0.07 \leq H_3/H_1 \leq 0.12$.

$H_3/H_1$ may be any point value from 0.07, 0.075, 0.08, 0.085, 0.09, 0.095, 0.1, 0.11, 0.12, and the like, or a value in a range defined by any two of the above values.

In this embodiment, $H_3/H_1 \geq 0.07$ ensures that a dimension proportion of the housings 211 of the battery cells 21 within the battery compartment 11 along the height direction Z of the casing is relatively large. Given a fixed dimension of the battery compartment 11 along the height direction Z of the casing, this can reduce the number of battery cells 21 accommodated within the battery compartment 11 along the height direction Z of the casing, decreasing a probability of reduced usable effective space caused by an excessive number of battery cells 21 and enhancing the volumetric energy density of the energy storage device 10. $H_3/H_1 \leq 0.12$ ensures that the dimension proportion of the housings 211 of the battery cells 21 within the battery compartment 11 along the height direction Z of the casing is not excessively large, effectively reducing manufacturing difficulty and manufacturing costs of the battery cells 21.

In some embodiments, $0.08 \leq H_3/H_1 \leq 0.1$.

In this embodiment, $H_3/H_1$ may be any point value from 0.08, 0.081, 0.082, 0.083, 0.084, 0.085, 0.086, 0.087, 0.088, 0.089, 0.09, 0.091, 0.092, 0.093, 0.094, 0.095, 0.096, 0.097, 0.098, 0.099, 0.1, and the like, or a value in a range defined by any two of the above values.

In this embodiment, $0.08 \leq H_3/H_1 \leq 0.1$ further enhances the volumetric energy density of the energy storage device 10 and reduces manufacturing costs of the battery cells 21.

In some embodiments, 0.17 m≤$H_3$≤0.6 m.

In this embodiment, $H_3$ may be any point value from 0.17 m, 0.2 m, 0.25 m, 0.3 m, 0.35 m, 0.4 m, 0.45 m, 0.5 m, 0.55 m, 0.6 m, and the like, or a value in a range defined by any two of the above values.

In this embodiment, $H_3 \geq 0.17$ m ensures that a dimension of the housing 211 of each battery cell 21 along the height direction Z of the casing is relatively large, improving a dimension proportion of the housings 211 of the battery cells 21 within the battery compartment 11 along the height direction Z of the casing and enhancing the volumetric energy density of the energy storage device 10. $H_3 \leq 0.6$ m ensures that the dimension of the housing 211 of each battery cell 21 along the height direction Z of the casing is not excessively large, effectively reducing manufacturing difficulty and manufacturing costs of the battery cells 21.

In some embodiments, 0.2 m$\leq H_3 \leq$0.45 m.

In this embodiment, $H_3$ may be any point value from 0.2 m, 0.23 m, 0.25 m, 0.28 m, 0.3 m, 0.33 m, 0.35 m, 0.38 m, 0.4 m, 0.43 m, 0.45 m, and the like, or a value in a range defined by any two of the above values.

In this embodiment, 0.2 m$\leq H_3 \leq$0.45 m further enhances the volumetric energy density of the energy storage device 10 and reduces manufacturing costs of the battery cells 21.

In some embodiments, along the height direction Z of the casing, a dimension of the casing 1 is denoted as H, satisfying $0.55 \leq H_1/H \leq 0.85$.

The dimension of the casing 1 along the height direction is a height of the casing 1, and the height of the casing 1 can be measured using a ruler.

In this embodiment, $H_1/H$ may be any point value from 0.55, 0.6, 0.65, 0.7, 0.75, 0.8, 0.85, and the like, or a value in a range defined by any two of the above values.

In this embodiment, $H_1/H \geq 0.55$ ensures that a dimension proportion of the battery compartment 11 within the casing 1 along the height direction Z of the casing is relatively large, increasing a dimension of the battery compartment 11 along the height direction Z of the casing to provide more space for the battery cells 21, thereby enhancing the volumetric energy density of the energy storage device 10. $H_1/H \leq 0.85$ ensures sufficient residual space of the casing 1 along the height direction not occupied by the battery compartment 11, ensuring adequate structural strength of the casing 1.

In some embodiments, $0.65 \leq H_1/H \leq 0.78$.

In this embodiment, $H_1/H$ may be any point value from 0.65, 0.66, 0.67, 0.68, 0.69, 0.7, 0.71, 0.72, 0.73, 0.74, 0.75, 0.76, 0.77, 0.78, and the like, or a value in a range defined by any two of the above values.

In this embodiment, $0.65 \leq H_1/H \leq 0.78$ balances requirements for the volumetric energy density of the energy storage device 10 and structural strength of the casing 1, enhancing the volumetric energy density of the energy storage device 10 while further enhancing the structural strength of the casing 1.

In some embodiments, 1.5 m$\leq H \leq$3.5 m.

In this embodiment, H may be any point value from 1.5 m, 1.8 m, 2 m, 2.3 m, 2.5 m, 2.8 m, 3 m, 3.2 m, 3.5 m, and the like, or a value in a range defined by any two of the above values.

In this embodiment, $H \geq 1.5$ m ensures that the dimension of the casing 1 along the height direction is relatively large, allowing for a large dimension of the battery compartment 11 along the height direction Z of the casing. This helps to increase the dimension proportion of the battery compartment 11 within the casing 1 along the height direction Z of the casing and enhance the volumetric energy density of the energy storage device 10. $H \leq 3.5$ m ensures that the dimension of the casing 1 along the height direction is not excessively large, facilitating handling and transportation of the energy storage device 10.

In some embodiments, 2 m$\leq H \leq$3 m.

In this embodiment, H may be any point value from 2 m, 2.1 m, 2.2 m, 2.3 m, 2.4 m, 2.5 m, 2.6 m, 2.7 m, 2.8 m, 2.9 m, 3 m, and the like, or a value in a range defined by any two of the above values.

In this embodiment, 2 m K H≤3 m further balances the volumetric energy density of the energy storage device 10 and the convenience of handling and transporting the energy storage device 10.

Figure 7:
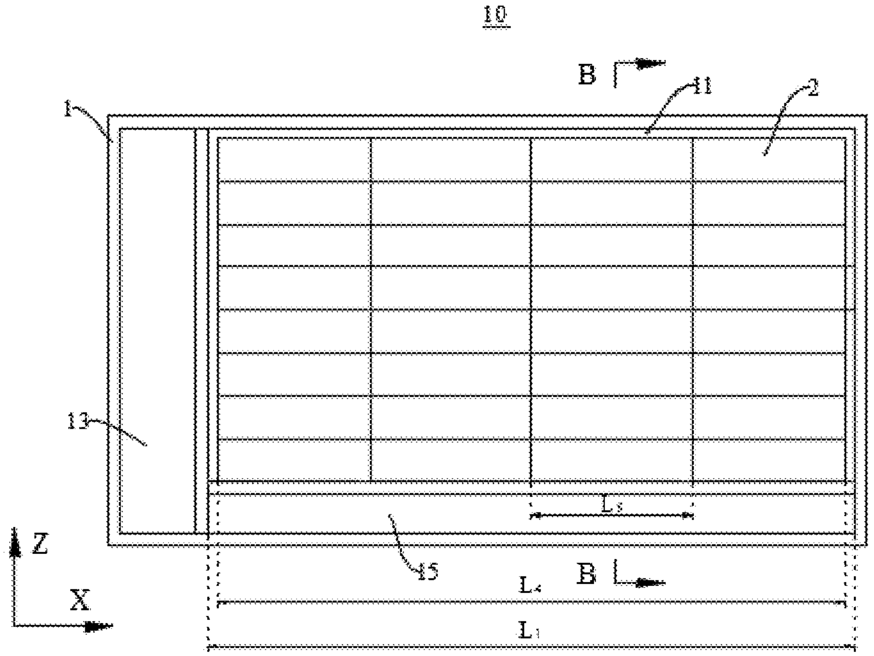
FIG. 7 is a schematic structural diagram of an energy storage device according to some embodiments of this application.
Figure 8:
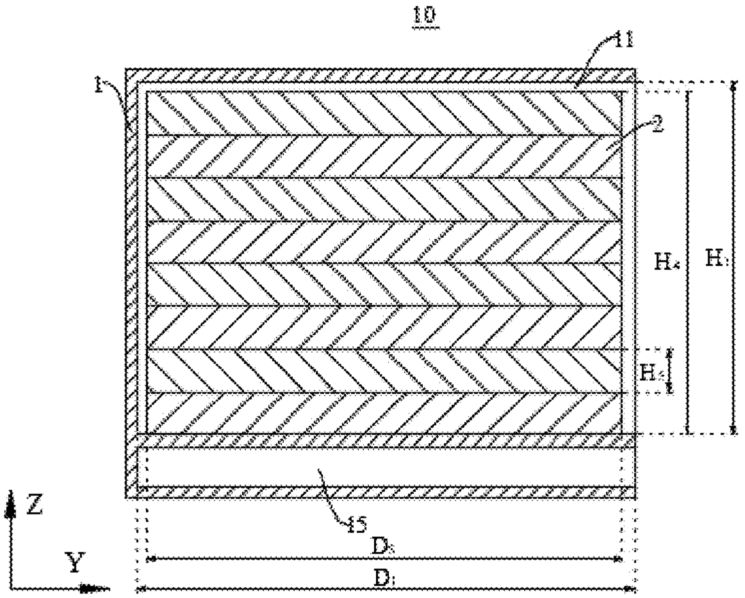
FIG. 8 is a B-B sectional view of the energy storage device shown in FIG. 7.
Figure 9:
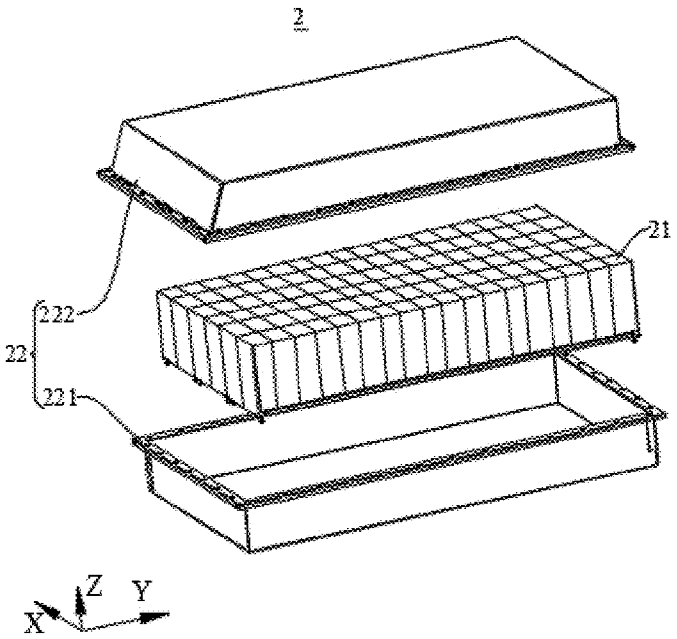
FIG. 9 is an exploded view of a battery according to some embodiments of this application.

In some embodiments, referring to FIG. 7 to FIG. 9, FIG. 7 is a schematic structural diagram of an energy storage device 10 according to some embodiments of this application; FIG. 8 is a B-B sectional view of the energy storage device 10 shown in FIG. 7; and FIG. 9 is an exploded view of a battery 2 according to some embodiments of this application. The battery compartment 11 accommodates at least one battery 2, and the battery 2 includes a plurality of battery cells 21.

One or more batteries 2 may be provided within the battery compartment 11. In an example, both the casing 1 and the battery 2 are rectangular parallelepiped in shape. After the battery 2 is accommodated within the battery compartment 11, one of the length direction, the width direction, and the height direction of the battery 2 may be parallel to the length direction X of the casing, another may be parallel to the width direction Y of the casing, and the remaining one may be parallel to the height direction Z of the casing. In FIG. 7 to FIG. 9, the length direction of the battery 2 is parallel to the width direction Y of the casing, the width direction of the battery 2 is parallel to the length direction X of the casing, and the height direction of the battery 2 is parallel to the height direction Z of the casing.

Along the length direction X of the casing, the battery compartment 11 may accommodate one battery 2 or a plurality of batteries 2; along the width direction Y of the casing, the battery compartment 11 may accommodate one battery 2 or a plurality of batteries 2; and along the height direction Z of the casing, the battery compartment 11 may accommodate one battery 2 or a plurality of batteries 2.

In some embodiments, the battery 2 may be a battery module, where a plurality of battery cells 21 are arranged and fixed to form a battery module. In the battery module, a frame may be formed by two side panels and two end panels, and the plurality of battery cells 21 are fixed within the frame to form the battery module.

In some other embodiments, as shown in FIG. 9, the battery 2 may be a battery pack, where the battery 2 further includes a battery box 22, and the plurality of battery cells 21 are accommodated within the battery box 22. The battery box 22 may include a first portion 221 and a second portion 222, where the first portion 221 and the second portion 222 cover each other to define an accommodation space for accommodating the battery cells 21. The first portion 221 and the second portion 222 may be of various shapes, such as a rectangular parallelepiped shape, a cylindrical shape, or the like. The first portion 221 may be a hollow structure with one side open, and the second portion 222 may also be a hollow structure with one side open, where the open side of the second portion 222 covers the open side of the first portion 221 to form the battery box 22 with an accommodation space. Alternatively, the first portion 221 may be a hollow structure with one side open, and the second portion 222 may be a plate-shaped structure, where the second portion 222 covers the open side of the first portion 221 to form the battery box 22 having an accommodation space. The first portion 221 and the second portion 222 may be sealed by a sealing element, and the sealing element may be a sealing ring, a sealing adhesive, or the like.

During assembly, the plurality of battery cells 21 may first be assembled into the battery 2, and then the battery 2 may be installed within the battery compartment 11. The battery 2, composed of the plurality of battery cells 21, has a larger volume and is easier to install within the battery compartment 11, resulting in high assembly efficiency.

In some embodiments, still referring to FIG. 7, the battery compartment 11 accommodates a plurality of batteries 2 arranged along the length direction X of the casing. Along the length direction X of the casing, a dimension of the battery compartment 11 is denoted as $L_1$, and a sum of dimensions of the plurality of batteries 2 arranged within the battery compartment 11 is denoted as $L_4$, satisfying $0.7 \le L_4/L_1 \le 0.96$.

In an example, the width direction of the battery 2 is parallel to the length direction X of the casing, and the sum of dimensions of the plurality of batteries 2 arranged within the battery compartment 11 along the length direction X of the casing is the sum of the widths of the plurality of batteries 2. The dimension of the battery 2 along the length direction X of the casing can be measured using a ruler.

It should be noted that in this embodiment, the dimensions of the plurality of batteries 2 arranged within the battery compartment 11 along the length direction X of the casing may all be equal, or the dimensions of at least two batteries 2 may differ.

$L_4/L_1$ may be any point value from 0.7, 0.75, 0.8, 0.85, 0.9, 0.96, and the like, or a value in a range defined by any two of the above values.

In this embodiment, where $0.7 \le L_4/L_1 \le 0.96$, the battery compartment 11 accommodates a plurality of batteries 2 arranged along the length direction X of the casing, ensuring that the dimension of a single battery 2 along the length direction X of the casing is not excessively large, reducing manufacturing difficulty and installation difficulty of the battery 2. $L_4/L_1 \ge 0.7$ ensures that the dimension proportion of the plurality of batteries 2 arranged along the length direction X of the casing within the battery compartment 11 along the length direction X of the casing is relatively large, fully utilizing space of the battery compartment 11 along the length direction X of the casing and reducing a gap between two adjacent batteries 2 along the length direction X of the casing. This helps to increase the volume proportion of all batteries 2 within the battery compartment 11 and enhance the volumetric energy density of the energy storage device 10. $L_4/L_1 \le 0.96$ ensures that the battery compartment 11 has sufficient installation allowance along the length direction X of the casing for installing the plurality of batteries 2, reducing installation difficulty of the batteries 2.

In some embodiments, $0.78 \le L_4/L_1 \le 0.91$.

In this embodiment, $L_4/L_1$ may be any point value from 0.78, 0.79, 0.8, 0.81, 0.82, 0.83, 0.84, 0.85, 0.86, 0.87, 0.88, 0.89, 0.9, 0.91, and the like, or a value in a range defined by any two of the above values.

In this embodiment, $0.78 \le L_4/L_1 \le 0.91$ balances the volumetric energy density of the energy storage device 10 and the ease of installation of the batteries 2 along the length direction X of the casing, enhancing the volumetric energy density of the energy storage device 10 while further reducing the installation difficulty of the batteries 2 along the length direction X of the casing.

In some embodiments, still referring to FIG. 7, along the length direction X of the casing, a dimension of each battery 2 is denoted as $L_5$, and $N_5$ batteries 2 are arranged within the battery compartment 11, satisfying $L_4 = L_5 * N_5$.

$N_5$ is a positive integer greater than or equal to 2.

In this embodiment, $L_4 = L_5 * N_5$ ensures that the dimensions of the plurality of batteries 2 along the length direction X of the casing are equal, effectively reducing the probability of space wastage caused by differing dimensions of the batteries 2 along the length direction X of the casing. During assembly, a plurality of batteries 2 of the same specification can be used and arranged along the length direction X of the casing, enhancing assembly efficiency of the energy storage device 10 and reducing manufacturing costs of the energy storage device 10.

In some embodiments, $1\ m \le L_5 \le 1.5\ m$, and $2 \le N_5 \le 6$.

$L_5$ may be any point value from 1 m, 1.05 m, 1.1 m, 1.15 m, 1.2 m, 1.25 m, 1.3 m, 1.35 m, 1.4 m, 1.45 m, 1.5 m, and the like, or a value in a range defined by any two of the above values. The value of $N_5$ may be 2, 3, 4, 5, or 6.

In this embodiment, $1\ m \le L_5 \le 1.5\ m$ and $2 \le N_5 \le 6$. In this way, along the length direction X of the casing, the dimension of each battery 2 is relatively large, and the number of batteries 2 is not excessively large, reducing the space occupied by components other than the battery cells 21 within the battery 2 (for example, the walls of the battery box 22), and increasing the dimension proportion of the plurality of batteries 2 arranged along the length direction X of the casing within the battery compartment 11 along the length direction X of the casing.

Figure 10:
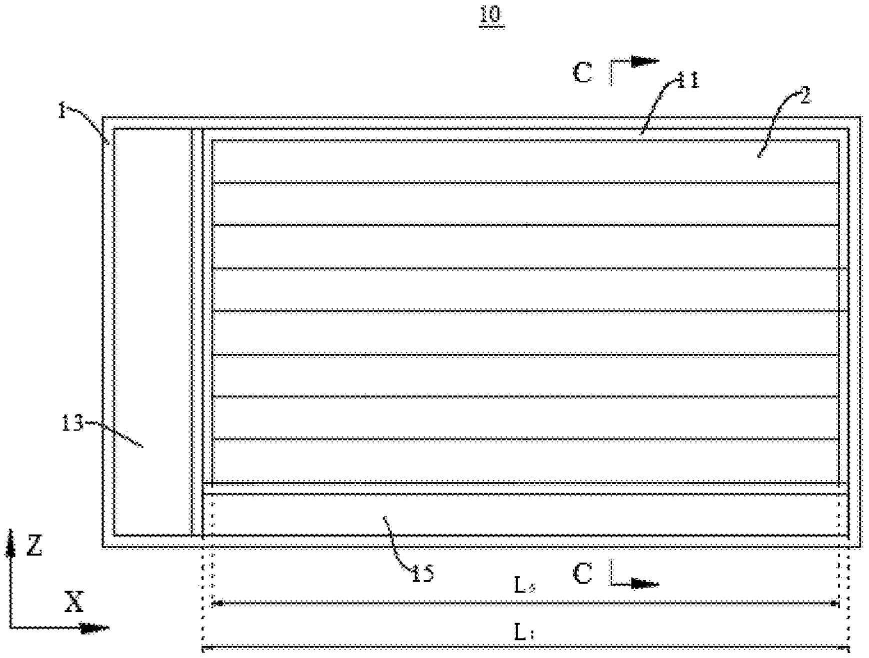
FIG. 10 is a schematic structural diagram of an energy storage device provided by still some other embodiments of this application.

In some embodiments, referring to FIG. 10, FIG. 10 is a schematic structural diagram of an energy storage device 10 according to still other embodiments of this application. Along the length direction X of the casing, the battery compartment 11 accommodates only one battery 2, the dimension of the battery compartment 11 is denoted as $L_1$, and a dimension of the battery 2 is denoted as $L_5$, satisfying $0.8 \le L_5/L_1 \le 0.99$.

In an example, the length direction of the battery 2 is parallel to the length direction X of the casing, the width direction of the battery 2 is parallel to the width direction Y of the casing, and the height direction of the battery 2 is parallel to the height direction Z of the casing. The dimension of the battery 2 along the length direction X of the casing is the length of the battery 2.

$L_5/L_1$ may be any point value from 0.8, 0.83, 0.85, 0.88, 0.9, 0.93, 0.95, 0.97, 0.99, and the like, or a value in a range defined by any two of the above values.

In this embodiment, the battery compartment 11 accommodating only one battery 2 along the length direction X of the casing improves the space utilization of the battery compartment 11 along the length direction X of the casing. $L_5/L_1 \ge 0.8$ ensures that a dimension proportion of the battery 2 within the battery compartment 11 along the length direction X of the casing is relatively large, fully utilizing space of the battery compartment 11 along the length direction X of the casing and increasing a volume proportion of all batteries 2 within the battery compartment 11, thereby enhancing the volumetric energy density of the energy storage device 10. $L_5/L_1 \le 0.99$ ensures that the battery compartment 11 has sufficient installation allowance along the length direction X of the casing for installing the battery 2, reducing installation difficulty of the battery 2.

In some embodiments, $0.85 \le L_5/L_1 \le 0.93$.

In this embodiment, $L_5/L_1$ may be any point value from 0.85, 0.86, 0.87, 0.88, 0.89, 0.9, 0.91, 0.92, 0.93, and the like, or a value in a range defined by any two of the above values.

In this embodiment, $0.85 \le L_5/L_1 \le 0.93$ balances the volumetric energy density of the energy storage device 10 and the ease of installation of the battery 2 along the length direction X of the casing, enhancing the volumetric energy density of the energy storage device 10 while further reducing the installation difficulty of the battery 2 along the length direction X of the casing.

In some embodiments, 4 m$\le L_5 \le$8 m.

$L_5$ may be any point value from 4 m, 4.5 m, 5 m, 5.5 m, 6 m, 6.5 m, 7 m, 7.5 m, 8 m, and the like, or a value in a range defined by any two of the above values.

In this embodiment, $L_5 \ge$4 m ensures that the dimension of the battery 2 along the length direction X of the casing is relatively large, allowing more battery cells 21 to be arranged along the length direction X of the casing within the battery 2, which can meet the high energy requirements of the energy storage device 10; $L_5 \le$8 m ensures that the dimension of the battery 2 along the length direction X of the casing is not excessively large, reducing manufacturing difficulty and installation difficulty of the battery 2.

In some embodiments, 5.5 m$\le L_5 \le$6.8 m.

In this embodiment, $L_5$ may be any point value from 5.5 m, 5.6 m, 5.7 m, 5.8 m, 5.9 m, 6 m, 6.1 m, 6.2 m, 6.3 m, 6.4 m, 6.5 m, 6.6 m, 6.7 m, 6.8 m, and the like, or a value in a range defined by any two of the above values.

In this embodiment, 5.5 m$\le L_5 \le$6.8 m balances the high energy requirements of the energy storage device 10 and the cost effectiveness and ease of installation of the battery 2.

Figure 11:
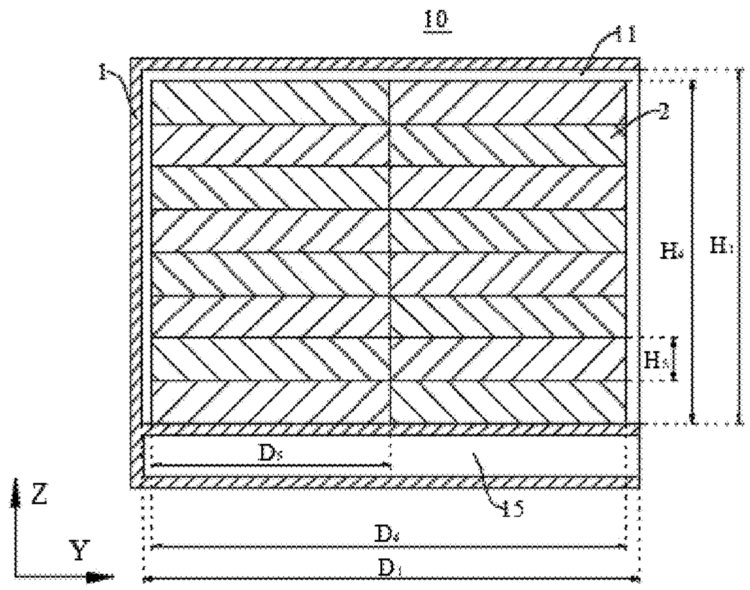
FIG. 11 is a C-C sectional view of the energy storage device shown in FIG. 10.

In some embodiments, referring to FIG. 11, FIG. 11 is a C-C sectional view of the energy storage device 10 shown in FIG. 10. The battery compartment 11 accommodates a plurality of batteries 2 arranged along the width direction Y of the casing. Along the width direction Y of the casing, the dimension of the battery compartment 11 is denoted as $D_1$, and a sum of dimensions of the plurality of batteries 2 arranged within the battery compartment 11 is denoted as $D_4$, satisfying $0.7 \le D_4/D_1 \le 0.96$.

In an example, the width direction of the battery 2 is parallel to the width direction Y of the casing, and the sum of dimensions of the plurality of batteries 2 arranged within the battery compartment 11 along the width direction Y of the casing is the sum of the widths of the plurality of batteries 2. The dimension of the battery 2 along the width direction Y of the casing can be measured using a ruler.

It should be noted that in this embodiment, the dimensions of the plurality of batteries 2 arranged within the battery compartment 11 along the width direction Y of the casing may all be equal, or the dimensions of at least two batteries 2 may differ.

In this embodiment, along the length direction X of the casing, the battery compartment 11 may accommodate one battery 2 or a plurality of batteries 2.

$D_4/D_1$ may be any point value from 0.7, 0.75, 0.8, 0.85, 0.9, 0.96, and the like, or a value in a range defined by any two of the above values.

In this embodiment, the battery compartment 11 accommodates a plurality of batteries 2 arranged along the width direction Y of the casing, ensuring that the dimension of a single battery 2 along the width direction Y of the casing is not excessively large, reducing manufacturing difficulty and installation difficulty of the battery 2. $D_4/D_1 \ge 0.7$ ensures that the dimension proportion of the plurality of batteries 2 arranged along the width direction Y of the casing within the battery compartment 11 along the width direction Y of the casing is relatively large, fully utilizing space of the battery compartment 11 along the width direction Y of the casing and reducing a gap between two adjacent batteries 2 along the width direction Y of the casing. This helps to increase the volume proportion of all batteries 2 within the battery compartment 11 and enhance the volumetric energy density of the energy storage device 10. $D_4/D_1 \le 0.96$ ensures that the battery compartment 11 has sufficient installation allowance along the width direction Y of the casing for installing the plurality of batteries 2, reducing installation difficulty of the batteries 2.

In some embodiments, $0.78 \le D_4/D_1 \le 0.91$.

In this embodiment, $D_4/D_1$ may be any point value from 0.78, 0.79, 0.8, 0.81, 0.82, 0.83, 0.84, 0.85, 0.86, 0.87, 0.88, 0.89, 0.9, 0.91, and the like, or a value in a range defined by any two of the above values.

In this embodiment, $0.78 \le D_4/D_1 \le 0.91$ balances the volumetric energy density of the energy storage device 10 and the ease of installation of the batteries 2 along the width direction Y of the casing, enhancing the volumetric energy density of the energy storage device 10 while further reducing the installation difficulty of the batteries 2 along the width direction Y of the casing.

In some embodiments, along the width direction Y of the casing, a dimension of each battery 2 is denoted as $D_5$, and $N_6$ batteries 2 are arranged within the battery compartment 11, satisfying $D_4 = D_5 * N_6$.

$N_6$ is a positive integer greater than or equal to 2.

In this embodiment, $D_4 = D_5 * N_6$ ensures that the dimensions of the plurality of batteries 2 along the width direction Y of the casing are equal, effectively reducing the probability of space wastage caused by differing dimensions of the batteries 2 along the width direction Y of the casing. During assembly, a plurality of batteries 2 of the same specification can be used and arranged along the width direction Y of the casing, enhancing assembly efficiency of the energy storage device 10 and reducing manufacturing costs of the energy storage device 10.

In some embodiments, 1 m$\le D_5 \le$1.5 m, and $2 \le N_6 \le 3$.

$D_5$ may be any point value from 1 m, 1.05 m, 1.1 m, 1.15 m, 1.2 m, 1.25 m, 1.3 m, 1.35 m, 1.4 m, 1.45 m, 1.5 m, and the like, or a value in a range defined by any two of the above values. The value of $N_6$ may be 2 or 3.

In this embodiment, 1 m$\le D_5 \le$1.5 m, and $2 \le N_6 \le 3$. In this way, along the width direction Y of the casing, the dimension of each battery 2 is relatively large, and the number of batteries 2 is not excessively large, reducing the space occupied by components other than the battery cells 21 within the battery 2 (for example, the walls of the battery box 22) and increasing the dimension proportion of the plurality of batteries 2 arranged along the width direction Y of the casing within the battery compartment 11 along the width direction Y of the casing.

In some embodiments, still referring to FIG. 8, along the width direction Y of the casing, the battery compartment 11 accommodates only one battery 2, the dimension of the battery compartment 11 is denoted as $D_1$, and a dimension of the battery 2 is denoted as $D_5$, satisfying $0.8 \le D_5/D_1 \le 0.99$.

In this embodiment, along the length direction X of the casing, the battery compartment 11 may accommodate one battery 2 or a plurality of batteries 2. In an example, in FIG. 8, the battery compartment 11 accommodates a plurality of batteries 2 along the length direction X of the casing, the length direction of the battery 2 is parallel to the width direction Y of the casing, the width direction of the battery 2 is parallel to the length direction X of the casing, and the height direction of the battery 2 is parallel to the height direction Z of the casing. The dimension of the battery 2 along the width direction Y of the casing is the length of the battery 2.

$D_5/D_1$ may be any point value from 0.8, 0.83, 0.85, 0.88, 0.9, 0.93, 0.95, 0.97, 0.99, and the like, or a value in a range defined by any two of the above values.

In this embodiment, the battery compartment 11 accommodating only one battery 2 along the width direction Y of the casing improves the space utilization of the battery compartment 11 along the width direction Y of the casing. $D_5/D_1 \geq 0.8$ ensures that a dimension proportion of the battery 2 within the battery compartment 11 along the width direction Y of the casing is relatively large, fully utilizing space of the battery compartment 11 along the width direction Y of the casing and increasing a volume proportion of all batteries 2 within the battery compartment 11, thereby enhancing the volumetric energy density of the energy storage device 10. $D_5/D_1 \leq 0.99$ ensures that the battery compartment 11 has sufficient installation allowance along the width direction Y of the casing for installing the battery 2, reducing installation difficulty of the battery 2.

In some embodiments, $0.85 \leq D_5/D_1 \leq 0.93$.

In this embodiment, $D_5/D_1$ may be any point value from 0.85, 0.86, 0.87, 0.88, 0.89, 0.9, 0.91, 0.92, 0.93, and the like, or a value in a range defined by any two of the above values.

In this embodiment, $0.85 \leq D_5/D_1 \leq 0.93$ balances the volumetric energy density of the energy storage device 10 and the ease of installation of the battery 2 along the width direction Y of the casing, enhancing the volumetric energy density of the energy storage device 10 while further reducing the installation difficulty of the battery 2 along the width direction Y of the casing.

In some embodiments, $1.5\ m \leq D_5 \leq 2.5$ m.

$D_5$ may be any point value from 1.5 m, 1.7 m, 1.9 m, 2.1 m, 2.3 m, 2.5 m, and the like, or a value in a range defined by any two of the above values.

In this embodiment, $D_5 \geq 1.5$ m ensures that the dimension of the battery 2 along the width direction Y of the casing is relatively large, allowing more battery cells 21 to be arranged along the width direction Y of the casing within the battery 2, thereby meeting the high energy requirements of the energy storage device 10. $D_5 \leq 2.5$ m ensures that the dimension of the battery 2 along the width direction Y of the casing is not excessively large, reducing manufacturing difficulty and installation difficulty of the battery 2.

In some embodiments, $1.7\ m \leq D_{5 \leq 2.3}$ m.

In this embodiment, $D_5$ may be any point value from 1.7 m, 1.8 m, 1.9 m, 2 m, 2.1 m, 2.2 m, 2.3 m, and the like, or a value in a range defined by any two of the above values.

In this embodiment, $1.7\ m \leq D_5 \leq 2.3$ m balances the high energy requirements of the energy storage device 10 and the cost effectiveness and ease of installation of the battery 2.

In some embodiments, still referring to FIG. 7, FIG. 8, FIG. 10, and FIG. 11, the battery compartment 11 accommodates a plurality of batteries 2 arranged along the height direction Z of the casing. Along the height direction Z of the casing, the dimension of the battery compartment 11 is denoted as $H_1$, and a sum of dimensions of the plurality of batteries 2 arranged within the battery compartment 11 is denoted as $H_4$, satisfying $0.6 \leq {}^{114}/H_1 \leq 0.99$.

In an example, the height direction of the battery 2 is parallel to the height direction Z of the casing. The sum of dimensions of the plurality of batteries 2 arranged within the battery compartment 11 along the height direction of the casing 1 is the sum of the heights of the plurality of batteries 2. The dimension of the battery 2 along the height direction Z of the casing can be measured using a ruler.

It should be noted that in this embodiment, the dimensions of the plurality of batteries 2 arranged within the battery compartment 11 along the height direction Z of the casing may all be equal, or the dimensions of at least two batteries 2 may differ.

In this embodiment, along the length direction X of the casing, the battery compartment 11 may accommodate one battery 2 or a plurality of batteries 2. Along the width direction Y of the casing, the battery compartment 11 may accommodate one battery 2 or a plurality of batteries 2. In the embodiments shown in FIG. 7 and FIG. 8, the battery compartment 11 accommodates a plurality of batteries 2 along the length direction X of the casing and one battery 2 along the width direction Y of the casing. In the embodiments shown in FIG. 10 and FIG. 11, the battery compartment 11 accommodates one battery 2 along the length direction X of the casing and a plurality of batteries 2 along the width direction Y of the casing.

$H_4/H_1$ may be any point value from 0.6, 0.65, 0.7, 0.75, 0.8, 0.85, 0.9, 0.95, 0.99, and the like, or a value in a range defined by any two of the above values.

The battery compartment 11 accommodates the plurality of batteries 2 arranged along the height direction Z of the casing, ensuring that a dimension of a single battery 2 along the height direction Z of the casing is not excessively large, reducing manufacturing difficulty and installation difficulty of the battery 2. $H_4/H_1 \geq 0.6$ ensures that the dimension proportion of the plurality of batteries 2 arranged along the height direction Z of the casing within the battery compartment 11 along the height direction Z of the casing is relatively large, fully utilizing space of the battery compartment 11 along the height direction Z of the casing and reducing a gap between two adjacent batteries 2 along the height direction Z of the casing. This helps to increase the volume proportion of all batteries 2 within the battery compartment 11 and enhance the volumetric energy density of the energy storage device 10. $H_4/H_1 \leq 0.99$ ensures that the battery compartment 11 has sufficient installation allowance along the height direction Z of the casing for installing the plurality of batteries 2, reducing installation difficulty of the batteries 2.

In some embodiments, $0.7 \leq H_4/H_1 \leq 0.92$.

$H_4/H_1$ may be any point value from 0.7, 0.71, 0.72, 0.73, 0.74, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, and the like, or a value in a range defined by any two of the above values.

In this embodiment, $0.7 \leq H_4/H_1 \leq 0.92$ balances the volumetric energy density of the energy storage device 10 and the ease of installation of the batteries 2 along the height direction Z of the casing, enhancing the volumetric energy density of the energy storage device 10 while further reducing the installation difficulty of the batteries 2 along the height direction Z of the casing.

In some embodiments, along the height direction Z of the casing, a dimension of each battery 2 is denoted as $H_5$, and $N_7$ batteries 2 are arranged within the battery compartment 11, satisfying $H_4 = H_5 * N_7$.

$N_7$ is a positive integer greater than or equal to 2.

In this embodiment, $H_4 = H_5 * N_7$ ensures that the dimensions of the plurality of batteries 2 along the height direction Z of the casing are equal, effectively reducing the probability of space wastage caused by differing dimensions of the batteries 2 along the height direction Z of the casing. During assembly, a plurality of batteries 2 of the same specification can be used and arranged along the height direction Z of the casing, enhancing assembly efficiency of the energy storage device 10 and reducing manufacturing costs of the energy storage device 10.

In some embodiments, $0.2\ m \leq H_5 \leq 0.3$ m, and $2 \leq N_7 \leq 10$.

$H_5$ may be any point value from 0.21 m, 0.22 m, 0.23 m, 0.24 m, 0.25 m, 0.26 m, 0.27 m, 0.28 m, 0.29 m, 0.3 m, and the like, or a value in a range defined by any two of the above values. The value of $N_7$ may be 2, 3, 4, 5, 6, 7, 8, 9, or 10.

In this embodiment, 0.2 m≤$H_5$≤0.3 m and 2≤$N_7$≤10. In this way, along the height direction Z of the casing, the dimension of each battery 2 is relatively large, and the number of batteries 2 is not excessively large, reducing the space occupied by components other than the battery cells 21 within the battery 2 (for example, the walls of the battery box 22), and increasing the dimension proportion of the plurality of batteries 2 arranged along the height direction Z of the casing within the battery compartment 11 along the height direction Z of the casing.

Figure 12:
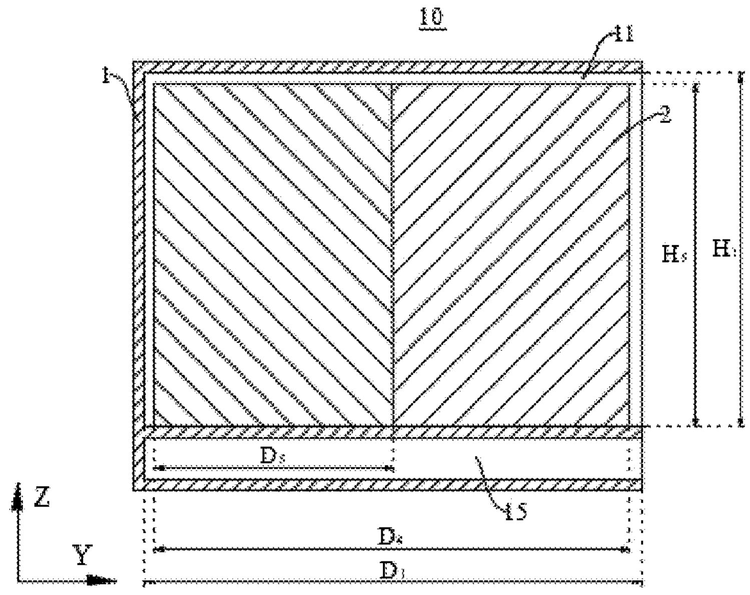
FIG. 12 is a sectional view of an energy storage device according to some embodiments of this application.

In some embodiments, referring to FIG. 12, where FIG. 12 is a sectional view of an energy storage device 10 according to some embodiments of this application. Along the height direction Z of the casing, the battery compartment 11 accommodates only one battery 2, the dimension of the battery compartment 11 is denoted as $H_1$, and a dimension of the battery 2 is denoted as $H_5$, satisfying 0.8≤$H_5/H_1$≤0.99.

In this embodiment, along the length direction X of the casing, the battery compartment 11 may accommodate one battery 2 or a plurality of batteries 2. Along the width direction Y of the casing, the battery compartment 11 may accommodate one battery 2 or a plurality of batteries 2. In an example, in FIG. 12, the battery compartment 11 accommodates a plurality of batteries 2 along the width direction Y of the casing and a plurality of batteries 2 along the length direction X of the casing.

$H_5/H_1$ may be any point value from 0.8, 0.83, 0.85, 0.88, 0.9, 0.93, 0.95, 0.97, 0.99, and the like, or a value in a range defined by any two of the above values.

In this embodiment, the battery compartment 11 accommodating only one battery 2 along the height direction Z of the casing improves the space utilization of the battery compartment 11 along the height direction Z of the casing. $H_5/H_1$≥0.8 ensures that a dimension proportion of the battery 2 within the battery compartment 11 along the height direction Z of the casing is relatively large, fully utilizing space of the battery compartment 11 along the height direction Z of the casing and increasing a volume proportion of all batteries 2 within the battery compartment 11, thereby enhancing the volumetric energy density of the energy storage device 10. $H_5/H_1$≤0.99 ensures that the battery compartment 11 has sufficient installation allowance along the height direction Z of the casing for installing the battery 2, reducing installation difficulty of the battery 2.

In some embodiments, 0.85≤$H_5/H_1$≤0.93.

In this embodiment, $H_5/H_1$ may be any point value from 0.85, 0.86, 0.87, 0.88, 0.89, 0.9, 0.91, 0.92, 0.93, and the like, or a value in a range defined by any two of the above values.

In this embodiment, 0.85≤$H_5/H_1$≤0.93 balances the volumetric energy density of the energy storage device 10 and the ease of installation of the battery 2 along the height direction Z of the casing, enhancing the volumetric energy density of the energy storage device 10 while further reducing the installation difficulty of the battery 2 along the height direction Z of the casing.

In some embodiments, 1.5 m≤$H_5$≤2.5 m.

$H_5$ may be any point value from 1.5 m, 1.7 m, 1.9 m, 2.1 m, 2.3 m, 2.5 m, and the like, or a value in a range defined by any two of the above values.

$H_5$≥1.5 m ensures that the dimension of the battery 2 along the height direction Z of the casing is relatively large, and the dimension of the battery cells 21 within the battery 2 along the height direction Z of the casing is relatively large, which can meet the high energy requirements of the energy storage device 10. $H_5$≤2.5 m ensures that the dimension of the battery 2 along the height direction Z of the casing is not excessively large, reducing manufacturing difficulty and installation difficulty of the battery 2.

In some embodiments, 1.7 m≤$H_5$≤2.3 m.

In this embodiment, $H_5$ may be any point value from 1.7 m, 1.8 m, 1.9 m, 2 m, 2.1 m, 2.2 m, 2.3 m, and the like, or a value in a range defined by any two of the above values.

In this embodiment, 1.7 m≤$H_5$≤2.3 m balances the high energy requirements of the energy storage device 10 and the cost effectiveness and ease of installation of the battery 2.

Figure 13:
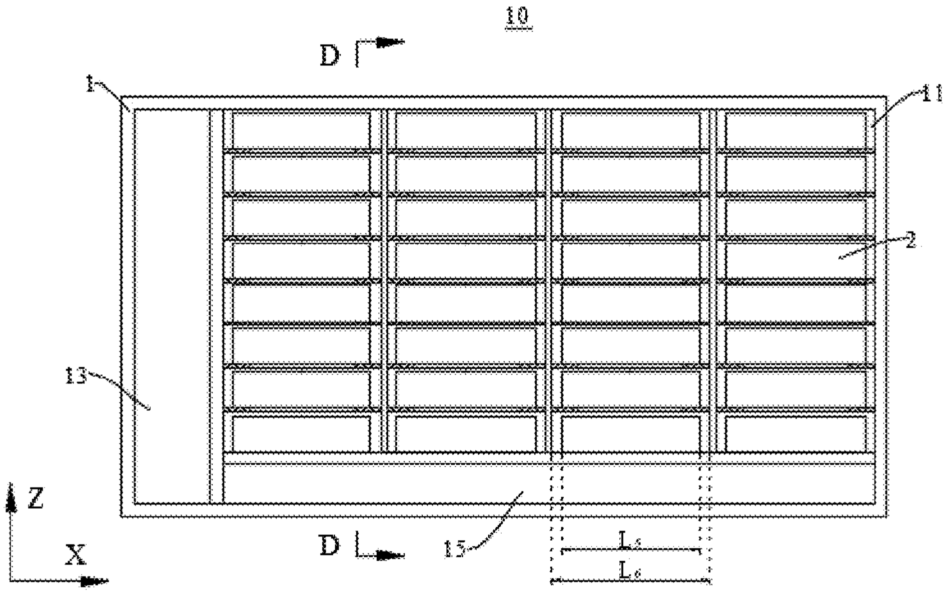
FIG. 13 is a structural view of an energy storage device according to further some embodiments of this application.
Figure 14:
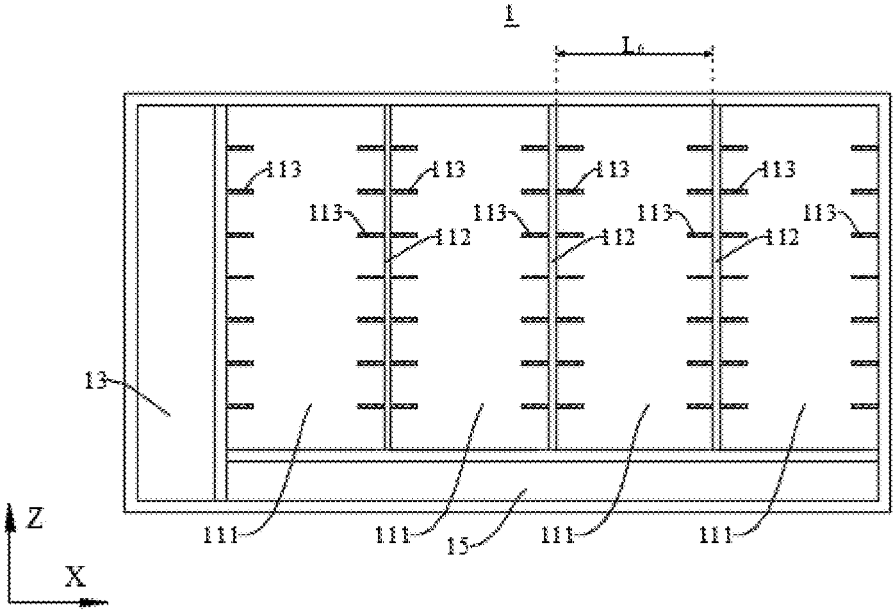
FIG. 14 is a schematic structural diagram of a casing shown in FIG. 13.

In some embodiments, referring to FIG. 13 and FIG. 14, FIG. 13 is a structural view of an energy storage device 10 according to further some embodiments of this application; and FIG. 14 is a schematic structural diagram of the casing 1 shown in FIG. 13. The battery compartment 11 includes a plurality of sub-compartments 111, the plurality of sub-compartments 111 are arranged along the length direction X of the casing, and each sub-compartment 111 accommodates at least one battery 2.

Two, three, four, five, six, seven, eight, or more sub-compartments 111 may be provided. Two adjacent sub-compartments 111 may be separated by a partition 112, where the partition 112 may be a partition plate disposed between the two sub-compartments 111 or a partition beam disposed between the two sub-compartments 111, and the partition beam may extend along the height direction Z of the casing. When the partition 112 is a partition beam disposed between two adjacent sub-compartments 111, a plurality of partition beams may be provided between the two adjacent sub-compartments 111, and the plurality of partition beams may be spaced apart along the width direction Y of the casing.

The sub-compartment 111 may be of various shapes, such as a cylindrical shape or a prismatic shape. The prismatic shape may be a triangular prism, a quadrangular prism, a pentagonal prism, a hexagonal prism, or the like. In an example, in FIG. 13, the sub-compartment 111 is a quadrangular prism, and specifically, the sub-compartment 111 is rectangular parallelepiped in shape. The sub-compartment 111 may accommodate one battery 2 or a plurality of batteries 2.

In this embodiment, the battery compartment 11 is divided into a plurality of sub-compartments 111, and each sub-compartment 111 can accommodate the battery 2, allowing the batteries 2 to be accommodated within the battery compartment 11 in a more organized manner, facilitating the installation of the batteries 2.

In some embodiments, a volume of the sub-compartment 111 is denoted as $V_4$, and a sum of volumes of the batteries 2 within the sub-compartment 111 is denoted as $V_5$, satisfying 0.75≤$V_5/V_4$≤0.95.

The volume of the sub-compartment 111 can be measured in various ways. For a sub-compartment 111 with a regular shape, taking the sub-compartment 111 being a rectangular parallelepiped for example, a length, a width, and a height of the sub-compartment 111 can be measured using a measuring tool, and the volume $V_4$ of the sub-compartment 111 can be calculated based on the measured length, width, and height of the sub-compartment 111. It can be understood that a product of the length, width, and height of the sub-compartment 111 is $V_4$, where the measuring tool may be a ruler. For a sub-compartment 111 with an irregular shape, it is difficult to calculate the volume of the sub-compartment 111 by measuring its external dimensions, and a filling method can be used instead to measure the volume of the sub-compartment 111. The specific method is as follows: The sub-compartment 111 is filled with plastic particles, where a material of the plastic particles may be PP (polypropylene, polypropylene) or PE (polyethylene, polyethylene), with a particle size of 0.5 mm to 1.5 mm and a density of 0.94 g/cm$^3$ to 0.96 g/cm$^3$. Atotal volume of the plastic particles within the sub-compartment 111 is measured using a measuring container to obtain a volume of the sub-compartment 111. Certainly, during measurement of the total volume of the plastic particles, a total weight of the plastic particles within the sub-compartment 111 can also be measured using a weighing device, a total mass of the plastic particles within the sub-compartment 111 can be calculated, and then the total volume of the plastic particles can be calculated based on the formula: total volume of plastic particles=total mass of plastic particles/density of plastic particles, thereby obtaining the volume $V_4$ of the sub-compartment 111.

In this embodiment, one or more batteries 2 may be provided within the sub-compartment 111. If the sub-compartment 111 contains one battery 2, the sum of volumes of the batteries 2 within the sub-compartment 111 is the volume of that battery 2. If the sub-compartment 111 contains a plurality of batteries 2, the sum of volumes of the batteries 2 within the sub-compartment 111 is the sum of the volumes of all batteries 2 within the sub-compartment 111. The plurality of batteries 2 within the sub-compartment 111 may be connected in series, parallel, or series-parallel, where being connected in series-parallel means that some of the plurality of batteries 2 are connected in series and others in parallel. Along the length direction X of the casing, the sub-compartment 111 may accommodate one battery 2 or a plurality of batteries 2; along the width direction Y of the casing, the sub-compartment 111 may accommodate one battery 2 or a plurality of batteries 2; and along the height direction Z of the casing, the sub-compartment 111 may accommodate one battery 2 or a plurality of batteries 2.

If the sub-compartment 111 contains a plurality of batteries 2, the volumes of all batteries 2 within the sub-compartment 111 may be equal, or the volumes of at least two batteries 2 may differ. $V_5$ is the sum of volumes of all batteries 2 within the sub-compartment 111. If the volumes of all batteries 2 within the sub-compartment 111 are equal, the volume of one battery 2 can be measured, and $V_5$ can be obtained by multiplying the volume of that battery 2 by the number of batteries 2 within the sub-compartment 111. If the volumes of at least two batteries 2 within the sub-compartment 111 differ, for example, if all batteries 2 within the sub-compartment 111 are the batteries 2 of two different volumes, the volume of a first type of battery 2 can be measured, and a third total volume can be obtained by multiplying the volume of the first type of battery 2 by the number of the first type of batteries 2 within the sub-compartment 111, a volume of the second type of battery 2 can be measured, and a fourth total volume can be obtained by multiplying the volume of the second type of battery 2 by the number of the second type of batteries 2 within the sub-compartment 111, and a sum of the third total volume and the fourth total volume is $V_5$.

The volume of the battery 2 can be measured in various ways. For a battery 2 with a regular shape, taking the battery 2 being a rectangular parallelepiped for example, a length, a width, and a height of the battery 2 can be measured using a measuring tool, and a volume of the battery 2 can be calculated based on the measured length, width, and height of the battery 2. It can be understood that a product of the length, width, and height of the battery 2 is the volume of the battery 2, where the measuring tool may be a ruler. It should be noted that if an outer surface of each wall of the battery 2 is planar, the length, width, and height of the battery 2 are measured based on the outer surface of each wall. If a protrusion or recess is formed on an outer surface of a wall of the battery 2, the length, width, and height of the battery 2 are measured based on a planar region of that outer surface. For a battery 2 with an irregular shape, it is difficult to calculate the volume of the battery 2 by measuring external dimensions of the battery 2, and a liquid immersion method can be used instead to measure the volume of the battery 2. The specific method is as follows: Liquid is injected into a measuring container, and a volume value $X_3$ corresponding to the liquid level is recorded; the battery 2 is gradually immersed in the liquid until the battery 2 is totally submerged in the liquid, a volume value $X_4$ corresponding to the liquid level at this point is recorded, and $X_4$-$X_3$ is the volume of the battery 2.

$V_5/V_4$ may be any point value from 0.75, 0.78, 0.8, 0.82, 0.85, 0.87, 0.9, 0.92, 0.95, and the like, or a value in a range defined by any two of the above values.

In this embodiment, $V_5/V_4 \geq 0.75$ ensures that the volume proportion of all batteries 2 within the sub-compartment 111 is relatively large, thereby enhancing the space utilization of the sub-compartment 111 and enhancing the volumetric energy density of the energy storage device 10. $V_5/V_4 \leq 0.95$ ensures that the volume proportion of all batteries 2 within the sub-compartment 111 is not excessively large, lowering the assembly precision requirement for installing the batteries 2 into the sub-compartment 111 and effectively controlling the manufacturing costs of the energy storage device 10 within a reasonable range.

In some embodiments, $0.82 \leq V_5/V_4 \leq 0.9$.

In this embodiment, $V_5/V_4$ may be any point value from 0.82, 0.83, 0.84, 0.85, 0.86, 0.87, 0.88, 0.89, 0.9, and the like, or a value in a range defined by any two of the above values.

In this embodiment, $0.82 \leq V_5/V_4 \leq 0.9$ balances requirements for the volumetric energy density and cost effectiveness of the energy storage device 10, further reducing the manufacturing costs of the energy storage device 10 while enhancing the volumetric energy density of the energy storage device 10.

In some embodiments, still referring to FIG. 13, along the length direction X of the casing, the sub-compartment 111 accommodates only one battery 2. This reduces the space occupied by components other than the battery cells 21 within the battery 2 (for example, the walls of the battery box 22), improving a proportion of the battery 2 within the sub-compartment 111 along the length direction X of the casing, and enhancing space utilization of the sub-compartment 111 along the length direction X of the casing.

In some embodiments, along the length direction X of the casing, a dimension of the sub-compartment 111 is denoted as $L_6$, and a dimension of the battery 2 is denoted as $L_5$, satisfying $0.85 \leq L_5/L_6 \leq 0.99$.

In an example, the sub-compartment 111 and the battery 2 are rectangular parallelepiped in shape, the length direction of the sub-compartment 111 and the length direction of the battery 2 are parallel to the width direction Y of the casing, the width direction of the sub-compartment 111 and the width direction of the battery 2 are parallel to the length direction X of the casing, and the height direction of the sub-compartment 111 and the height direction of the battery 2 are parallel to the height direction Z of the casing. The dimension of the sub-compartment 111 along the length direction X of the casing is the width of the sub-compartment 111, and the dimension of the battery 2 along the length direction X of the casing is the width of the battery 2.

$L_5/L_6$ may be any point value from 0.85, 0.88, 0.9, 0.93, 0.95, 0.97, 0.99, and the like, or a value in a range defined by any two of the above values.

In this embodiment, $L_5/L_6 \geq 0.85$ ensures that a dimension proportion of the battery 2 within the sub-compartment 111 along the length direction X of the casing is relatively large, fully utilizing space of the sub-compartment 111 along the length direction X of the casing and increasing a volume proportion of all batteries 2 within the sub-compartment 111, thereby enhancing the volumetric energy density of the energy storage device 10. $L_5/L_6 \leq 0.99$ ensures that the sub-compartment 111 has sufficient installation allowance along the length direction X of the casing for installing the battery 2, reducing installation difficulty of the battery 2.

In some embodiments, $0.88 \leq L_5/L_6 \leq 0.95$.

In this embodiment, $L_5/L_6$ may be any point value from 0.88, 0.89, 0.9, 0.91, 0.92, 0.93, 0.94, 0.95, and the like, or a value in a range defined by any two of the above values.

In this embodiment, $0.88 \leq L_5/L_6 \leq 0.95$ balances the volumetric energy density of the energy storage device 10 and the ease of installation of the battery 2 along the length direction X of the casing, enhancing the volumetric energy density of the energy storage device 10 while further reducing the installation difficulty of the battery 2 along the length direction X of the casing.

Figure 15:
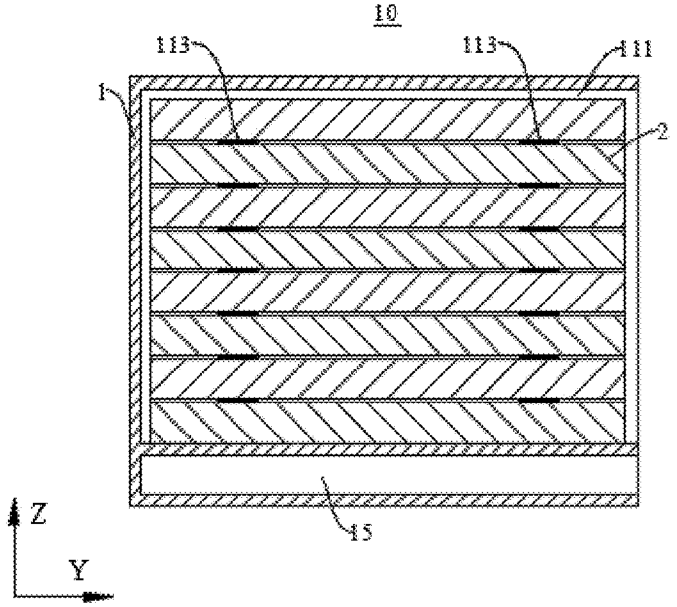
FIG. 15 is a D-D sectional view along of the energy storage device shown in FIG. 13.

In some embodiments, referring to FIG. 15, FIG. 15 is a D-D sectional view of the energy storage device 10 shown in FIG. 13. Along the width direction Y of the casing, the sub-compartment 111 accommodates only one battery 2.

In this embodiment, along the length direction X of the casing, the sub-compartment 111 may accommodate one battery 2 or a plurality of batteries 2.

In this embodiment, the sub-compartment 111 accommodating only one battery 2 along the width direction Y of the casing reduces the space occupied by components other than the battery cells 21 within the battery 2 (for example, the walls of the battery box 22), improving the proportion of the battery 2 within the sub-compartment 111 along the width direction Y of the casing and enhancing the space utilization of the sub-compartment 111 along the width direction Y of the casing.

In some embodiments, still referring to FIG. 13, along the height direction Z of the casing, the sub-compartment 111 accommodates a plurality of batteries 2.

In this embodiment, along the length direction X of the casing, the sub-compartment 111 may accommodate one battery 2 or a plurality of batteries 2. Along the width direction Y of the casing, the sub-compartment 111 may accommodate one battery 2 or a plurality of batteries 2.

Along the height direction of the sub-compartment 111, the sub-compartment 111 may accommodate two, three, four, five, six, seven, eight, nine, ten, or more batteries 2.

In an example, along the length direction X of the casing, the sub-compartment 111 accommodates only one battery 2; along the width direction Y of the casing, the sub-compartment 111 accommodates only one battery 2; and along the height direction Z of the casing, the sub-compartment 111 accommodates a plurality of batteries 2. All batteries 2 within each sub-compartment 111 are connected in series. In two adjacent sub-compartments 111, all batteries 2 within one sub-compartment 111 are connected in series to form a first battery group (a battery cluster), all batteries 2 within the other sub-compartment 111 are connected in series to form a second battery group (a battery cluster), and the first battery group and the second battery group are connected in parallel. In an embodiment that the casing 1 includes an electrical compartment and a main control compartment 15, a main control unit in the main control compartment 15 can implement high-voltage control and communication of the battery clusters, and a busbar unit in the electrical compartment can implement parallel convergence of multiple battery clusters, implementing a safe connection between the multiple battery clusters and a direct current side of a power conversion system (PCS, Power Conversion System).

In an example, along the length direction X of the casing, support members 113 are provided on two sides of each sub-compartment 111. Along the height direction Z of the casing, the support members 113 are located at the bottom of the battery 2, and the support members 113 are configured to support the battery 2. The support members 113 may be installed on the walls of the battery compartment 11 and the partition 112. The provision of the support members 113, on one hand, can enhance the stability of each battery 2 within the sub-compartment 111; on the other hand, can maintain a distance between two adjacent batteries 2 along the height direction Z of the casing within the sub-compartment 111, making it less likely to affect an adjacent battery 2 during the removal or installation of one battery 2.

In this embodiment, the sub-compartment 111 accommodating a plurality of batteries 2 along the height direction Z of the casing reduces the dimension of a single battery 2 along the height direction Z of the casing, reducing manufacturing difficulty and manufacturing costs of the battery 2.

In some embodiments, the number of sub-compartments 111 is less than or equal to 4.

In this embodiment, two, three, or four sub-compartments 111 may be provided. In the embodiment shown in FIG. 13, four sub-compartments 111 are provided.

In this embodiment, the number of sub-compartments 111 being less than or equal to 4 ensures that the number of partition components separating two adjacent sub-compartments 111 within the battery compartment 11 is relatively small. This reduces the space occupied by the partition components within the battery compartment 11 to provide more space for the batteries 2, thereby enhancing the space utilization of the battery compartment 11.

In some embodiments, a volume of the battery 2 is denoted as $V_6$, and a sum of volumes of the housings 211 of the plurality of battery cells 21 of the battery 2 is denoted as $V_7$, satisfying $0.5 \leq V_7/V_6 \leq 0.8$.

Figure 16:
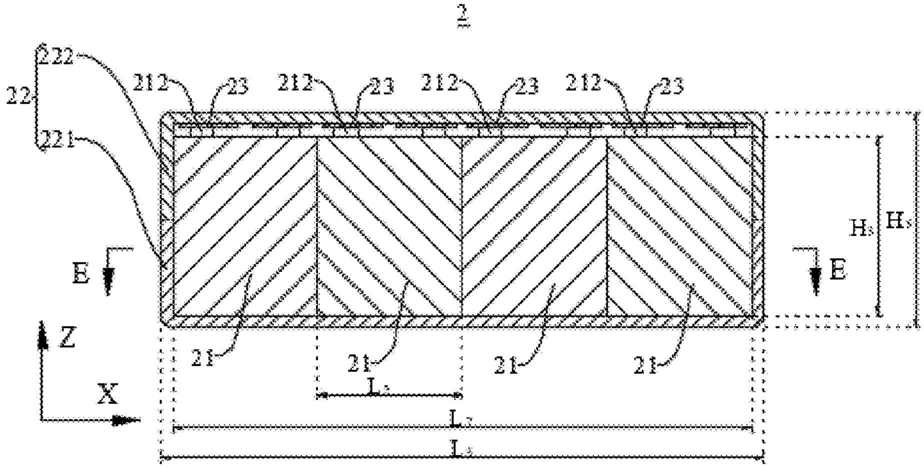
FIG. 16 is a schematic structural diagram of a battery according to some embodiments of this application.
Figure 17:
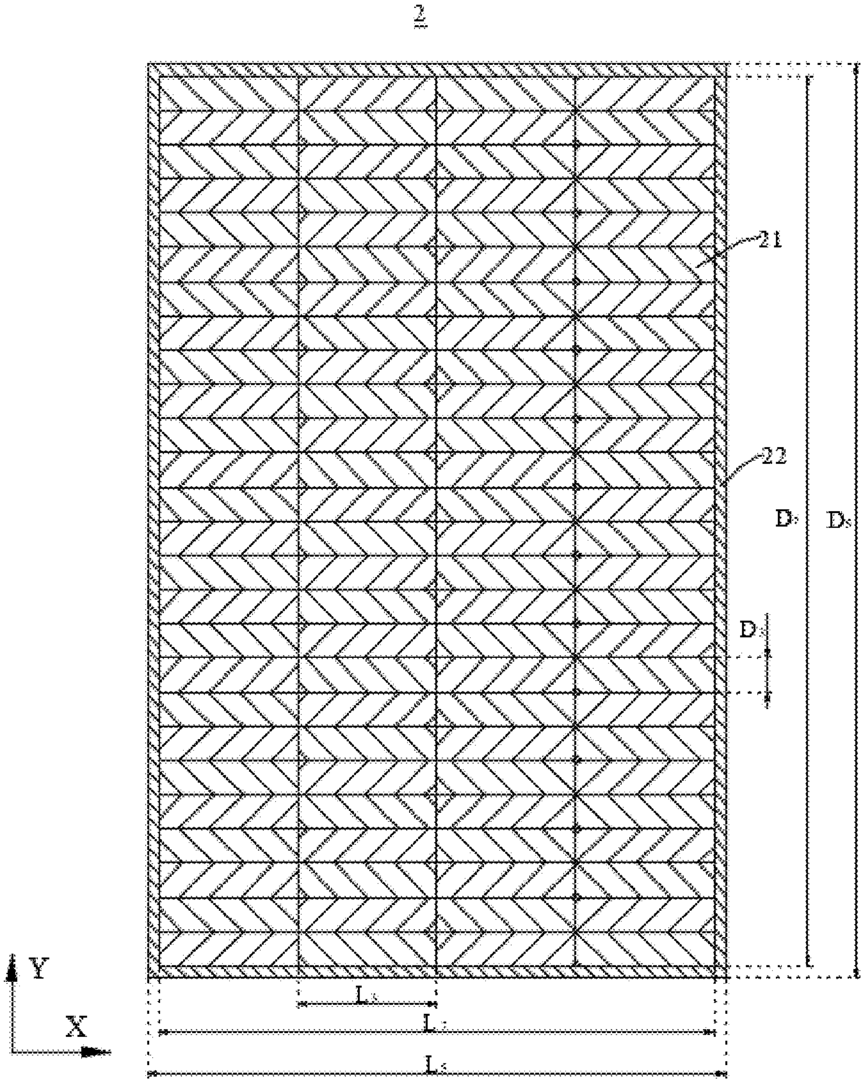
FIG. 17 is an E-E sectional view of the battery shown in FIG. 16.

In an example, referring to FIG. 16 and FIG. 17, FIG. 16 is a schematic structural diagram of a battery 2 according to some embodiments of this application; and FIG. 17 is an E-E sectional view of the battery 2 shown in FIG. 16. The battery 2 includes a battery box 22 and a plurality of battery cells 21, where the plurality of battery cells 21 are accommodated within the battery box 22. The battery box 22 may include a first portion 221 and a second portion 222, where the first portion 221 and the second portion 222 cover each other to define an accommodation space for accommodating the battery cells 21. A volume of the battery box 22 is the volume $V_6$ of the battery 2. Taking the battery box 22 being a rectangular parallelepiped for example, a length, a width, and a height of the battery box 22 can be measured using a measuring tool, and the volume of the battery box 22 can be calculated based on the measured length, width, and height of the battery box 22, thereby obtaining the volume $V_6$ of the battery 2. It can be understood that a product of the length, width, and height of the battery box 22 is the volume of the battery box 22, where the measuring tool may be a ruler.

The plurality of battery cells 21 of the battery 2 may be connected in series, parallel, or series-parallel. The plurality of battery cells 21 may be connected in series, parallel, or series-parallel via a busbar component 23. The busbar component 23 may be a metal conductor, such as copper, iron, aluminum, steel, or aluminum alloy. The battery 2 may further include a thermal management component. The thermal management component may be disposed within the battery box 22 or integrated into a wall of the battery box 22, and the thermal management component is configured to manage temperature of the battery cells 21. The thermal management component may be a water-cooling plate containing a fluid medium.

$V_7$ is the sum of volumes of the housings 211 of all battery cells 21 of the battery 2, where the volumes of the housings 211 of all battery cells 21 of the battery 2 may be equal, or the volumes of the housings 211 of at least two battery cells 21 may differ. If the volumes of the housings 211 of all battery cells 21 of the battery 2 are equal, the volume of the housing 211 of one battery cell 21 can be measured, and $V_7$ can be obtained by multiplying the volume of the housing 211 of that battery cell 21 by the number of battery cells 21 of the battery 2. If the volumes of the housings 211 of at least two battery cells 21 within the battery 2 differ, for example, if the housings 211 of all battery cells 21 of the battery 2 are the housings 211 of two different volumes, a volume of the housing 211 of a first type of battery cell 21 can be measured, and a fifth total volume can be obtained by multiplying the volume of the housing 211 of the first type of battery cell 21 by the number of the first type of battery cells 21 of the battery 2, a volume of the housing 211 of a second type of battery cell 21 can be measured, and a sixth total volume can be obtained by multiplying the volume of the housing 211 of the second type of battery cell 21 by the number of the second type of battery cells 21 of the battery 2, and a sum of the fifth total volume and the sixth total volume is $V_7$.

In this embodiment, $V_7/V_6$ may be any point value from 0.5, 0.53, 0.55, 0.58, 0.6, 0.63, 0.65, 0.68, 0.7, 0.73, 0.75, 0.78, 0.8, and the like, or a value in a range defined by any two of the above values.

In this embodiment, $V_7/V_6 \geq 0.5$ ensures that the volume proportion of all battery cells 21 within the battery 2 is relatively large, enhancing the space utilization within the battery 2 and enhancing the volumetric energy density of the battery 2, thereby enhancing the volumetric energy density of the energy storage device 10. $V_7/V_6 \leq 0.8$ ensures that the volume proportion of all battery cells 21 within the battery 2 is not excessively large, providing more space for other components of the battery 2 (for example, the busbar component 23 and the thermal management component), and reducing the assembly difficulty and manufacturing costs of the battery 2.

In some embodiments, $0.58 \leq V_7/V_6 \leq 0.7$.

In this embodiment, $V_7/V_6$ may be any point value from 0.58, 0.59, 0.6, 0.61, 0.62, 0.63, 0.64, 0.65, 0.66, 0.67, 0.68, 0.69, 0.7, and the like, or a value in a range defined by any two of the above values.

In this embodiment, $0.58 \leq V_7/V_6 \leq 0.7$ balances the volumetric energy density of the battery 2 and the economic and assembly convenience requirements of the battery 2, further enhancing the volumetric energy density of the battery 2 while reducing the assembly difficulty and manufacturing costs of the battery 2.

In some embodiments, the number of the battery cells 21 of the battery 2 is denoted as $N_8$, and a volume of the housing 211 of each battery cell 21 is denoted as $V_3$, satisfying $V_7 = V_3 * N_8$.

$N_8$ is a positive integer greater than or equal to 2.

In this embodiment, $V_7 = V_3 * N_8$ ensures that the volumes of the housings 211 of all battery cells 21 of the battery 2 are equal, allowing for the use of battery cells 21 of the same specification. On one hand, this improves assembly efficiency of the battery 2; on the other hand, this reduces a probability of space wastage caused by differing specifications of the battery cells 21 of the battery 2.

In some embodiments, still referring to FIG. 16 and FIG. 17, the battery 2 includes p*q battery cells 21, the p*q battery cells 21 are arranged in p rows and q columns, each row of battery cells 21 is arranged along the length direction X of the casing, and each column of battery cells 21 is arranged along the width direction Y of the casing, where p and q are positive integers.

In the battery 2, all battery cells 21 are arranged in a rectangular array of p rows and q columns. Each row of battery cells 21 includes q battery cells 21, and each column of battery cells 21 includes p battery cells 21. The battery 2 includes a plurality of battery cells 21, and at least one of p and q is greater than or equal to 2.

In an example, both p and q are greater than 2, each column of battery cells 21 includes a plurality of battery cell groups connected in series, each battery cell group includes a plurality of battery cells 21 connected in parallel, and two adjacent columns of battery cells 21 are connected in parallel. In the embodiment shown in FIG. 17, p=26, q=4, each column of battery cells 21 includes 26 battery cells 21, every two battery cells 21 are connected in parallel to form 13 battery cell groups, the 13 battery cell groups are connected in series, and the 4 columns of battery cells 21 are connected in parallel.

In an embodiment that the housing 211 of the battery cell 21 (not shown in FIG. 16 and FIG. 17) is rectangular parallelepiped in shape, any one of the length direction, the width direction, and the height direction of the housing 211 is parallel to the length direction X of the casing, another is parallel to the width direction Y of the casing, and the remaining one is parallel to the height direction Z of the casing. In the embodiments shown in FIG. 16 and FIG. 17, the length direction of the housing 211 is parallel to the length direction X of the casing, the width direction of the housing 211 is parallel to the width direction Y of the casing, and the height direction of the housing 211 is parallel to the height direction Z of the casing.

In an embodiment that a thermal management component is provided within the battery 2, the thermal management component may be disposed between two adjacent battery cells 21 in each column of the battery cells 21, or may be disposed between two adjacent battery cells 21 in each row of the battery cells 21.

In this embodiment, all battery cells 21 of the battery 2 are distributed in a rectangular array, making the arrangement of the battery cells 21 of the battery 2 more regular, thereby enhancing the space utilization of the battery 2.

In some embodiments, in each row of the battery cells 21, a sum of dimensions of the housings 211 of q battery cells 21 along the length direction X of the casing is denoted as $L_7$, and a dimension of the battery 2 along the length direction X of the casing is denoted as $L_5$, satisfying $0.8 \leq L_7/L_5 \leq 0.95$.

In each row of the battery cells 21, the dimensions of the housings 211 of the q battery cells 21 along the length direction X of the casing may all be equal, or the dimensions of the housings 211 of at least two battery cells 21 along the length direction X of the casing may differ.

In the embodiment shown in FIG. 16 and FIG. 17, the length direction of the housing 211 of the battery cell 21 and the width direction of the battery 2 are parallel to the length direction X of the casing, the sum of dimensions of the housings 211 of the q battery cells 21 along the length direction X of the casing is the sum of the lengths of the housings 211 of the q battery cells 21, and the dimension of the battery 2 along the length direction X of the casing is the width of the battery 2.

In this embodiment, $L_7/L_5$ may be any point value from 0.8, 0.83, 0.85, 0.87, 0.9, 0.92, 0.95, and the like, or a value in a range defined by any two of the above values.

$L_7/L_5 \geq 0.8$ ensures that a dimension proportion of the housings 211 of each row of battery cells 21 within the battery 2 along the length direction X of the casing is relatively large, fully utilizing space of the battery 2 along the length direction X of the casing and reducing a gap between the housings 211 of two adjacent battery cells 21 along the length direction X of the casing. This helps to increase the volume proportion of the housings 211 of all battery cells 21 within the battery 2 and enhance the volumetric energy density of the battery 2. $L_7/L_5 \leq 0.95$ ensures that the dimension proportion of the housings 211 of each row of battery cells 21 within the battery 2 along the length direction X of the casing is not excessively large, reducing manufacturing difficulty and manufacturing costs of the battery 2.

In some embodiments, $0.85 \leq L_7/L_5 \leq 0.9$.

In this embodiment, $L_7/L_5$ may be any point value from 0.85, 0.86, 0.87, 0.88, 0.89, 0.9, and the like, or a value in a range defined by any two of the above values.

In this embodiment, $0.85 \leq L_7/L_5 \leq 0.9$ balances the volumetric energy density of the battery 2, the manufacturing difficulty of the battery 2, and the cost-effectiveness requirements of the battery 2, further enhancing the volumetric energy density of the battery 2 while reducing manufacturing difficulty and manufacturing costs of the battery 2.

In some embodiments, along the length direction X of the casing, a dimension of the housing 211 of each of the battery cells 21 is denoted as $L_3$, satisfying $L_3=L_7/q$, where 0.17 m$\leq L_{3\leq 0.6}$ m, and $1 \leq q \leq 5$.

$L_3$ may be any point value from 0.17 m, 0.2 m, 0.25 m, 0.3 m, 0.35 m, 0.4 m, 0.45 m, 0.5 m, 0.55 m, 0.6 m, and the like, or a value in a range defined by any two of the above values. q may be 1, 2, 3, 4, or 5.

In this embodiment, $L_3=L_7/q$ ensures that the dimensions of the housings 211 of the battery cells 21 in each row within the battery 2 along the length direction X of the casing are equal, allowing for the use of battery cells 21 of the same specification in each row. Additionally, 0.17 m$\leq L_{3\leq 0.6}$ m and $1 \leq q \leq 5$ ensure that, in each row of the battery cells 21, the dimension of each battery cell 21 is relatively large, and the number of batteries 2 is not excessively large, reducing space occupied by walls of the housings 211 along the length direction X of the casing and increasing a dimension proportion of the housings 211 of each row of battery cells 21 within the battery 2 along the length direction X of the casing, thereby enhancing the space utilization of the battery 2 and enhancing the volumetric energy density of the battery 2.

In some embodiments, q=4, and 0.2 m$\leq L_{3\leq 0.3}$ m.

In this embodiment, $L_3$ may be any point value from 0.2 m, 0.21 m, 0.22 m, 0.23 m, 0.24 m, 0.25 m, 0.26 m, 0.27 m, 0.28 m, 0.29 m, 0.3 m, and the like, or a value in a range defined by any two of the above values.

When the number of battery cells 21 in each row of the battery cells 21 is four, controlling the dimension of the housing 211 of the battery cell 21 within a range of 0.2 m to 0.3 m ensures that the battery 2 has a relatively high volumetric energy density.

In some embodiments, q=2, and 0.4 m$\leq L_3 \leq$0.6 m.

In this embodiment, $L_3$ may be any point value from 0.4 m, 0.43 m, 0.45 m, 0.48 m, 0.5 m, 0.53 m, 0.55 m, 0.58 m, 0.6 m, and the like, or a value in a range defined by any two of the above values.

When the number of battery cells 21 in each row of the battery cells 21 is two, controlling the dimension of the housing 211 of the battery cell 21 within a range of 0.4 m$\leq L_3 \leq$0.6 m ensures that the battery 2 has a relatively high volumetric energy density.

In some embodiments, in each column of the battery cells 21, a sum of dimensions of the housings 211 of p battery cells 21 along the width direction Y of the casing is denoted as $D_7$, and the dimension of the battery 2 along the width direction Y of the casing is denoted as $D_5$, satisfying $0.75 \leq D_7/D_5 \leq 0.95$.

In each column of the battery cells 21, the dimensions of the housings 211 of the p battery cells 21 along the width direction Y of the casing may all be equal, or the dimensions of the housings 211 of at least two battery cells 21 along the width direction Y of the casing may differ.

In the embodiment shown in FIG. 16 and FIG. 17, the width direction of the housing 211 of the battery cell 21 and the length direction of the battery 2 are parallel to the width direction Y of the casing, the sum of dimensions of the housings 211 of the p battery cells 21 along the width direction Y of the casing is the sum of the widths of the housings 211 of the p battery cells 21, and the dimension of the battery 2 along the width direction Y of the casing is the length of the battery 2.

In this embodiment, $D_7/D_5$ may be any point value from 0.75, 0.78, 0.8, 0.83, 0.85, 0.87, 0.9, 0.92, 0.95, and the like, or a value in a range defined by any two of the above values.

In some embodiments, $D_7/D_5 \geq 0.75$ ensures that the dimension proportion of the housings 211 of each column of battery cells 21 within the battery 2 along the width direction Y of the casing is relatively large, fully utilizing space of the battery 2 along the width direction Y of the casing and reducing a gap between the housings 211 of two adjacent battery cells 21 along the width direction Y of the casing. This helps to increase the volume proportion of the housings 211 of all battery cells 21 within the battery 2 and enhance the volumetric energy density of the battery 2. $D_7/D_5 \leq 0.95$ ensures that the dimension proportion of the housings 211 of each column of battery cells 21 within the battery 2 along the width direction Y of the casing is not excessively large, reducing manufacturing difficulty and manufacturing costs of the battery 2.

In some embodiments, $0.82 \leq D_7/D_5 \leq 0.9$.

In this embodiment, $D_7/D_5$ may be any point value from 0.82, 0.83, 0.84, 0.85, 0.86, 0.87, 0.88, 0.89, 0.9, and the like, or a value in a range defined by any two of the above values.

In this embodiment, $0.82 \leq D_7/D_5 \leq 0.9$ balances the volumetric energy density of the battery 2, the manufacturing difficulty of the battery 2, and the cost-effectiveness requirements of the battery 2, further enhancing the volumetric energy density of the battery 2 while reducing manufacturing difficulty and manufacturing costs of the battery 2.

In some embodiments, along the width direction Y of the casing, a dimension of the housing 211 of each of the battery cells 21 is denoted as $D_3$, satisfying $D_3=D_7/p$, where 0.04 m≤$D_3$≤0.12 m, and 20≤p≤30.

$D_3$ may be any point value from 0.04 m, 0.05 m, 0.06 m, 0.07 m, 0.08 m, 0.09 m, 0.1 m, 0.11 m, 0.12 m, and the like, or a value in a range defined by any two of the above values. p may be 20, 21, 22, 23, 24, 25, 26, 28, 29, or 30.

In this embodiment, $D_3=D_7/p$ ensures that the dimensions of the housings 211 of the battery cells 21 in each column within the battery 2 along the width direction Y of the casing are equal, allowing for the use of battery cells 21 of the same specification in each column. Additionally, 0.04 m≤$D_3$≤0.12 m and 20≤p≤30 ensure that in each column of the battery cells 21, the dimension of each battery cell 21 is relatively large, and the number of batteries 2 is not excessively large, reducing space occupied by walls of the housings 211 along the width direction Y of the casing and increasing a dimension proportion of the housings 211 of each column of battery cells 21 within the battery 2 along the width direction Y of the casing, thereby enhancing the space utilization of the battery 2 and enhancing the volumetric energy density of the battery 2.

In some embodiments, 0.06 m≤$D_3$≤0.08 m, and 24≤p≤28.

In this embodiment, $D_3$ may be any point value from 0.06 m, 0.063 m, 0.065 m, 0.068 m, 0.07 m, 0.073 m, 0.075 m, 0.078 m, 0.08 m, and the like, or a value in a range defined by any two of the above values. p may be 24, 25, 26, or 28.

In this embodiment, 0.06 m≤$D_3$≤0.08 m, and 24≤p≤28. Such a battery 2 has a relatively high volumetric energy density.

In some embodiments, the dimension of the housing 211 of the battery cell 21 along the height direction Z of the casing is denoted as $H_3$, and the dimension of the battery 2 along the height direction Z of the casing is denoted as $H_5$, satisfying 0.75≤$H_3/H_5$≤0.95.

In the embodiment shown in FIG. 16 and FIG. 17, the height direction of the housing 211 of the battery cell 21 and the height direction of the battery 2 are parallel to the height direction Z of the casing, the dimension of the housing 211 of the battery cell 21 along the height direction Z of the casing is the height of the housing 211 of the battery cell 21, and the dimension of the battery 2 along the height direction Z of the casing is the height of the battery 2.

$H_3/H_5$ may be any point value from 0.75, 0.78, 0.8, 0.83, 0.85, 0.87, 0.9, 0.92, 0.95, and the like, or a value in a range defined by any two of the above values.

In this embodiment, $H_3/H_5$≥0.75 ensures that the dimension proportion of the housings 211 of the battery cells 21 within the battery 2 along the height direction Z of the casing is relatively large, fully utilizing space of the battery 2 along the height direction Z of the casing and increasing a volume proportion of the housings 211 of all battery cells 21 within the battery 2, thereby enhancing the volumetric energy density of the battery 2. $H_3/H_5$≤0.95 ensures that the dimension proportion of the housings 211 of the battery cells 21 within the battery 2 along the height direction Z of the casing is not excessively large, reducing manufacturing difficulty and manufacturing costs of the battery 2.

In some embodiments, 0.82≤$H_3/H_5$≤0.9.

In this embodiment, $H_3/H_5$ may be any point value from 0.82, 0.83, 0.84, 0.85, 0.86, 0.87, 0.88, 0.89, 0.9, and the like, or a value in a range defined by any two of the above values.

In this embodiment, 0.82≤$H_3/H_5$≤0.9 balances the volumetric energy density of the battery 2, the manufacturing difficulty of the battery 2, and the cost-effectiveness requirements of the battery 2, further enhancing the volumetric energy density of the battery 2 while reducing manufacturing difficulty and manufacturing costs of the battery 2.

In some embodiments, 0.17 m≤$H_3$≤0.6 m.

$H_3$ may be any point value from 0.17 m, 0.2 m, 0.25 m, 0.3 m, 0.35 m, 0.4 m, 0.45 m, 0.5 m, 0.55 m, 0.6 m, and the like, or a value in a range defined by any two of the above values.

In this embodiment, $H_3$≥0.17 m ensures that a dimension of the housing 211 of each battery cell 21 along the height direction Z of the casing is relatively large, increasing the dimension proportion of the housings 211 of the battery cells 21 within the battery 2 along the height direction Z of the casing and enhancing the volumetric energy density of the battery cell 21. $H_3$≤0.6 m ensures that the dimension of the housing 211 of each battery cell 21 along the height direction Z of the casing is not excessively large, effectively reducing manufacturing difficulty and manufacturing costs of the battery cells 21.

In some embodiments, 0.2 m≤$H_3$≤0.45 m.

In this embodiment, $H_3$ may be any point value from 0.2 m, 0.23 m, 0.25 m, 0.28 m, 0.3 m, 0.33 m, 0.35 m, 0.38 m, 0.4 m, 0.43 m, 0.45 m, and the like, or a value in a range defined by any two of the above values.

In this embodiment, 0.2 m≤$H_3$≤0.45 m balances the volumetric energy density of the battery 2, the manufacturing difficulty of the battery 2, and the cost-effectiveness requirements of the battery 2, further enhancing the volumetric energy density of the battery 2 while reducing manufacturing difficulty and manufacturing costs of the battery 2.

Figure 18:
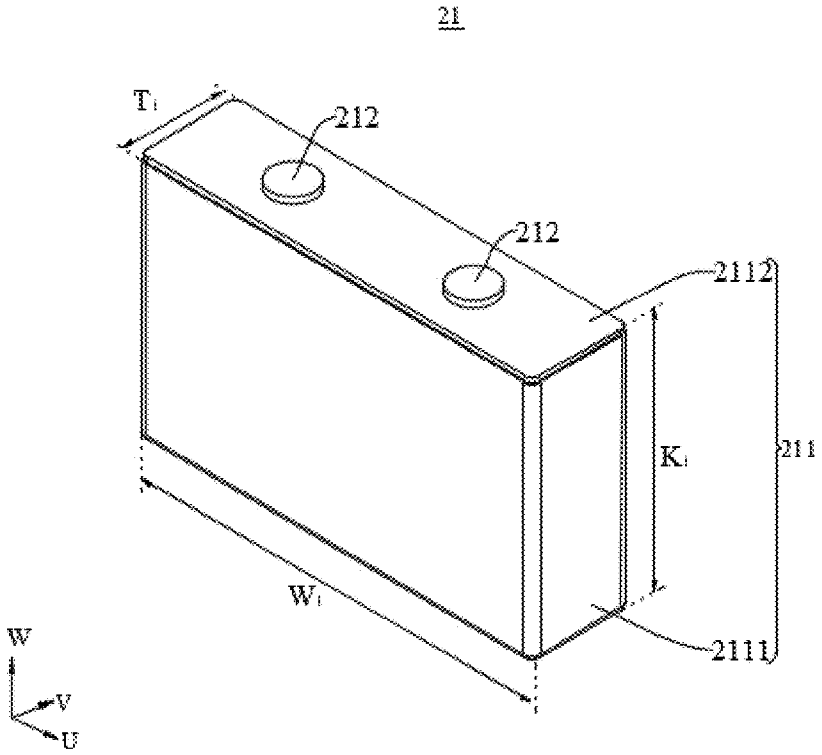
FIG. 18 is an isometric view of a battery cell according to some embodiments of this application.
Figure 19:
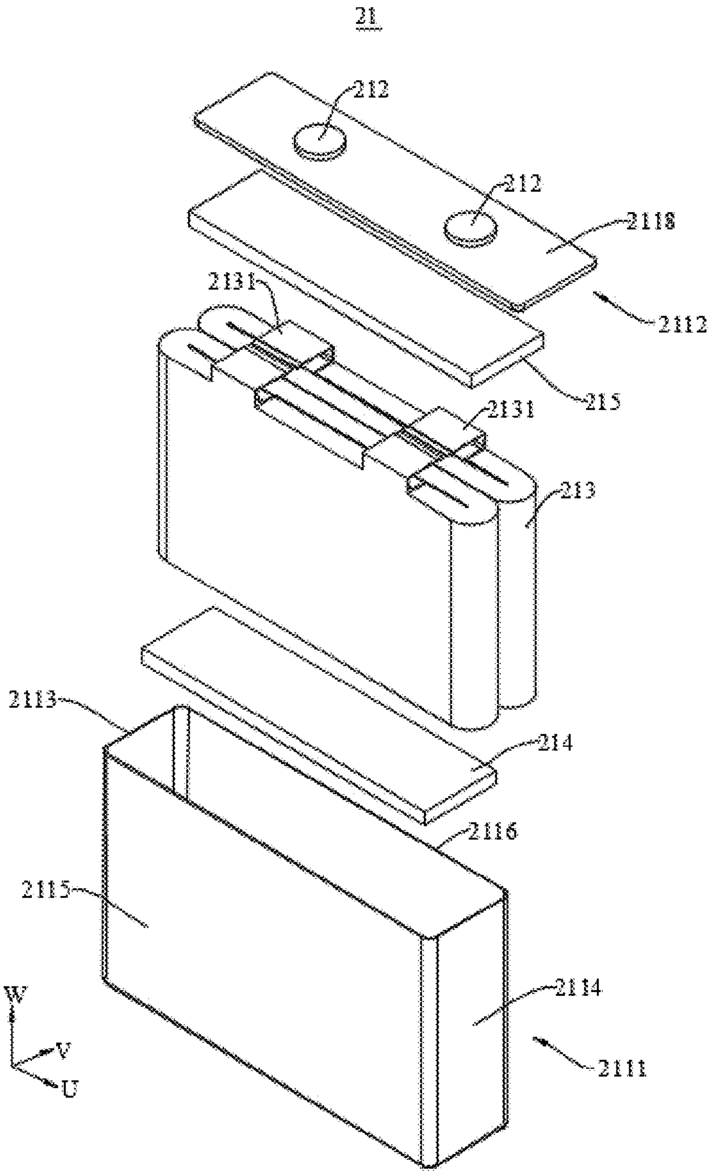
FIG. 19 is an exploded view of the battery cell shown in FIG. 18.
Figure 20:
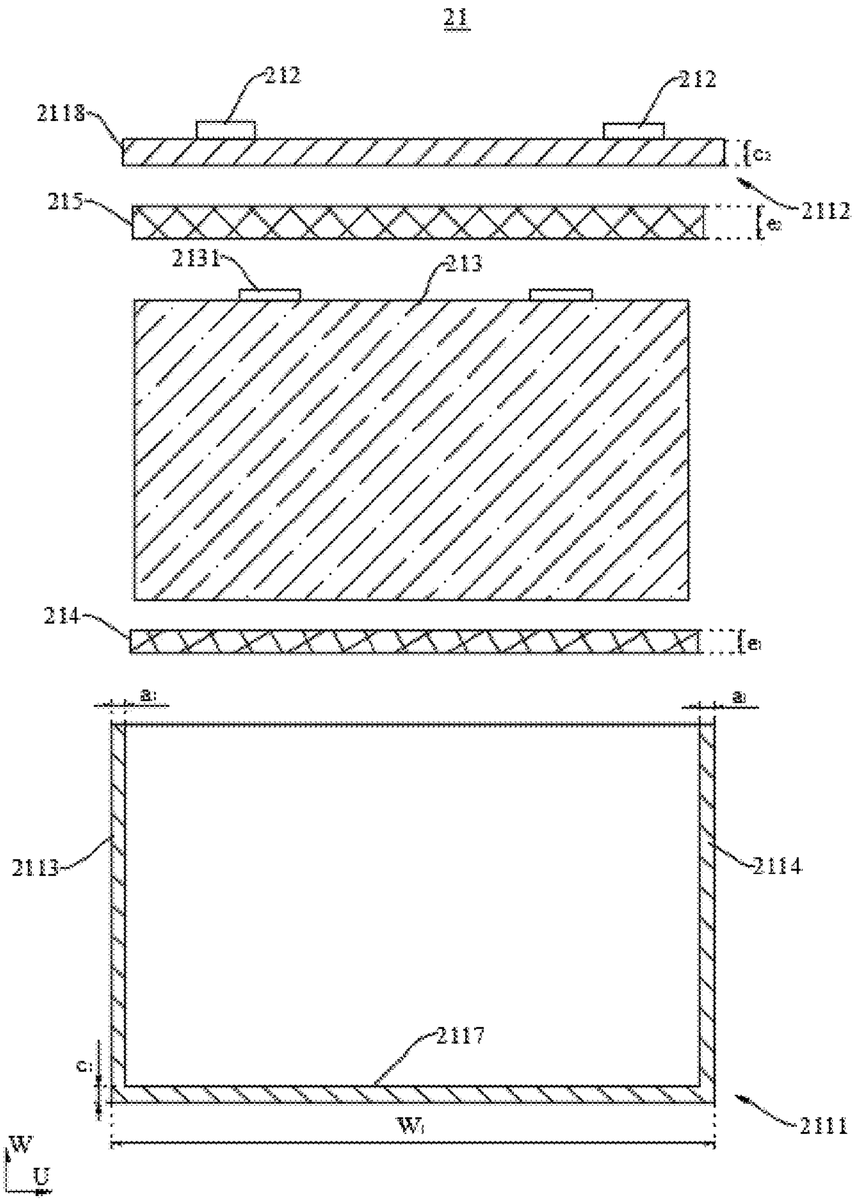
FIG. 20 is an exploded sectional view of the battery cell shown in FIG. 18 cut along a UW plane.
Figure 21:
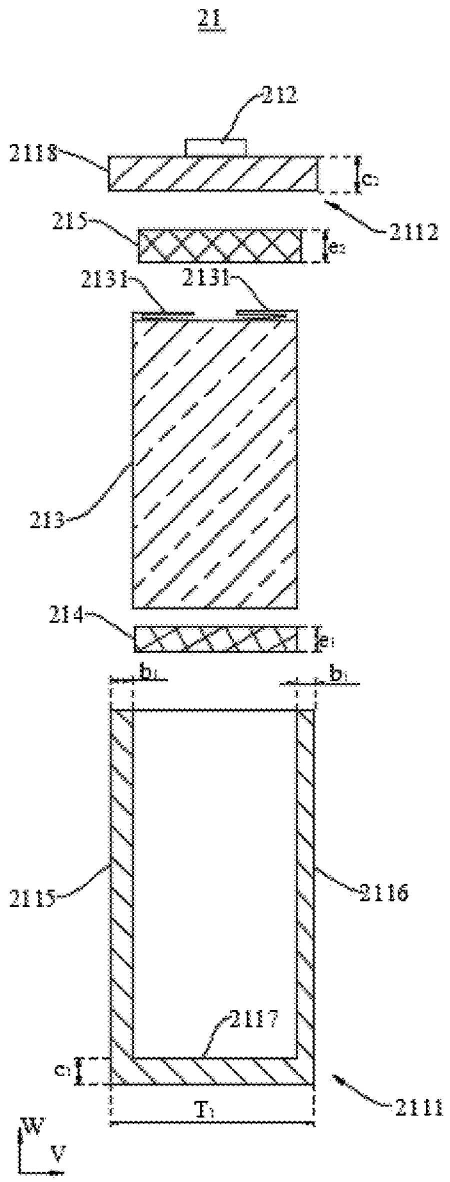
FIG. 21 is an exploded sectional view of the battery cell shown in FIG. 18 cut along a VW plane.
Figure 22:
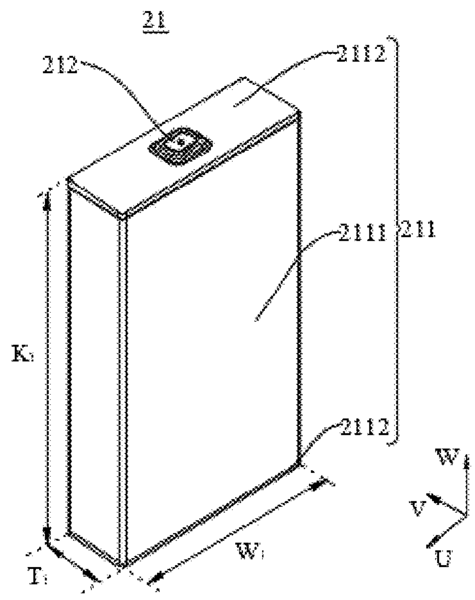
FIG. 22 is an isometric view of a battery cell according to some other embodiments of this application.

In some embodiments, referring to FIG. 18 to FIG. 21, FIG. 18 is an isometric view of a battery cell 21 according to some embodiments of this application;

FIG. 19 is an exploded view of the battery cell 21 shown in FIG. 18; FIG. 20 is an exploded sectional view of the battery cell 21 shown in FIG. 18 cut along a UW plane; and FIG. 21 is an exploded sectional view of the battery cell 21 shown in FIG. 18 cut along a VW plane. The battery cell 21 further includes at least one electrode assembly 213, the electrode assembly 213 being accommodated within the housing 211. The housing 211 is a right parallelepiped in shape, a dimension of the housing 211 in a first direction U is denoted as $W_1$, a dimension of the housing 211 in a second direction V is denoted as $T_1$, and a dimension of the housing 211 in a third direction W is denoted as $K_1$, where one of the first direction U, the second direction V, and the third direction W is parallel to the length direction X of the casing, another is parallel to the width direction Y of the casing, and the remaining one is parallel to the height direction Z of the casing. The housing 211 includes a first wall 2113 and a second wall 2114 disposed opposite each other along the first direction U, a third wall 2115 and a fourth wall 2116 disposed opposite each other along the second direction V, and a fifth wall 2117 and a sixth wall 2118 disposed opposite each other along the third direction W. A sum of thicknesses of the first wall 2113 and the second wall 2114 is denoted as a, a sum of thicknesses of the third wall 2115 and the fourth wall 2116 is denoted as b, and a sum of thicknesses of the fifth wall 2117 and the sixth wall 2118 is denoted as c, satisfying $$(W_1-a)*(T_1-b)*(K_1-c)/(W_1*T_1*K_1)\geq 0.9.$$

$W_1*T_1*K_1$ represents the volume of the housing 211, that is, $V_3=W_1*T_1*K_1$.

One or more electrode assemblies 213 may be provided within the housing 211. If a plurality of electrode assemblies 213 are provided within the housing 211, the plurality of electrode assemblies 213 may be connected in parallel.

The housing 211 is a right parallelepiped in shape, where the right parallelepiped may be a rectangular parallelepiped, a cube, or the like. Among the six walls of the housing 211, four walls may form the housing 211 with the other two walls being end caps 2112, or five walls may form the housing 211 with the other wall being an end cap 2112. The dimension of the housing 211 in the first direction U, the dimension of the housing 211 in the second direction V, the dimension of the housing 211 in the third direction W, the thickness of the first wall 2113, the thickness of the second wall 2114, the thickness of the third wall 2115, the thickness of the fourth wall 2116, the thickness of the fifth wall 2117, and the thickness of the sixth wall 2118 can all be measured using a vernier caliper.

In an example, the first wall 2113, the second wall 2114, the third wall 2115, the fourth wall 2116, the fifth wall 2117, and the sixth wall 2118 are all made of aluminum alloy. The aluminum alloy includes the following components by mass percentage: aluminum≥96.7%, 0.05%≤copper≤0.2%, iron≤0.7%, manganese≤1.5%, silicon≤0.6%, zinc≤0.1%, other individual element components≤0.05%, and total other elements≤0.15%.

In an example, the first direction U is the length direction of the housing 211 of the battery cell 21, the second direction V is the width direction of the housing 211 of the battery cell 21, and the third direction W is the height direction of the housing 211 of the battery cell 21. It can be understood that $W_1$ is the length of the housing 211 of the battery cell 21, $T_1$ is the width of the housing 211 of the battery cell 21, and $K_1$ is the height of the housing 211 of the battery cell 21.

$(W_1-a)*(T_1-b)*(K_1-c)/(W_1*T_1*K_1)$ may be any point value from 0.9, 0.905, 0.91, 0.915, 0.92, 0.925, 0.93, 0.935, 0.94, 0.945, 0.95, 0.955, 0.96, 0.965, 0.97, 0.975, 0.98, 0.985, 0.99, 0.995, and the like, or a value in a range defined by any two of the above values.

$(W_1-a)*(T_1-b)*(K_1-c)$ can be understood as the volume of the internal space of the housing 211, that is, the volume of the space enclosed by the inner surfaces of the housing 211. $W_1*T_1*K_1$ is the volume of the housing 211. It should be noted that in an embodiment that a protrusion **2112*b* protruding from the outer surface 2112*a* of the end cap is formed on the end cap 2112 of the housing 211, the volume of the housing 211 does not include the volume of the protrusion 2112*b***.

If the outer surfaces of all six walls of the housing 211 are planar, $W_1$, $T_1$, and $K_1$ are measured based on the outer surface of each wall. For example, if the outer surface of the fifth wall 2117 and the outer surface of the sixth wall 2118 are both planar, $K_1$ is a distance between the outer surface of the fifth wall 2117 and the outer surface of the sixth wall 2118 along the third direction W.

If a protrusion or recess is formed on an outer surface of a wall of the housing 211, $W_1$, $T_1$, and $K_1$ are measured based on a planar region of that outer surface (that is, a region excluding the protrusion or recess). For example, if the outer surface of the fifth wall 2117 is planar and the outer surface of the sixth wall 2118 has a first protrusion (for example, the sixth wall 2118 is an end cap 2112, and a protrusion formed on the end cap 2112 is the first protrusion), $K_1$ is a distance between the planar region of the outer surface of the sixth wall 2118 excluding the first protrusion and the outer surface of the fifth wall 2117 along the third direction W. If the outer surface of the sixth wall 2118 has a first protrusion and the outer surface of the fifth wall 2117 has a second protrusion, $K_1$ is a distance along the third direction W between a planar region of the outer surface of the fifth wall 2117 excluding the second protrusion and a planar region of the outer surface of the sixth wall 2118 excluding the first protrusion.

If all six walls of the housing 211 are walls of uniform thickness, a distance between the outer surface and the inner surface of each wall can be measured at any position to obtain a thickness of that wall. If a wall of the housing 211 is a wall of non-uniform thickness, a distance between the outer surface and the inner surface of that wall is measured at the position of maximum thickness to obtain a thickness of that wall. In other words, if the thickness of a wall is non-uniform, the maximum thickness of that wall is used to calculate a, b, or c.

In such a battery cell 21, a ratio of a volume of an internal space of the housing 211 of the battery cell 21 to a volume of the housing 211 is 0.9 or greater, so that a proportion of the internal space of the housing 211 is relatively large, increasing space within the housing 211 available for accommodating the electrode assembly 213, and under the same chemical system, enhancing the volumetric energy density of the battery cell 21.

Specific experimental data are provided below for detailed explanation.

In the experiment, a square-shell battery cell is selected as the battery cell 21, the housing body 2111 of the housing 211 is a hollow structure with an opening at one end, and the battery cell 21 includes one end cap 2112.

TABLE 2

| No. | $W_1$ (mm) | $T_1$ (mm) | $K_1$ (mm) | a (mm) | b (mm) | c (mm) | Battery cell chemical system | $(W_1 - a) * (T_1 - b) * (K_1 - c)/(W_1 * T_1 * K_1)$ | Volumetric energy density of battery cell (Ah/L) |
|---|---|---|---|---|---|---|---|---|---|
| Example 13 | 800 | 100 | 51.9 | 1.2 | 1.6 | 4 | Lithium-containing phosphate | 0.91 | 118 |
| Example 14 | 690 | 100 | 60.2 | 1.2 | 1.6 | 4 | Lithium-containing phosphate | 0.92 | 119.3 |
| Example 15 | 580 | 100 | 71.6 | 1.2 | 1.6 | 4 | Lithium-containing phosphate | 0.93 | 120.6 |

TABLE 2-continued

| No. | $W_1$ (mm) | $T_1$ (mm) | $K_1$ (mm) | a (mm) | b (mm) | c (mm) | Battery cell chemical system | $(W_1 - a) * (T_1 - b) * (K_1 - c)/(W_1 * T_1 * K_1)$ | Volumetric energy density of battery cell (Ah/L) |
|---|---|---|---|---|---|---|---|---|---|
| Example 16 | 470 | 100 | 88.4 | 1.2 | 1.6 | 4 | Lithium-containing phosphate | 0.94 | 121.9 |
| Example 17 | 690 | 100 | 48.9 | 1.6 | 2 | 4 | Lithium transition metal oxide | 0.9 | 190.1 |
| Example 18 | 610 | 100 | 55.4 | 1.6 | 2 | 4 | Lithium transition metal oxide | 0.91 | 192.2 |
| Example 19 | 520 | 100 | 65 | 1.6 | 2 | 4 | Lithium transition metal oxide | 0.92 | 194.3 |
| Example 20 | 430 | 100 | 78.5 | 1.6 | 2 | 4 | Lithium transition metal oxide | 0.93 | 196.4 |
| Example 21 | 760 | 90 | 49.4 | 1.6 | 2 | 4 | Sodium-ion battery cell | 0.9 | 87 |
| Example 22 | 660 | 90 | 56.8 | 1.6 | 2 | 4 | Sodium-ion battery cell | 0.91 | 88 |
| Example 23 | 560 | 90 | 67 | 1.6 | 2 | 4 | Sodium-ion battery cell | 0.92 | 88.9 |
| Example 24 | 460 | 90 | 81.5 | 1.6 | 2 | 4 | Sodium-ion battery cell | 0.93 | 89.9 |
| Comparative Example 3 | 1120 | 100 | 37.1 | 1.2 | 1.6 | 4 | Lithium-containing phosphate | 0.88 | 115.3 |
| Comparative Example 4 | 870 | 100 | 38.5 | 1.6 | 2 | 4 | Lithium transition metal oxide | 0.88 | 185.8 |
| Comparative Example 5 | 960 | 90 | 39.1 | 1.6 | 2 | 4 | Sodium-ion battery cell | 0.88 | 85.1 |

According to Table 2 above, comparison between Examples 13 to 16 and Comparative Example 3 shows that when the positive electrode material of the battery cell 21 includes lithium-containing phosphate, $(W_1-a)*(T_1-b)*(K_1-c)/(W_1*T_1*K_1)\geq0.9$ can effectively enhance the volumetric energy density of the battery cell 21. Comparison between Examples 17 to 20 and Comparative Example 4 shows that when the positive electrode material of the battery cell 21 includes lithium transition metal oxide, $(W_1-a)*(T_1-b)*(K_1-c)/(W_1*T_1*K_1)\geq0.9$ can effectively enhance the volumetric energy density of the battery cell 21. Comparison between Examples 21 to 24 and Comparative Example 5 shows that when the battery cell 21 is a sodium-ion battery cell, $(W_1-a)*(T_1-b)*(K_1-c)/(W_1*T_1*K_1)\geq0.9$ can effectively enhance the volumetric energy density of the battery cell 21.

In some embodiments, $(W_1-a)/W_1\geq0.97$, $(T_1-b)/T_1\geq0.965$, and $(K_1-c)/K_1\geq0.965$.

With the ratio of $(W_1-a)$ to $W_1$ set to 0.97 or greater, when the length of the battery cell 21 remains unchanged, a length of the internal space of the housing 211 increases, allowing for accommodation of a longer electrode assembly 213; and under the same chemical material system, the volumetric energy density of the battery cell 21 can be enhanced. $(W_1-a)/W_1$ may be any point value from 0.97, 0.975, 0.98, 0.985, 0.99, 0.995, and the like, or a value in a range defined by any two of the above values.

With the ratio of $(T_1-b)$ to $T_1$ set to 0.965 or greater, when the width of the battery cell 21 remains unchanged, a width of the internal space of the housing 211 increases, allowing for accommodation of a wider electrode assembly 213; and under the same chemical material system, the volumetric energy density of the battery cell 21 can be enhanced. $(T_1-b)/T_1$ may be any point value from 0.965, 0.97, 0.975, 0.98, 0.985, 0.99, 0.995, and the like, or a value in a range defined by any two of the above values.

With the ratio of $(K_1-c)$ to $K_1$ set to 0.965 or greater, when the height of the battery cell 21 remains unchanged, a height of the internal space of the housing 211 increases, allowing for accommodation of a taller electrode assembly 213; and under the same chemical material system, the volumetric energy density of the battery cell 21 can be enhanced. $(K_1-c)/K_1$ may be any point value from 0.965, 0.97, 0.975, 0.98, 0.985, 0.99, 0.995, and the like, or a value in a range defined by any two of the above values.

In some embodiments, still referring to FIG. 18 to FIG. 21, the housing 211 includes a housing body 2111 and an end cap 2112, the housing body 2111 has an opening, the end cap 2112 covers the opening, and the end cap 2112 is provided with electrode terminals 212. The housing body 2111 includes the first wall 2113, the second wall 2114, the third wall 2115, the fourth wall 2116, and the fifth wall 2117 integrally formed, and the end cap 2112 serves as the sixth wall 2118.

In this embodiment, the housing body 2111 is a hollow structure with an opening formed at one end, and the housing 211 includes one end cap 2112. The end cap 2112 and the housing body 2111 are separately arranged and connected, and the end cap 2112 and the housing body 2111 may be connected by welding, crimping, or the like.

During assembly of the battery 2, the electrode terminals 212 can first be installed on the end cap 2112, then the electrode assembly 213 can be accommodated within the housing body 2111, and subsequently the end cap 2112 can cover the opening of the housing body 2111, reducing the difficulty of installing the electrode assembly 213 within the housing 211 and reducing the difficulty of installing the electrode terminals 212 on the housing 211.

In some embodiments, still referring to FIG. 20 and FIG. 21, the thickness of the first wall 2113 and the thickness of the second wall 2114 are both $a_1$, and $2*a_1=a$; the thickness of the third wall 2115 and the thickness of the fourth wall 2116 are both $b_1$, and $2*b_1=b$; and the thickness of the fifth wall 2117 is $c_1$, and the thickness of the sixth wall 2118 is $c_2$, and $c_2>c_1$, $c_1>a_1$, and $c_1>b_1$. 0.5 mm$\leq a_1\leq$1.5 mm, $0.5\leq b_1\leq$1.5 mm, 1.0 mm$\leq c_1\leq$2.5 mm, and 1.5 mm$\leq c_2\leq$4 mm.

To reduce the possibility of interference between the electrode assembly 213 and the housing body 2111 during the process of loading the electrode assembly 213 into the housing body 2111 and to lower the risk of damage to the electrode assembly 213, an assembly gap (that is, an insertion gap) is reserved for the electrode assembly 213 in the design of the housing body 2111, where the assembly gap may be 0.8-2 mm.

Additionally, to reduce the possibility of an internal short circuit in the battery cell 21, an insulating member may be provided inside the housing 211, but the insulating member inevitably occupies some internal space of the housing 211, reducing the space available for the electrode assembly 213 and the electrolyte.

In some embodiments, the battery cell 21 further includes a first insulating member 214 and a second insulating member 215, where the first insulating member 214 is disposed between the fifth wall 2117 and the electrode assembly 213 and abuts against the fifth wall 2117, and the second insulating member 215 is disposed between the sixth wall 2118 and the electrode assembly 213 and abuts against the sixth wall 2118. A maximum dimension of the first insulating member 214 in the third direction W is denoted as $e_1$, and a maximum dimension of the second insulating member 215 in the third direction W is denoted as $e_2$, satisfying: $(W_1-a-1.6\ mm)*(T_1b-1.6\ mm)*(K_1-c-e_1-e_2)/(W_1*T_1*K_1)\geq 0.88$, 0.3 mm$\leq e_1\leq$1.2 mm, and 2 mm$\leq e_{2\leq 10}$ mm.

$(W_1-a-1.6\ mm)*(T_1-b-1.6\ mm)*(K_1-c-e_1-e_2)/(W_1*T_1*K_1)$ may be any point value from 0.88, 0.89, 0.90, 0.91, 0.92, 0.93, 0.94, 0.95, 0.96, 0.97, 0.98, 0.99, and the like, or a value in a range defined by any two of the above values.

$e_1$ may be any point value from 0.3 mm, 0.4 mm, 0.5 mm, 0.6 mm, 0.7 mm, 0.8 mm, 0.9 mm, 1 mm, 1.1 mm, 1.2 mm, and the like, or a value in a range defined by any two of the above values.

$e_2$ may be any point value from 2 mm, 3 mm, 4 mm, 5 mm, 6 mm, 7 mm, 8 mm, 9 mm, 10 mm, and the like, or a value in a range defined by any two of the above values.

In this embodiment, $(W_1-a-1.6\ mm)$ means: a maximum dimension of the internal space of the housing 211 reserved for the electrode assembly 213 along the first direction U when the assembly gap between the electrode assembly 213 and the housing body 2111 is 0.8 mm. $(T_1-b-1.6\ mm)$ means: a maximum dimension of the internal space of the housing 211 reserved for the electrode assembly 213 along the second direction V when the assembly gap between the electrode assembly 213 and the housing body 2111 is 0.8 mm. $(K_1-c-e_1-e_2)$ means: a maximum dimension of the internal space of the housing 211 reserved for the electrode assembly 213 along the third direction W when the first insulating member 214 abutting against the fifth wall 2117 is disposed between the fifth wall 2117 and the electrode assembly 213, and the second insulating member 215 abutting against the sixth wall 2118 is disposed between the sixth wall 2118 and the electrode assembly 213. The first insulating member 214 may be a bottom support plate, and the second insulating member 215 may be a lower plastic component.

In this embodiment, $(W_1-a-1.6\ mm)*(T_1-b-1.6\ mm)*(K_1-c-e_1-e_2)/(W_1*T_1*K_1)\geq 0.88$ increases the space within the housing 211 reserved for the electrode assembly 213, allowing for accommodation of a larger-volume electrode assembly 213, thereby further enhancing the volumetric energy density of the battery cell 21.

In some embodiments, the battery cell 21 further includes a first insulating member 214 and a second insulating member 215, where the first insulating member 214 is disposed between the fifth wall 2117 and the electrode assembly 213 and abuts against the fifth wall 2117, and the second insulating member 215 is disposed between the sixth wall 2118 and the electrode assembly 213 and abuts against the sixth wall 2118. A maximum dimension of the first insulating member 214 in the third direction W is denoted as $e_1$, and a maximum dimension of the second insulating member 215 in the third direction W is denoted as $e_2$, satisfying: $(W_1-a-4\ mm)*(T_1-b-4\ mm)*(K_1-c-e_1-e_2)/(W_1*T_1*K_1)\geq 0.85$, 0.3 mm$\leq e_1\leq$1.2 mm, and 2 mm$\leq e_2\leq$10 mm.

$(W_1-a-4\ mm)*(T_1-b-4\ mm)*(K_1-c-e_1-e_2)/(W_1*T_1*K_1)$ may be any point value from 0.85, 0.86, 0.87, 0.88, 0.89, 0.90, 0.91, 0.92, 0.93, 0.94, 0.95, 0.96, 0.97, 0.98, 0.99, and the like, or a value in a range defined by any two of the above values.

$e_1$ may be any point value from 0.3 mm, 0.4 mm, 0.5 mm, 0.6 mm, 0.7 mm, 0.8 mm, 0.9 mm, 1 mm, 1.1 mm, 1.2 mm, and the like, or a value in a range defined by any two of the above values.

$e_2$ may be any point value from 2 mm, 3 mm, 4 mm, 5 mm, 6 mm, 7 mm, 8 mm, 9 mm, 10 mm, and the like, or a value in a range defined by any two of the above values.

In this embodiment, $(W_1-a-4\ mm)$ means: a maximum dimension of the internal space of the housing 211 reserved for the electrode assembly 213 along the first direction U when the assembly gap between the electrode assembly 213 and the housing body 2111 is 2 mm. $(T_1-b-4\ mm)$ means:

a maximum dimension of the internal space of the housing 211 reserved for the electrode assembly 213 along the second direction V when the assembly gap between the electrode assembly 213 and the housing body 2111 is 2 mm. ($K_1$−c−$e_1$−$e_2$) means: a maximum dimension of the internal space of the housing 211 reserved for the electrode assembly 213 along the third direction W when the first insulating member 214 abutting against the fifth wall 2117 is disposed between the fifth wall 2117 and the electrode assembly 213, and the second insulating member 215 abutting against the sixth wall 2118 is disposed between the sixth wall 2118 and the electrode assembly 213.

In this embodiment, ($W_1$−a−4 mm)*($T_1$−b−4 mm)*($K_1$−c−$e_1$−$e_2$)/($W_1$*$T_1$*$K_1$)≥0.85 increases the space within the housing 211 reserved for the electrode assembly 213, allowing for accommodation of a larger-volume electrode assembly 213, thereby further enhancing the volumetric energy density of the battery cell 21.

In some embodiments, $W_1 \geq T_1$, the first direction U is parallel to the length direction X of the casing, the second direction V is parallel to the width direction Y of the casing, and the third direction W is parallel to the height direction Z of the casing.

In an example, the first direction U is the length direction of the housing 211 of the battery cell 21, the second direction V is the width direction of the housing 211 of the battery cell 21, and the third direction W is the height direction of the housing 211 of the battery cell 21, such that the length direction of the housing 211 is parallel to the length direction X of the casing, the width direction of the housing 211 is parallel to the width direction Y of the casing, and the height direction of the housing 211 is parallel to the height direction Z of the casing.

In a case that the housing body 2111 has an end cap 2112 disposed at only one end and $W_1 \geq T_1$, the end cap 2112 and the fifth wall 2117 of the housing 211 are disposed opposite each other along the height direction Z of the casing, the first wall 2113 and the second wall 2114 of the housing 211 are disposed opposite each other along the length direction X of the casing, and the third wall 2115 and the fourth wall 2116 of the housing 211 are disposed opposite each other along the width direction Y of the casing, increasing the volume proportion of all battery cells 21 within the battery compartment 11.

Figure 23:
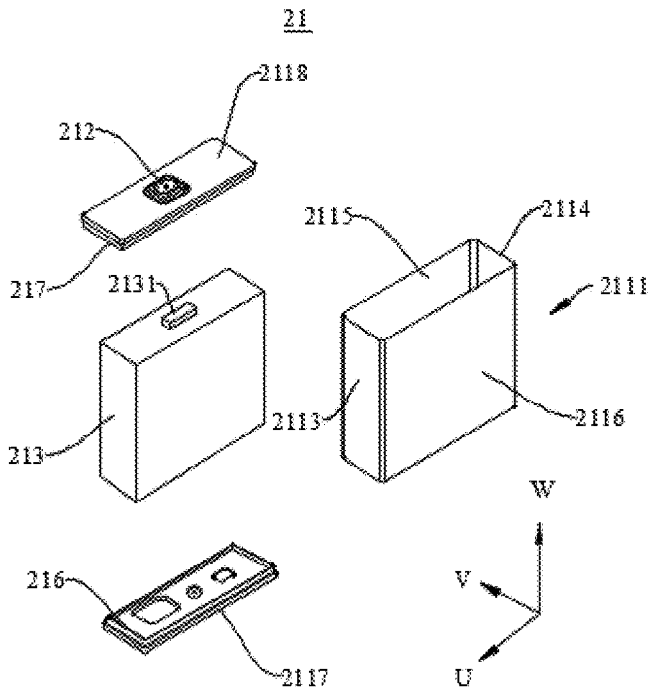
FIG. 23 is an exploded view of the battery cell shown in FIG. 22.
Figure 24:
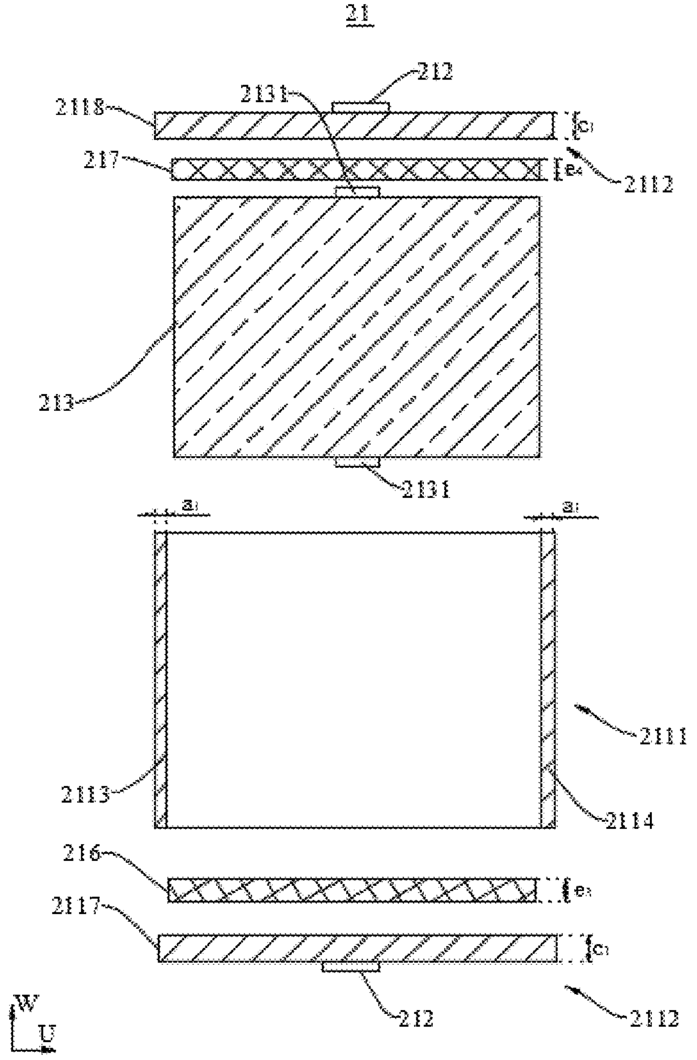
FIG. 24 is an exploded sectional view of the battery cell shown in FIG. 22 cut along a UW plane.
Figure 25:
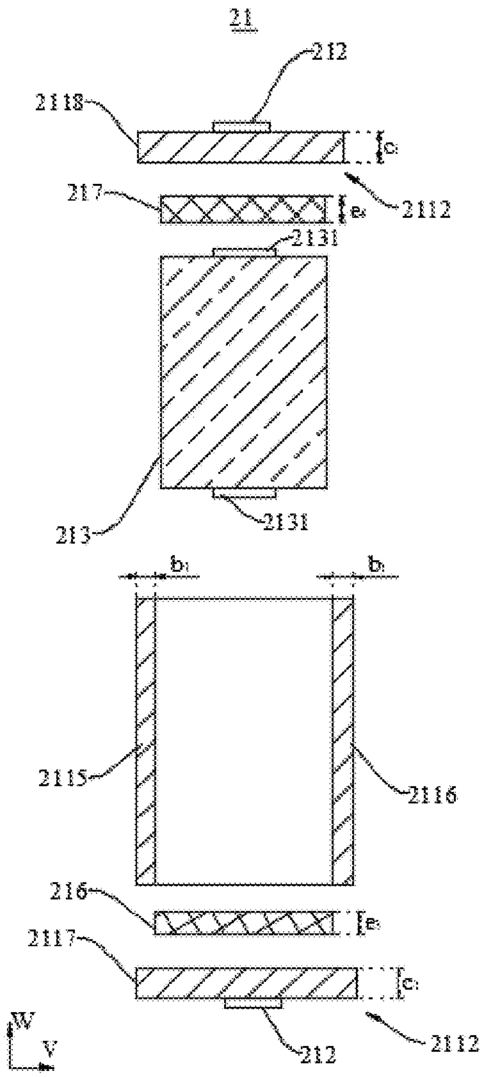
FIG. 25 is an exploded sectional view of the battery cell shown in FIG. 22 cut along a VW plane.

In some embodiments, referring to FIG. 22 to FIG. 25, FIG. 22 is an isometric view of a battery cell 21 according to some other embodiments of this application; FIG. 23 is an exploded view of the battery cell 21 shown in FIG. 22; FIG. 24 is an exploded sectional view of the battery cell 21 shown in FIG. 22 cut along a UW plane; and FIG. 25 is an exploded sectional view of the battery cell 21 shown in FIG. 22 cut along a VW plane. The housing 211 includes a housing body 2111 and two end caps 2112, the housing body 2111 has two openings disposed opposite each other along the third direction W, the two end caps 2112 respectively cover the two openings, and at least one of the end caps 2112 is provided with electrode terminals 212. The housing body 2111 includes the first wall 2113, the second wall 2114, the third wall 2115, and the fourth wall 2116 integrally formed, and the two end caps 2112 are the fifth wall 2117 and the sixth wall 2118, respectively.

In this embodiment, the housing body 2111 is a hollow structure with openings formed at two ends, and the housing 211 includes two end caps 2112, where the two end caps 2112 respectively close the openings at two ends of the housing body 2111.

In some embodiments, still referring to FIG. 24 and FIG. 25, the thickness of the first wall 2113 and the thickness of the second wall 2114 are both $a_1$, and 2*$a_1$=a; the thickness of the third wall 2115 and the thickness of the fourth wall 2116 are both $b_1$, and 2*$b_1$=b; and the thickness of the fifth wall 2117 and the thickness of the sixth wall 2118 are both $c_1$, and 2*$c_1$=c, where $c_1>a_1$, and $c_1 \geq b_1$. 0.5 mm≤$a_1$≤1.5 mm, 0.5≤$b_1$1.5 mm, and 1.0 mm≤$c_1$ 4 mm.

To reduce the possibility of interference between the electrode assembly 213 and the housing body 2111 during the process of loading the electrode assembly 213 into the housing body 2111 and to lower the risk of damage to the electrode assembly 213, an assembly gap (that is, an insertion gap) is reserved for the electrode assembly 213 in design of the housing body 2111, where the assembly gap may be 0.8-2 mm.

Additionally, to reduce the possibility of an internal short circuit in the battery cell 21, an insulating member may be provided inside the housing 211, but the insulating member inevitably occupies some internal space of the housing 211, reducing the space available for the electrode assembly 213 and the electrolyte.

In some embodiments, the battery cell 21 further includes a third insulating member 216 and a fourth insulating member 217, where the third insulating member 216 is disposed between the fifth wall 2117 and the electrode assembly 213 and abuts against the fifth wall 2117, and the fourth insulating member 217 is disposed between the sixth wall 2118 and the electrode assembly 213 and abuts against the sixth wall 2118. A maximum dimension of the third insulating member 216 in the third direction W is denoted as $e_3$, and a maximum dimension of the fourth insulating member 217 in the third direction W is denoted as $e_4$, satisfying: ($W_1$−a−1.6 mm)*($T_1$−b−1.6 mm)*($K_1$−c−$e_3$−$e_4$)/($W_1$*$T_1$*$K_1$)≥0.88, 2 mm≤$e_{3\leq 10}$ mm, and 2 mm≤$e_4$≤10 mm.

($W_1$−a−1.6 mm)*($T_1$−b−1.6 mm)*($K_1$−c−$e_3$−$e_4$)/($W_1$*$T_1$*$K_1$) may be any point value from 0.88, 0.89, 0.9, 0.91, 0.92, 0.93, 0.94, 0.95, 0.96, 0.97, 0.98, 0.99, and the like, or a value in a range defined by any two of the above values.

$e_3$ may be any point value from 2 mm, 3 mm, 4 mm, 5 mm, 6 mm, 7 mm, 8 mm, 9 mm, 10 mm, and the like, or a value in a range defined by any two of the above values.

$e_4$ may be any point value from 2 mm, 3 mm, 4 mm, 5 mm, 6 mm, 7 mm, 8 mm, 9 mm, 10 mm, and the like, or a value in a range defined by any two of the above values.

In this embodiment, ($W_1$−a−1.6 mm) means: a maximum dimension of the internal space of the housing 211 reserved for the electrode assembly 213 along the first direction U when the assembly gap between the electrode assembly 213 and the housing body 2111 is 0.8 mm. ($T_1$−b−1.6 mm) means: a maximum dimension of the internal space of the housing 211 reserved for the electrode assembly 213 along the second direction V when the assembly gap between the electrode assembly 213 and the housing body 2111 is 0.8 mm. ($K_1$−c−$e_3$−$e_4$) means: a maximum dimension of the internal space of the housing 211 reserved for the electrode assembly 213 along the third direction W when the third insulating member 216 abutting against the fifth wall 2117 is disposed between the fifth wall 2117 and the electrode assembly 213, and the fourth insulating member 217 abutting against the sixth wall 2118 is disposed between the sixth wall 2118 and the electrode assembly 213. Both the third insulating member 216 and the fourth insulating member 217 may be lower plastic components.

In this embodiment, ($W_1$−a−1.6 mm)*($T_1$−b−1.6 mm)*($K_1$−c−$e_3$−$e_4$)/($W_1$*$T_1$*$K_1$)≥0.88 increases the space within the housing 211 reserved for the electrode assembly 213, allowing for accommodation of a larger-volume electrode assembly 213, thereby further enhancing the volumetric energy density of the battery cell 21.

In some embodiments, the battery cell 21 further includes a third insulating member 216 and a fourth insulating member 217, where the third insulating member 216 is disposed between the fifth wall 2117 and the electrode assembly 213 and abuts against the fifth wall 2117, and the fourth insulating member 217 is disposed between the sixth wall 2118 and the electrode assembly 213 and abuts against the sixth wall 2118. A maximum dimension of the third insulating member 216 in the third direction W is denoted as $e_3$, and a maximum dimension of the fourth insulating member 217 in the third direction W is denoted as $e_4$, satisfying: $(W_1-a-4\ \text{mm})*(T_1-b-4\ \text{mm})*(K_1-c-e_3-e_4)/(W_1*T_1*K_1)\geq 0.85$.2 mm $e_{3\leq 10}$ mm, and 2 mm$\leq e_4\leq\leq 10$ mm.

$(W_1-a-4\ \text{mm})*(T_1-b-4\ \text{mm})*(K_1-c-e_3-e_4)/(W_1*T_1*K_1)$ may be any point value from 0.85, 0.86, 0.87, 0.88, 0.89, 0.90, 0.91, 0.92, 0.93, 0.94, 0.95, 0.96, 0.97, 0.98, 0.99, and the like, or a value in a range defined by any two of the above values.

$e_3$ may be any point value from 2 mm, 3 mm, 4 mm, 5 mm, 6 mm, 7 mm, 8 mm, 9 mm, 10 mm, and the like, or a value in a range defined by any two of the above values.

$e_4$ may be any point value from 2 mm, 3 mm, 4 mm, 5 mm, 6 mm, 7 mm, 8 mm, 9 mm, 10 mm, and the like, or a value in a range defined by any two of the above values.

In this embodiment, $(W_1-a-4\ \text{mm})$ means: a maximum dimension of the internal space of the housing 211 reserved for the electrode assembly 213 along the first direction U when the assembly gap between the electrode assembly 213 and the housing body 2111 is 2 mm. $(T_1-b-4\ \text{mm})$ means: a maximum dimension of the internal space of the housing 211 reserved for the electrode assembly 213 along the second direction V when the assembly gap between the electrode assembly 213 and the housing body 2111 is 2 mm. $(K_1-c-e_3-e_4)$ means: a maximum dimension of the internal space of the housing 211 reserved for the electrode assembly 213 along the third direction W when the third insulating member 216 abutting against the fifth wall 2117 is disposed between the fifth wall 2117 and the electrode assembly 213, and the fourth insulating member 217 abutting against the sixth wall 2118 is disposed between the sixth wall 2118 and the electrode assembly 213.

In this embodiment, $(W_1-a-4\ \text{mm})*(T_1-b-4\ \text{mm})*(K_1-c-e_3-e_4)/(W_1*T_1*K_1)\geq 0.85$ increases the space within the housing 211 reserved for the electrode assembly 213, allowing for accommodation of a larger-volume electrode assembly 213, thereby further enhancing the volumetric energy density of the battery cell 21.

In some embodiments, $W_1\geq T_1$, the first direction U is parallel to the height direction Z of the casing, the second direction V is parallel to the width direction Y of the casing, and the third direction W is parallel to the length direction X of the casing.

In an example, the first direction U is the length direction of the housing 211 of the battery cell 21, the second direction V is the width direction of the housing 211 of the battery cell 21, and the third direction W is the height direction of the housing 211 of the battery cell 21, such that the length direction of the housing 211 is parallel to the height direction Z of the casing, the width direction of the housing 211 is parallel to the width direction Y of the casing, and the height direction of the housing 211 is parallel to the length direction X of the casing.

In some embodiments, $0.0026\ \text{m}^3\leq W_1*T_1*K_1\leq 0.008\ \text{m}^3$.

In this embodiment, $W_1*T_1*K_1$ may be any point value from 0.0026 $m^3$, 0.0028 $m^3$, 0.0031 $m^3$, 0.0035 $m^3$, 0.0038 $m^3$, 0.004 $m^3$, 0.0042 $m^3$, 0.0045 $m^3$, 0.0048 $m^3$, 0.005 $m^3$, 0.0052 $m^3$, 0.0055 $m^3$, 0.0058 $m^3$, 0.006 $m^3$, 0.0062 $m^3$, 0.0065 $m^3$, 0.0068 $m^3$, 0.007 $m^3$, 0.0072 $m^3$, 0.0073 $m^3$, 0.0075 $m^3$, 0.0078 $m^3$, 0.008 $m^3$, and the like, or a value in a range defined by any two of the above values.

In this embodiment, $0.004\ \text{m}^3\leq W_1*T_1*K_1\leq 0.006\ \text{m}^3$.

In this embodiment, $W_1*T_1*K_1$ may be any point value from 0.004 $m^3$, 0.0041 $m^3$, 0.0042 $m^3$, 0.0043 $m^3$, 0.0044 $m^3$, 0.0045 $m^3$, 0.0046 $m^3$, 0.0047 $m^3$, 0.0048 $m^3$, 0.0049 $m^3$, 0.005 $m^3$, 0.0051 $m^3$, 0.0052 $m^3$, 0.0053 $m^3$, 0.0054 $m^3$, 0.0055 $m^3$, 0.0056 $m^3$, 0.0057 $m^3$, 0.0058 $m^3$, 0.0059 $m^3$, 0.006 $m^3$, and the like, or a value in a range defined by any two of the above values.

In a case that the housing body 2111 has end caps 2112 disposed at two ends and $W_1\geq T_1$, the two end caps 2112 of the housing 211 are arranged along the length direction X of the casing, the first wall 2113 and the second wall 2114 of the housing 211 are arranged along the height direction Z of the casing, and the third wall 2115 and the fourth wall 2116 of the housing 211 are arranged opposite each other along the width direction Y of the casing, increasing the volume proportion of all battery cells 21 within the battery compartment 11.

In some embodiments, a positive electrode material of the battery cell 21 includes lithium-containing phosphate, and a capacity of the battery cell 21 is denoted as C, satisfying: C≥350 Ah, and $C/((W_1-a)*(T_1-b)*(K_1-c))\geq 118$ Ah/L.

The lithium-containing phosphate includes but is not limited to: at least one of lithium iron phosphate (for example, LiFePO4 (or abbreviated as LFP)), a composite material of lithium iron phosphate and carbon, lithium manganese phosphate (for example, LiMnPO4), a composite material of lithium manganese phosphate and carbon, lithium manganese iron phosphate, or a composite material of lithium manganese iron phosphate and carbon.

When the positive electrode material of the battery cell 21 includes lithium-containing phosphate and C≥350 Ah, setting $C/((W_1-a)*(T_1-b)*(K_1-c))$ to 118 Ah/L or greater can increase the volume proportion of the internal space of the housing 211 of the battery cell 21, allowing a ratio of the volume of the internal space of the housing 211 of the battery cell 21 to the volume of the housing 211 to be 0.9 or greater.

In some embodiments, a positive electrode material of the battery cell 21 includes lithium transition metal oxide, and a capacity of the battery cell 21 is denoted as C, satisfying: C≥650 Ah, and $C/((W_1-a)*(T_1-b)*(K_1-c))\geq 190$ Ah/L.

The lithium transition metal oxide includes but is not limited to: at least one of lithium cobalt oxide (for example, $LiCoO_2$), lithium nickel oxide (for example, $LiNiO_2$), lithium manganese oxide (for example, $LiMnO_2$ or $LiMn2O_4$), lithium nickel cobalt oxide, lithium manganese cobalt oxide, lithium nickel manganese oxide, lithium nickel cobalt manganese oxide (for example, $LiNi_{1/3}Co_{1/3}Mn_{1/3}O_2$ (or abbreviated as NCM333), $LiNi_{0.5}Co_{0.2}Mn_{0.3}O_2$ (also abbreviated as NCM523), $LiNi_{0.5}Co_{0.25}Mn_{0.25}O_2$ (also abbreviated as NCM211), $LiNi_{0.6}Co_{0.2}Mn_{0.2}O_2$ (or abbreviated as NCM622), $LiNi_{0.8}Co_{0.1}Mn_{0.1}O_2$ (or abbreviated as NCM811)), lithium nickel cobalt aluminum oxide (for example, $LiNi_{0.85}Co_{0.15}Al_{0.05}O_2$), and modified compounds thereof.

When the positive electrode material of the battery cell 21 includes lithium transition metal oxide and C≥650 Ah, setting $C/((W_1-a)*(T_1-b)*(K_1-c))$ to 190 Ah/L or greater can increase the volume proportion of the internal space of the housing 211 of the battery cell 21, allowing a ratio of the volume of the internal space of the housing 211 of the battery cell 21 to the volume of the housing 211 to be 0.9 or greater.

In some embodiments, the battery cell 21 is a sodium-ion battery cell 21, and a capacity of the battery cell 21 is denoted as C, satisfying: C≥260 Ah, $C/((W_1-a)*(T_1-b)*(K_1-c))\geq 87$ Ah/L.

When the battery cell 21 is a sodium-ion battery cell 21 and C≥260 Ah, setting $C/((W_1-a)*(T_1-b)*(K_1-c))$ to 87 Ah/L or greater can increase the volume proportion of the internal space of the housing 211 of the battery cell 21, allowing a ratio of the volume of the internal space of the housing 211 of the battery cell 21 to the volume of the housing 211 to be 0.9 or greater.

It should be noted that in the absence of conflict, the embodiments in this application and the features in the embodiments can be combined with each other.

The above embodiments are merely used to illustrate the technical solutions of this application and are not intended to limit this application. For those skilled in the art, various modifications and changes can be made to this application. Any modifications, equivalent replacements, and improvements made without departing from the spirit and principles of this application shall fall within the protection scope of this application.

What is claimed is:

1. An energy storage device, wherein the energy storage device comprises:

a casing having a length direction, a width direction, and a height direction, the casing comprising a battery compartment, wherein the battery compartment comprises a plurality of sub-compartments, the plurality of sub-compartments are arranged along a length direction of the casing, the battery compartment is provided with a partition, and two adjacent sub-compartments of the plurality of sub-compartments are separated by the partition;

a plurality of batteries accommodated in the battery compartment, wherein each of the sub-compartments accommodates at least one battery of the plurality of batteries, and each battery of the plurality of batteries comprises a battery box and p*q battery cells, the battery box comprises a first portion and a second portion, the first portion and the second portion cover each other to define an accommodation space, the p*q battery cells are accommodated in the battery box, the p*q battery cells are arranged in p rows and q columns, each row of battery cells of the p*q battery cells is arranged along the length direction of the casing, each column of battery cells of the p*q battery cells is arranged along a width direction of the casing, p and q are both positive integers, the p*q battery cells of each battery of the plurality of batteries together constitute a plurality of battery cells within the battery compartment, each battery cell of the plurality of battery cells comprises a housing and electrode terminals, a volume of the housing is denoted as $V_3$, $V_3$ is greater than or equal to 0.0026 $m^3$, and the electrode terminals are provided on the housing; and, support members provided in each of the sub-compartments, wherein along the length direction of the casing the support members are disposed on two opposite sides of each of the sub-compartments, and along the height direction of the casing the support members are located at a bottom portion of the casing and are configured to support the batteries accommodated in the sub-compartments, the support members being arranged to maintain a distance between adjacent batteries along the height direction;

wherein a volume of the battery compartment is $V_1$, a sum of volumes of the housings of all the battery cells in the battery compartment is $V_2$, and $0.4\leq V_2/V_1\leq 0.95$, a volume of the casing is denoted as V, satisfying $0.45\leq V_1/V\leq 0.75$ and 30 $m^3\leq V\leq 80$ $m^3$.

2. The energy storage device according to claim 1, wherein $V_1$, $V_2$, and $V_3$ satisfy: $0.5\leq V_2/V_1\leq 0.85$, $0.0001\leq V_3/V_1\leq 0.00025$, and 0.0035 $m^3\leq V_3\leq 0.008$ $m^3$.

3. The energy storage device according to claim 1, wherein along the length direction, a dimension of the battery compartment is denoted as $L_1$, and a sum of dimensions of the housings of the plurality of battery cells arranged in a same row within the battery compartment is denoted as $L_2$, satisfying $0.6\leq L_2/L_1\leq 0.95$, along the length direction, a dimension of the housing of each of the plurality of battery cells is denoted as $L_3$, and $N_2$ battery cells of the plurality of battery cells are arranged in a same row within the battery compartment, satisfying $L_2=L_3*N_2$, and $0.03\leq L_3/L_1\leq 0.12$, wherein 0.17 $m\leq L_3\leq 0.6$ m;

along the length direction, a dimension of the casing is denoted as L, satisfying $0.65\leq L_1/L\leq 0.95$, wherein 3 $m\leq L\leq 9$ m;

along the length direction, a sum of dimensions of the plurality of batteries arranged in a same row within the battery compartment is denoted as $L_4$, satisfying $0.7\leq L_4/L_1\leq 0.96$; and along the length direction, a dimension of each of the plurality of batteries is denoted as $L_5$, and $N_5$ batteries of the plurality of batteries are arranged in a same row within the battery compartment, satisfying $L_4=L_5*N_5$, and 1 $m\leq L_5\leq 1.5$ m, and $2\leq N_5\leq 6$.

4. The energy storage device according to claim 1, wherein along the width direction, a dimension of the battery compartment is denoted as $D_1$, and a sum of dimensions of the housings of the plurality of battery cells arranged in a same column within the battery compartment is denoted as $D_2$, satisfying $0.6\leq D_2/D_1\leq 0.95$;

along the width direction, a sum of dimensions of the plurality of batteries arranged in a same row within the battery compartment is denoted as $D_4$, satisfying $0.7\leq D_4/D_1\leq 0.96$;

along the width direction, a dimension of each of the plurality of batteries is denoted as $D_5$, and $N_6$ batteries of the plurality of batteries are arranged in a same row within the battery compartment, satisfying $D_4=D_5*N_6$, and 1 $m\leq D_5\leq 1.5$ m, and $2\leq N_6\leq 3$;

along the width direction, a dimension of the housing of each of the plurality of battery cells is denoted as $D_3$, and $N_3$ battery cells of the plurality of battery cells are arranged within the battery compartment, satisfying $D_2=D_3*N_3$, and $0.02\leq D_3/D_1\leq 0.05$, wherein 0.04 $m\leq D_3\leq 0.12$ m; and along the width direction, a dimension of the casing is denoted as D, satisfying $0.65\leq D_1/D\leq 0.99$, wherein 1.5 $m\leq D\leq 3.5$ m.

5. The energy storage device according to claim 1, wherein the plurality of batteries are stacked along the height direction within the battery compartment, along the height direction of the casing, a dimension of the battery compartment is denoted as $H_1$, and a sum of dimensions of the housings of the plurality of battery cells arranged in a same column within the battery compartment is denoted as $H_2$, satisfying $0.6 \le H_2/H_1 \le 0.95$, along the height direction, a dimension of the housing of each of the plurality battery cells is denoted as $H_3$, and $N_4$ battery cells of the plurality of battery cells are arranged in a same column within the battery compartment, satisfying $H_2=H_3*N_4$, and $0.07 \le H_3/H_1 \le 0.12$;

along the height direction, a sum of dimensions of the plurality of batteries arranged in a same column within the battery compartment is denoted as $H_4$, satisfying $0.6 \le H_4/H_1 \le 0.99$;

along the height direction, a dimension of each of the plurality of batteries is denoted as $H_5$, and $N_7$ batteries of the plurality of batteries are arranged within the battery compartment, satisfying $H_4=H_5*N_7$, and 0.2 m$\le H_5 \le$0.3 m, and $2 \le N_7 \le 10$;

along the height direction, a dimension of the casing is denoted as H, satisfying $0.55 \le H/H \le 0.85$; wherein 1.5 m$\le H \le$3.5 m.

6. The energy storage device according to claim 1, wherein a volume of the sub-compartment is denoted as $V_4$, and a sum of volumes of the batteries within each sub-compartment of the plurality of sub-compartments is denoted as $V_5$, satisfying $0.75 \le V_5/V_4 \le 0.95$.

7. The energy storage device according to claim 1, wherein along the length direction of the casing, each sub-compartment of the plurality of sub-compartments accommodates only one of the plurality of batteries, wherein along the length direction, a dimension of the sub-compartment is denoted as $L_6$, and a dimension of each battery of the plurality of batteries is denoted as $L_5$, satisfying $0.85 \le L_5/L_6 \le 0.99$.

8. The energy storage device according to claim 1, wherein along the width direction of the casing, each sub-compartment of the plurality of sub-compartments accommodates only one of the plurality of batteries.

9. The energy storage device according to claim 1, wherein along the height direction of the casing, the sub-compartment accommodates more than one of the plurality of the batteries, wherein a number of the sub-compartments is less than or equal to 4.

10. The energy storage device according to claim 1, wherein a volume of each battery of the plurality of batteries is denoted as $V_6$, and a sum of volumes of the housings of the p*q battery cells of the battery is denoted as $V_7$, satisfying $0.5 \le V_7/V_6 \le 0.8$, wherein a number of the p*q battery cells of the battery is denoted as $N_8$, and a volume of the housing of each of the p*q battery cells is denoted as $V_3$, satisfying $V_7=V_3*N_8$.

11. The energy storage device according to claim 1, in each row of the p*q battery cells of each battery of the plurality of batteries, a sum of dimensions of the housings of the battery cells along the length direction is denoted as $L_7$, and a dimension of the battery along the length direction is denoted as $L_5$, satisfying $0.8 \le L_7/L_5 \le 0.95$, wherein along the length direction, a dimension of the housing of each of the p*q battery cells is denoted as $L_3$, satisfying 0.17 m$\le L_3 \le$0.6 m.

12. The energy storage device according to claim 1, wherein in each column of the p*q battery cells of each battery of the plurality of batteries, a sum of dimensions of the housings of the battery cells along the width direction is denoted as $D_7$, and a dimension of the battery along the width direction is denoted as $D_5$, satisfying $0.75 \le D_7/D_5 \le 0.95$, wherein along the width direction, a dimension of the housing of each of the p*q battery cells is denoted as $D_3$, satisfying 0.04 m$\le D_3 \le$0.12 m.

13. The energy storage device according to claim 1, wherein a dimension of the housing of each battery cell of the plurality of battery cells along the height direction of the casing is denoted as $H_3$, and a dimension of each battery of the plurality of batteries along the height direction is denoted as $H_5$, satisfying $0.75 \le H_3/H_5 \le 0.95$, wherein 0.17 m$\le H_3 \le$0.6 m; optionally, 0.2 m$\le H_3 \le$0.45 m.

14. The energy storage device according to claim 1, wherein each battery cell of the plurality of battery cells further comprises at least one electrode assembly, and the electrode assembly is accommodated within the housing;

the housing is a right parallelepiped in shape, a dimension of the housing in a first direction is denoted as $W_1$, a dimension of the housing in a second direction is denoted as $T_1$, a dimension of the housing in a third direction is denoted as $K_1$, the first direction is parallel to the length direction of the casing, the second direction is parallel to the width direction of the casing, and the third direction is parallel to the height direction of the casing; and the housing comprises a first wall and a second wall disposed opposite each other along the first direction, a third wall and a fourth wall disposed opposite each other along the second direction, and a fifth wall and a sixth wall disposed opposite each other along the third direction, a sum of thicknesses of the first wall and the second wall is denoted as a, a sum of thicknesses of the third wall and the fourth wall is denoted as b, a sum of thicknesses of the fifth wall and the sixth wall is denoted as c, satisfying $(W_1-a)*(T_1-b)*(K_1-c)/(W_1*T_1*K_1) \ge 0.9$, wherein $$(W_1 - a)/W_1 \ge 0.97,\ (T_1 - b)/T_1 \ge 0.965,\ \text{and}\ (K_1 - c)/K_1 \ge 0.965;$$

the housing comprises a housing body and at least one end cap, the housing body has an opening, the at least one end cap covers the opening, and the at least one end cap is provided with the electrode terminals; and the housing body comprises the first wall, the second wall, the third wall, the fourth wall, and the fifth wall that are integrally formed, and the end cap is the sixth wall, wherein the battery cell further comprises a first insulating member and a second insulating member, wherein the first insulating member is disposed between the fifth wall and the electrode assembly and abuts against the fifth wall, and the second insulating member is disposed between the sixth wall and the electrode assembly and abuts against the sixth wall; and a maximum dimension of the first insulating member in the third direction is denoted as $e_1$, and a maximum dimension of the second insulating member in the third direction is denoted as $e_2$, satisfying: $(W_1-a-1.6\ \text{mm})*(T_1-b-1.6\ \text{mm})*(K_1-c-e_1-e_2)/(W_1*T_1*K_1) \ge 0.88$, 0.3 mm$\le e_1 \le$1.2 mm, and 2 mm$\le e_2 \le$10 mm, $W_1 \ge T_1$.

15. The energy storage device according to claim 14, wherein

The at least one end cap comprises two end caps, the housing body has two openings disposed opposite each other along the third direction, the two end caps respectively cover the two openings, and at least one of the two end caps is provided with the electrode terminals; and the housing body comprises the first wall, the second wall, the third wall, and the fourth wall that are integrally formed, and the two end caps are the fifth wall and the sixth wall, respectively, wherein the battery cell further comprises a third insulating member and a fourth insulating member, wherein the third insulating member is disposed between the fifth wall and the electrode assembly and abuts against the fifth wall, and the fourth insulating member is disposed between the sixth wall and the electrode assembly and abuts against the sixth wall; and a maximum dimension of the third insulating member in the third direction is denoted as $e_3$, and a maximum dimension of the fourth insulating member in the third direction is denoted as $e_4$, satisfying: $(W_1-a-1.6\ mm)*(T_1-b-1.6\ mm)*(K_1-c-e_3-e_4)/(W_1*T_1*K_1)\geq 0.88$, $2\ mm\leq e_3\leq 10\ mm$, and $2\ mm\leq e_4\leq 10\ mm$, $W_1\geq T_1$.

16. The energy storage device according to claim 14, wherein a positive electrode material of each battery cell of the plurality of battery cells comprises lithium-containing phosphate, and a capacity of the battery cell is denoted as C, satisfying: $C\geq 350$ Ah, and $C/((W_1-a)*(T_1-b)*(K_1-c))\geq 118$ Ah/L, Ah/L represents amp-hours (Ah) by volume in liters (L).

17. The energy storage device according to claim 14, wherein a positive electrode material of each battery cell of the plurality of battery cells comprises lithium transition metal oxide, and a capacity of the battery cell is denoted as C, satisfying: $C\geq 650$ Ah, and $C/((W_1-a)*(T_1-b)*(K_1-c))\geq 190$ Ah/L, Ah/L represents amp-hours (Ah) by volume in liters (L).

18. The energy storage device according to claim 14, wherein each battery cell of the plurality of battery cells is a sodium-ion battery cell, and a capacity of the battery cell is denoted as C, satisfying: $C\geq 260$ Ah, and $C/((W_1-a)*(T_1-b)*(K_1-c))\geq 87$ Ah/L, Ah/L represents amp-hours (Ah) by volume in liters (L).

* * * * *